(12) United States Patent (10) Patent No.: US 7,384,158 B2
Ramachandran et al. (45) Date of Patent: Jun. 10, 2008

(54) IMAGE PROJECTION SYSTEM AND METHOD

(75) Inventors: Gopal Ramachandran, Los Gatos, CA (US); Gregory A. Prior, San Jose, CA (US)

(73) Assignee: Silicon Optix Inc, San Jose, CA (US)

( * ) Notice: Subject to any disclaimer, the term of this patent is extended or adjusted under 35 U.S.C. 154(b) by 0 days.

(21) Appl. No.: 10/752,955

(22) Filed: Jan. 7, 2004

(65) Prior Publication Data

US 2004/0141157 A1 Jul. 22, 2004

Related U.S. Application Data

(60) Provisional application No. 60/438,675, filed on Jan. 8, 2003.

(51) Int. Cl.
*G03B 21/28* (2006.01)
*H04N 3/23* (2006.01)

(52) U.S. Cl. ............................ 353/70; 353/77; 348/746

(58) Field of Classification Search ................. 353/69, 353/70, 98, 99, 74–80; 359/460, 451, 449; 348/781–784, 806, 746, 747
See application file for complete search history.

(56) References Cited

U.S. PATENT DOCUMENTS

| | | | |
|---|---|---|---|
| 4,003,080 | A | 1/1977 | Maiman et al. |
| 4,571,631 | A | 2/1986 | Breglia et al. |
| 5,185,667 | A | 2/1993 | Zimmerman |
| 5,274,406 | A * | 12/1993 | Tejima et al. ............... 353/70 |
| 5,319,744 | A | 6/1994 | Kelly et al. |
| 5,355,188 | A | 10/1994 | Biles et al. |
| 5,379,080 | A | 1/1995 | Onozuka |
| 5,394,198 | A | 2/1995 | Janow |
| 5,414,521 | A | 5/1995 | Ansley |
| 5,422,691 | A | 6/1995 | Ninomiya et al. |

(Continued)

FOREIGN PATENT DOCUMENTS

CA 2381093 2/2001

(Continued)

OTHER PUBLICATIONS (1) Notification of Transmittal of the International Search Report or the Declaration.

(Continued)

*Primary Examiner*—Andrew T Sever

(57) ABSTRACT

An image projection system and method is presented for optically projecting an image onto a display surface with visually correct geometry and optimum image quality. The projection system includes an image processing unit for receiving the input image data and generating distortion-compensated image data to compensate for ensuing spatial distortions in the projection system, a projection light engine for receiving the distortion-compensated image data and projecting a distortion-compensated optical image that corresponds to the distortion-compensated image data; and, an optical reflection assembly comprising at least one curved mirror positioned in the optical path of the distortion-compensated optical image emerging from the projection light engine for producing a displayed optical image with reduced distortion on the display surface. The image processing unit distortion-compensates the input image data such that the optical and spatial distortions associated with the projection light engine and optical reflection assembly are substantially reduced in the displayed optical image.

38 Claims, 34 Drawing Sheets

U.S. PATENT DOCUMENTS

| | | | |
|---|---|---|---|
| 5,465,121 A | | 11/1995 | Blalock et al. |
| 5,477,394 A | * | 12/1995 | Shibazaki .................... 359/858 |
| 5,559,905 A | | 9/1996 | Greggain et al. |
| 5,594,676 A | | 1/1997 | Greggain et al. |
| 5,622,418 A | | 4/1997 | Daijogo et al. |
| 5,634,704 A | | 6/1997 | Shikama et al. |
| 5,671,993 A | | 9/1997 | Shikama |
| 5,692,820 A | * | 12/1997 | Gale et al. ..................... 353/77 |
| 5,760,875 A | | 6/1998 | Daijogo et al. |
| 5,795,046 A | | 8/1998 | Woo |
| 5,883,476 A | | 3/1999 | Noguchi et al. |
| 5,973,848 A | | 10/1999 | Taguchi et al. |
| 6,233,024 B1 | * | 5/2001 | Hiller et al. ................. 348/744 |
| 6,305,805 B1 | | 10/2001 | Liebenow |
| 6,367,933 B1 | | 4/2002 | Chen et al. |
| 6,392,821 B1 | | 5/2002 | Benner, Jr. |
| 6,416,186 B1 | | 7/2002 | Nakamura |
| 6,456,340 B1 | | 9/2002 | Margulis |
| 6,457,834 B1 | | 10/2002 | Cotton et al. |
| 6,461,001 B2 | | 10/2002 | Okamori et al. |
| 6,467,910 B1 | | 10/2002 | Sato |
| 6,498,620 B2 | | 12/2002 | Schofield et al. |
| 6,516,151 B2 | | 2/2003 | Pilu |
| 6,520,646 B2 | | 2/2003 | Rodriguez, Jr. et al. |
| 6,520,647 B2 | * | 2/2003 | Raskar ......................... 353/70 |
| 6,561,649 B1 | | 5/2003 | Burstyn |
| 6,568,814 B2 | | 5/2003 | Rodriguuez et al. |
| 6,626,541 B2 | | 9/2003 | Sunaga |
| 6,631,994 B2 | | 10/2003 | Suzuki et al. |
| 6,795,225 B2 | | 9/2004 | Tsuboi et al. |
| 6,896,375 B2 | * | 5/2005 | Peterson et al. .............. 353/66 |
| 6,898,308 B2 | | 5/2005 | Mojsilovis et al. |
| 2001/0050758 A1 | | 12/2001 | Suzuki et al. |
| 2001/0050812 A1 | | 12/2001 | Takahashi et al. |
| 2002/0008853 A1 | * | 1/2002 | Sunaga ......................... 353/69 |
| 2002/0024636 A1 | | 2/2002 | Okamori et al. |
| 2002/0051095 A1 | | 5/2002 | Su |
| 2002/0075459 A1 | * | 6/2002 | Lin ............................... 353/74 |
| 2002/0154418 A1 | | 10/2002 | Shikama |
| 2003/0072077 A1 | | 4/2003 | Peterson et al. |
| 2003/0231261 A1 | * | 12/2003 | Bassi et al. .................. 348/745 |
| 2004/0032982 A1 | * | 2/2004 | Nishizawa ................... 382/171 |
| 2004/0046944 A1 | * | 3/2004 | Suzuki et al. ................. 353/77 |
| 2007/0035670 A1 | * | 2/2007 | Prior et al. .................. 348/745 |

FOREIGN PATENT DOCUMENTS

| | | |
|---|---|---|
| CA | 2393022 | 4/2002 |
| EP | 773678 | 5/1997 |
| EP | 0 777 198 A1 | 6/1997 |
| EP | 1205791 | 5/2002 |
| JP | 61 023130 | 1/1986 |
| JP | 03-241331 | 10/1991 |
| JP | 09 081785 | 3/1997 |
| JP | 09 138349 | 5/1997 |
| JP | 11 146307 | 5/1999 |
| JP | 2000 19647 | 1/2000 |
| JP | 2000 81593 | 3/2000 |
| JP | 2001 42461 | 2/2001 |
| JP | 2002 174853 | 6/2002 |
| WO | WO 00/21282 | 4/2000 |
| WO | WO-02 07434 | 1/2002 |
| WO | WO 03/107090 | 12/2003 |

OTHER PUBLICATIONS (2) International Search Report.
(3) Written Opinion of the International Searching Authority.
Shikama, Shinsuke; Hiroshi Suzuki and Kohei Teramoto, 46.2: Optical System of Ultra-Thin Rear Projector Equipped With Refractive-Reflective Projection Optics; SID 02 Digest, pp. 1250-1253.
Preliminary Examination Report for the corresponding Chinese Application No. 200480001926.7, Dec. 2005.
Notice of Publication for the corresponding Chinese Application No. 200480001926.7, May 2006.
Invalidation Brief for the corresponding Taiwan R.O.C. Application No. 93100341N01, Jun. 2006.
Indian Office Action dated May 30, 2007.

* cited by examiner 67 inch (1702mm) diagonal. 1480mm wide x 834mm high 67 inch (1702mm) diagonal. 1480mm wide x 834mm high 67 inch (1702mm) diagonal. 1480mm wide x 834mm high
Distortion 28.4%

67 inch (1702mm) diagonal. 1480mm wide x 834mm high

| Y FIELD | | | | | |
|---|---|---|---|---|---|
| 0.49 | | | | | |
| 0.367 | | | | | |
| 0.245 | | | | | |
| 0.123 | | | | | |
| 0 | | | | | |
| -0.123 | | | | | |
| -0.245 | | | | | |
| -0.367 | | | | | |
| -0.49 | | | | | |
| REL. FIELD | Scale 20mm 0 | 0.22 | 0.44 | 0.66 | 0.87  X FIELD |

67 inch (1702mm) diagonal. 1480mm wide x 834mm high

Y FIELD

| 0.49 | | | | | |
|---|---|---|---|---|---|
| 0.367 | | | | | |
| 0.245 | | | | | |
| 0.123 | | | | | |
| 0 | | | | | |
| -0.123 | | | | | |
| -0.245 | | | | | |
| -0.367 | | | | | |
| -0.49 | | | | | |
| REL. | Scale 20 mm | | | | |
| FIELD | 0 | 0.22 | 0.44 | 0.66 | 0.87 X FIELD |

67 inch (1702mm) diagonal. 1480mm wide x 834mm high

Y FIELD

| 0.49 | • | • | • | • | • |
| --- | --- | --- | --- | --- | --- |
| 0.367 | • | • | • | • | • |
| 0.245 | • | • | • | • | • |
| 0.123 | • | • | • | • | • |
| 0 | • | • | • | • | • |
| -0.123 | • | • | • | • | • |
| -0.245 | • | • | • | • | • |
| -0.367 | • | • | • | • | • |
| -0.49 | • | • | • | • | • |

REL. Scale 10mm
FIELD   0    0.22    0.44    0.66    0.87  X FIELD

FIG. 14C

Y FIELD

| 0.49 | • | • | • | • | • |
| --- | --- | --- | --- | --- | --- |
| 0.367 | • | • | • | • | • |
| 0.245 | • | • | • | • | • |
| 0.123 | • | • | • | • | • |
| 0 | • | • | • | • | • |
| -0.123 | • | • | • | • | • |
| -0.245 | • | • | • | • | • |
| -0.367 | • | • | • | • | • |
| -0.49 | • | • | • | • | • |

REL. Scale 10mm
FIELD   0    0.22    0.44    0.66    0.87  X FIELD

FIG. 14D

67 inch (1702mm) diagonal. 1480mm wide x 834mm high

| Y FIELD | | | | | |
|---|---|---|---|---|---|
| 0.49 | • | ◢ | ◣ | ◣ | ◣ |
| 0.367 | • | ◢ | ◣ | ◣ | ◣ |
| 0.245 | • | ◢ | ◣ | ◣ | ◣ |
| 0.123 | • | ◢ | ◣ | ● | ◣ |
| 0 | • | • | ● | ● | ◣ |
| -0.123 | • | ◢ | ● | ● | ◣ |
| -0.245 | • | ◢ | ● | ● | ◣ |
| -0.367 | • | ◢ | ● | ● | ◣ |
| -0.49 | • | ● | ● | ● | ◣ |
| REL. FIELD | Scale 2mm 0 | 0.22 | 0.44 | 0.66 | 0.87 X FIELD |

67 inch (1702mm) diagonal. 1480mm wide x 834mm high

| Y FIELD | | | | | |
|---|---|---|---|---|---|
| 0.49 | . | . | . | . | . |
| 0.367 | . | . | . | . | . |
| 0.245 | . | . | . | . | . |
| 0.123 | . | . | . | . | . |
| 0 | . | . | . | . | . |
| -0.123 | . | . | . | . | . |
| -0.245 | . | . | . | . | . |
| -0.367 | . | . | . | . | . |
| -0.49 | . | . | . | . | . |
| REL. FIELD | 0 | 0.22 | 0.44 | 0.66 | 0.87 X FIELD |

Scale 2mm 67 inch (1702mm) diagonal. 1480mm wide x 834mm high

| Y FIELD | | | | | |
|---|---|---|---|---|---|
| 0.49 | ● | ╱ | ● | ● | ➷ |
| 0.367 | ● | ╱ | ● | ● | ➚ |
| 0.245 | ● | ╱ | ● | ● | ● |
| 0.123 | ● | ╌ | ● | ● | ● |
| 0 | ● | ● | ● | ● | ● |
| -0.123 | ● | ● | ● | ● | ● |
| -0.245 | ● | ● | ● | ● | ● |
| -0.367 | ● | ╲ | ● | ● | ➘ |
| -0.49 | ╎ | ╲ | ● | ╲ | ● |
| REL. FIELD | 0 | 0.22 | 0.44 | 0.66 | 0.87  X FIELD |

Scale 2mm

Sag Plot - X points

67 inch (1702mm) diagonal. 1480mm wide x 834mm high
27 percent distortion 67 inch (1702mm) diagonal. 1480mm wide x 834mm high

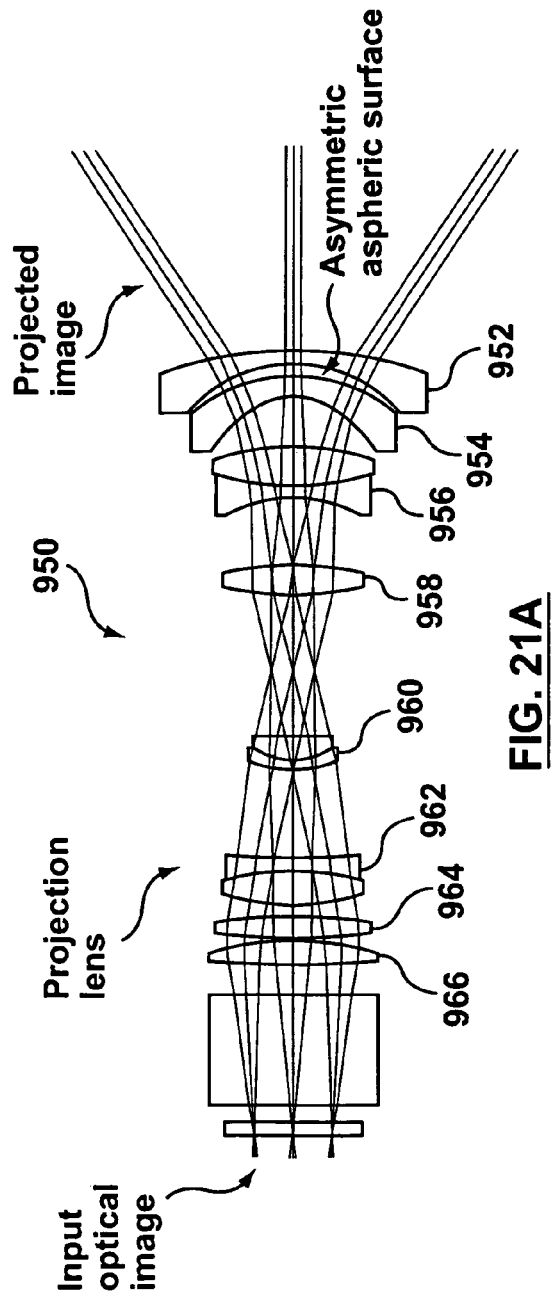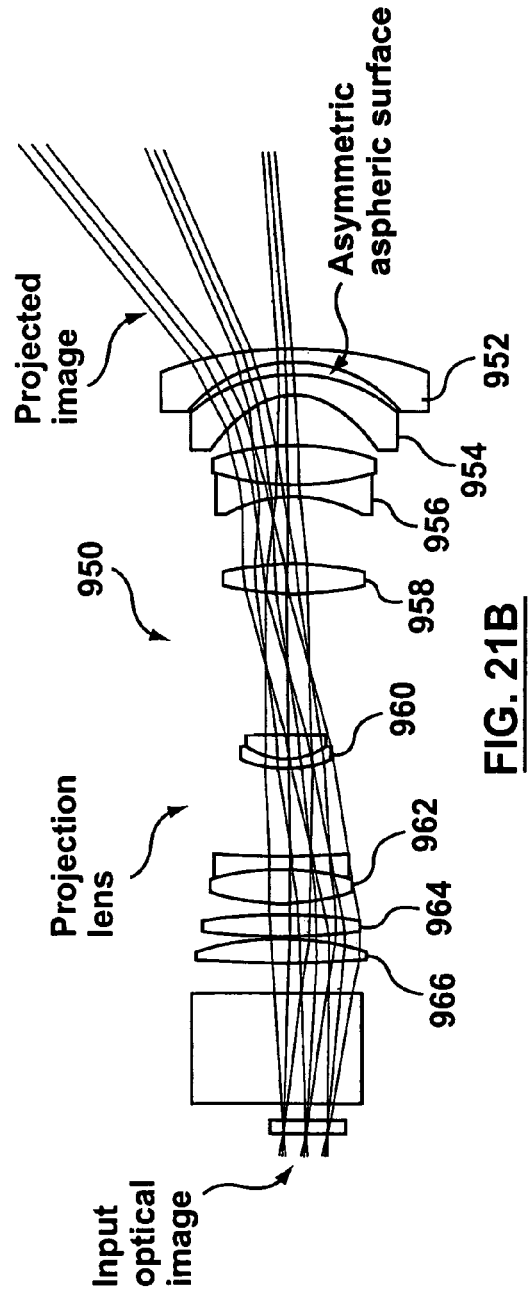

IMAGE PROJECTION SYSTEM AND METHOD

CROSS-REFERENCE TO RELATED APPLICATION

This application claims priority from U.S. Provisional Patent Application Ser. No. 60/438,675 filed Jan. 8, 2003.

FIELD OF THE INVENTION

This invention relates to projection systems and methods and more particularly to a short throw projection system and method which combines optics and image processing for reducing optical path length while maintaining optimum image quality.

BACKGROUND OF THE INVENTION

In a front projection system, the projector and viewer are on the same side of the display surface, with the image from the projector reflecting from the display surface to the viewer. FIG. 1A shows a standard prior art eight-element projection lens 5, which can take an input optical image 2 and project an expanded output optical image 3. FIG. 1B shows a projection light engine 6 that uses the eight element projection lens 5 to project an image directly on a display surface 20. This is an example of an on-axis projection system in which the image is created and projected along a straight axis 10a that is perpendicular to the display surface 20.

For a rear projection system this design must be made more compact to comply with commercial requirements for rear projection screen cabinet dimensions. This "compactness" is quantified in terms of the "throw ratio". The throw ratio of a projection system is given by the projection distance d (see FIG. 1B) divided by the diagonal length D (not shown) of display surface 20. The diagonal D is measured from the opposite corners of the display surface 20. The throw ratio is given by:

$$\text{Throw Ratio} = \frac{d}{D} \quad (1)$$

As shown in FIGS. 1C and 1D, the generic projection lens 5 in a front projection configuration produces an image with low distortion, having typical spot sizes (i.e. de-focused point images in the corners). Specifically, with display surface 20 having dimensions of 1480 mm×834 mm, and a 25.4 mm f/2.8 projection lens 5, a projected image is produced with 1 mm spots at the center and 3 mm spots at the corners. A reasonable design goal for a front projection system is to have a minimum resolvable focused spot size of no more than a pixel-span at the center and less than 2-3 pixel-spans in the corners. In this particular example, taking into consideration the pixel size in the micro-display imaging device and the magnification caused by projection onto a distant display surface, a pixel-span at the display surface 20 is about 1 mm. The overall lens distortion is less than 1% over the screen size of the display surface 20. It is desirable for the distortion map (i.e. FIG. 1C) to be rectangular and to exactly overlay the available display area in order to reduce lost pixels and lost brightness (resulting from turning off pixels which do not overlay the display screen and consequently losing their contribution to overall brightness).

Furthermore, it is also desirable for the spot diagram of FIG. 1D to show minimal spot size increase (in pixels farther from the center of the display) and to be symmetrical. Minimizing spot size increase implies minimizing point image de-focusing.

Another important design goal in building a compact projection system is to achieve good image quality while minimizing the throw ratio (some designers use the width of the image instead of the diagonal when computing throw ratio, so it is important to specify which definition of throw ratio is being used). Minimizing the throw ratio is especially important for rear projection systems in which the projector and screen are physically combined into a single functional unit, such as rear projection televisions. In such units minimizing the throw ratio implies a shorter projection path length, allowing for a smaller depth for the cabinet, which houses the display surface and the projection light engine. Minimizing the throw ratio in front projection systems allows large images to be projected with a projector placed very close to the screen.

Cabinet depths and depth reductions in rear-projection display systems are evaluated objectively by measuring the ratio of display diagonal to cabinet depth or DtoD ratio. Conventional configurations using on-axis projection, flat mirrors, and optical-only means of distortion correction have yielded DtoD ratios of about 2.5 to 3.5 (for example, a 61" diagonal with a 19.5" depth, or a 55" diagonal with a 18" depth, etc).

To decrease cabinet depth, prior art methods have combined flat mirrors (to fold the optical path) with low distortion and wide field of view (FOV) lenses which serve to decrease the projection path length, hence decreasing the throw ratio. By fine-tuning the optical geometry (lens type, focal distances, mirror angles), image distortions can be minimized. Prior art configurations place the fold mirror (or mirrors) on-axis to the projected beam. This has the advantage of not producing keystone distortion. However, the disadvantage is not providing significant cabinet depth reductions, or not increasing in the DtoD ratio.

For instance, FIG. 2A, shows a prior art projection system 6' with a projection light engine 14, a planar mirror 8, and display surface 20. This is an example of an on-axis projection system in which the planar mirror creates a folded optical path and lies at an angle α to the display surface 20. The result is a cabinet depth of T. This projection system 6' does not result in keystone distortion as can be seen in FIG. 2B which shows an image I projected on the display surface 20.

The main method for reducing cabinet depth in prior art configurations is to use short-throw, wide-angle lenses with an on-axis optical path. This has the disadvantage of limiting depth reductions, and even though keystone distortion is not present, this approach still requires optical elements that are challenging to design and manufacture. The optical and geometric constraints manifest themselves as increased pincushion or barrel distortion and keystone distortion. The design of prior art systems has largely been constrained by the requirement of minimizing these distortions along with achieving a required Modulation Transfer Function (MTF), correcting for lateral color, meeting lens F-number specifications, while satisfying cost-performance tradeoffs.

Prior art rear projection systems use screen assemblies that have low reflectance to light impinging on them from the front (by use of light absorbing materials) in order to provide a high contrast ratio. These screen assemblies also have a high transmittance for light impinging on them from the rear (by use of lenticular arrays and collimation of light)

in order to provide high brightness. Light is typically collimated by using a Fresnel lens as part of the screen assembly. A Fresnel lens is a symmetrical circular structure (its optical center is located at the physical center, or on the axis of the projection light path) for on-axis projection systems. A Fresnel lens of a given focal length substitutes for a large circular biconvex lens of the same focal length. The diameter of such a Fresnel lens is at most the length of the display diagonal. These Fresnel lenses are typically thin, very flexible and expand with interior temperature rise. The image quality for on-axis projection systems is not very sensitive to variations in the central portion (around the optical axis) of a Fresnel lens' surface profile. Unfortunately, these symmetrical Fresnel lenses cannot be used in off-axis RP systems. In addition, the Fresnel lens must be carefully designed in projection systems with high DtoD ratios because the light impinges on the rear of the screen at incident angles that vary from a minimum near the bottom of the screen of from 20±5 degrees to a maximum of up to 60±5 degrees near the top of the screen. Accordingly, the lens surface must be maintained very precisely because of the sensitivity of the collimation function to the angle of incidence of the impinging light.

SUMMARY OF THE INVENTION

The present invention is a compact rear projection system using a rear projection transmissive screen with an integral Fresnel collimation lens. Another embodiment of the invention can be a compact front projection system that is placed very close to a reflective screen. In particular, the present invention relates to an off-axis image projection system and method for optically projecting an image onto a display surface with visually correct geometry and optimum image quality while advantageously reducing the optical path length and throw ratio.

The projection system includes an image processing unit, a projection light engine and an optical reflection assembly. The image processing unit receives digital input image data, which can differ in resolution and aspect ratio, and scales the input image data to the correct aspect ratio and resolution of the projection light engine. The image processing unit also applies a distortion compensation to the digital image sent to the light modulator using an inverse transform to be described later such that when the image-modulated light rays traverse the complete optical path, the rays undergo the optical and geometric distortion in this path, and emerge towards the viewer with no perceptible distortion or fuzziness. In other words, the distortion compensation causes every individual pixel at the image modulator to be moved in the opposite direction just far enough so that the distortion in the light path between the light modulator and the screen moves each pixel back to its desired position on the screen. The projection light engine receives the distortion-compensated image data from the image processing unit in a digital format which is translated to signals that cause the light modulating micro-display device (or devices) to generate light. This light forms an optical image that corresponds to the distortion-compensated image data. The projection light engine can include a corrector lens that compensates for spot defocusing due to the beam spreading that results from the projection geometry and the optical reflection assembly. Alternatively, a custom projection lens that provides this functionality can be used.

The optical reflection assembly is positioned in the optical path of the distortion-compensated optical image to reflect this image to a specific area on the display surface. The optical reflection assembly comprises at least one aspherical mirror for controlling reflection to the display surface. The aspherical mirror has smoothly varying radii of curvature in both horizontal and vertical orientation to help form a substantially visually correct image on the display surface. The projection light engine and the optical reflection assembly are designed to minimize optical anomalies and can compromise on spatial accuracy. The image processing unit can perform final correction for the combined spatial distortion produced by the projection light engine, the optical reflection assembly, changes in projection geometry, as well as errors in 3 axes of rotational freedom and 2 dimensions of translational freedom (up/down, and left/right) in assembly alignment. Fore and aft translational errors result in focus changes and cannot be corrected by the image processing unit. The display surface is designed to receive light at high and varied angles of incidence and to either reflect or transmit light perpendicular to the display screen.

Accordingly, in a first aspect, the invention provides an off-axis projection system for displaying an optical image on a display surface based on input image data. The projection system comprises:
  (a) an image processing unit for receiving the input image data and generating distortion-compensated image data;
  (b) a projection light engine coupled to the image processing unit for receiving the distortion-compensated image data and projecting a distortion-compensated optical image that corresponds to the distortion-compensated image data; and,
  (c) an optical reflection assembly coupled to the projection light engine, the optical reflection assembly comprising at least one curved mirror, the at least one curved mirror including an aspherical rotationally non-symmetric mirror having a vertically oriented concave surface and a horizontally oriented surface with a varying degree of concave or convex curvature on an upper surface that smoothly transitions to a varying degree of convex curvature on a lower surface for reducing spatial distortion on the displayed optical image, the at least one curved mirror being positioned in the optical path of the distortion-compensated optical image emerging from a projection lens for producing a displayed optical image with reduced distortion on the display surface;

wherein, the image processing unit is adapted to distortion-compensate the optical image represented by the input image data such that when the distortion-compensated optical image is projected through the projection light engine and reflected off the optical reflection assembly, the optical and geometric distortions associated with the projection light engine and the optical reflection assembly are substantially eliminated in the displayed optical image.

The invention provides in another aspect, an off-axis projection method for displaying an optical image on a display surface of an off-axis projection system based on input image data. The method comprises the steps of:
  (a) receiving input image data and electronically generating distortion-compensated image data;
  (b) providing a distortion-compensated optical image that corresponds to the distortion-compensated digital image data; and,
  (c) reflecting the distortion-compensated optical image off an optical reflection assembly to produce a displayed optical image for projection on the display surface, the assembly comprising at least one curved mirror, the at least one curved mirror being an aspherical rotationally non-symmetric mirror having a vertically oriented concave surface and a horizontally oriented surface with a varying degree of concave or convex curvature on an upper surface that smoothly transitions to a varying degree of convex curvature on a lower surface for reducing spatial distortion on the displayed optical image, the at least one curved mirror being positioned in the optical path of the distortion-compensated optical image emerging from the projection lens to produce a displayed optical image with reduced distortion on the display surface;

wherein step (a) comprises distortion-compensating the optical image represented by input the image data such that when the distortion-compensated optical image is reflected off the optical reflection assembly, the optical and geometric distortions associated with the projection system are substantially eliminated in the displayed optical image.

BRIEF DESCRIPTION OF THE DRAWINGS

For a better understanding of the present invention and to show more clearly how it may be carried into effect, reference will now be made, by way of example only, to the accompanying drawings which show an exemplary embodiment of the present invention and in which:

FIGS. 14B, 14C and 14D are plots that illustrate the image distortion and focus spot performance associated with the off-axis, folded rear projection system of FIG. 14A;

FIG. 19A is a schematic illustration of a prior art projection system projecting 30 degrees off-axis upwards, resulting in approximately 27% keystone distortion;

FIG. 19D shows the prior art projection light engine of FIG. 19B used in a 30 degree off-axis projection system (note that the lens barrel is horizontal but the lens is still projecting an image upwards at 30 degrees);

FIG. 21A is a top view of a custom projection lens that incorporates the functionality of the corrector lens;

FIG. 21B is a side view of a custom projection lens that incorporates the functionality of the corrector lens;

DETAILED DESCRIPTION OF THE INVENTION

Figure 2A:
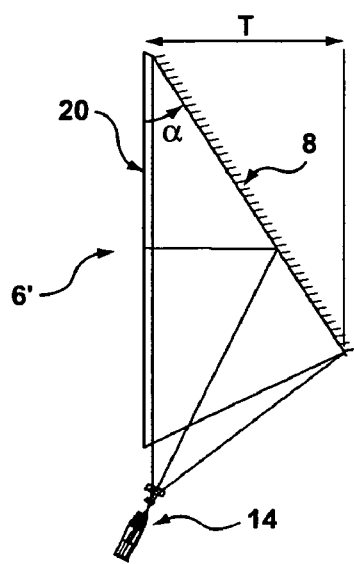
FIG. 2A is a schematic diagram of a prior art on-axis projection system.
Figure 2B:
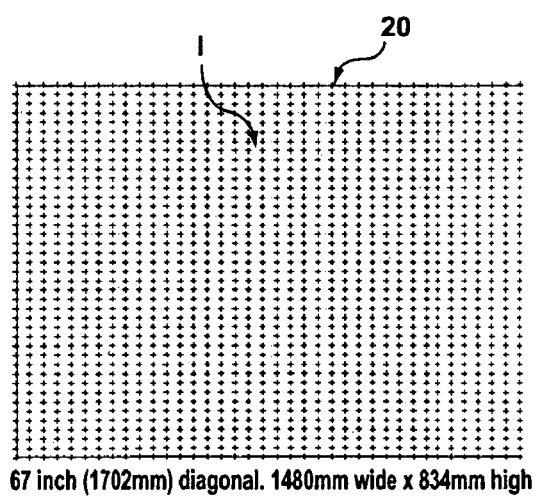
FIG. 2B is a distortion plot that corresponds to the prior art projection system of FIG. 2A.
Figure 3B:
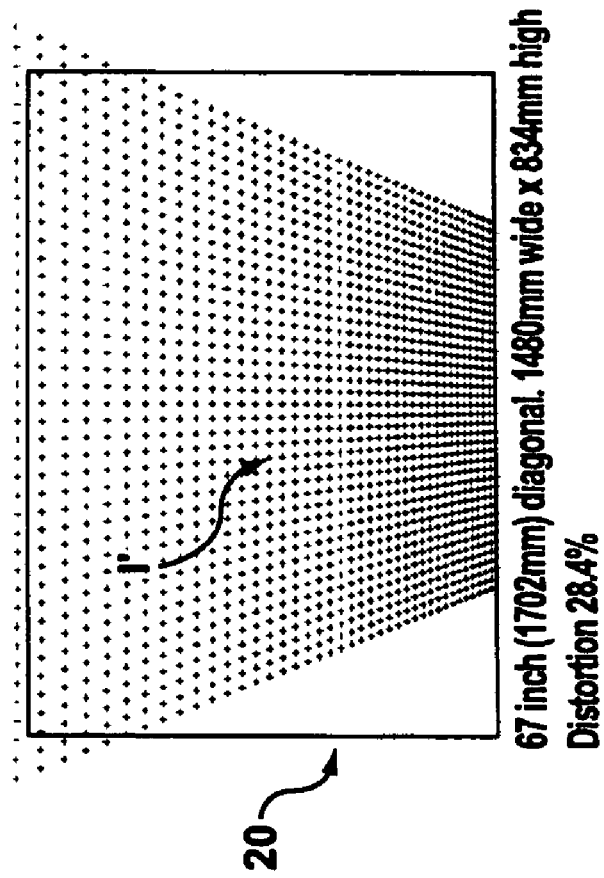
FIG. 3B is a distortion plot that corresponds to the alternative projection system of FIG. 3A.
Figure 3A:
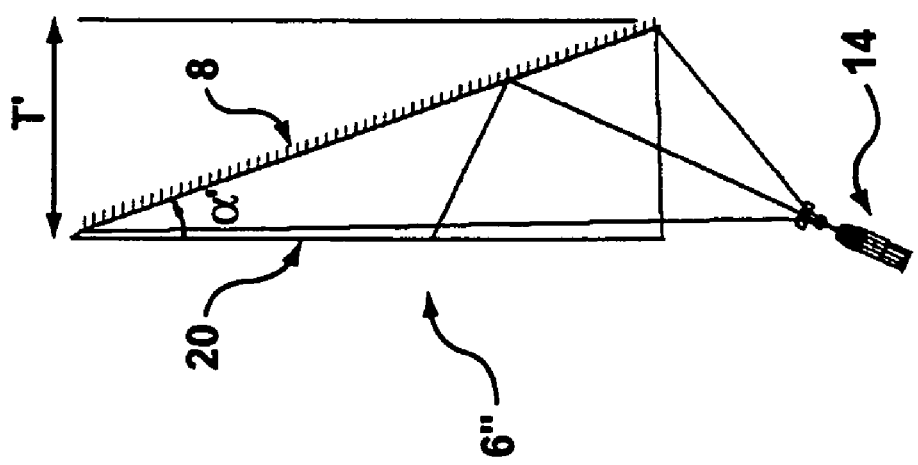
FIG. 3A is a schematic diagram of an alternative (off-axis) projection system.

Referring now to FIG. 3A, a first attempt at reducing cabinet thickness T (see FIG. 2A), could involve reducing the angle α. Accordingly, a projection system 6" (i.e. an off-axis projection system) is shown having the same components as on-axis projection system 6', however, the planar mirror 8 is placed at a shallower angle with respect to display surface 20. This has the desired effect of reducing cabinet thickness from a thickness of T to a thickness of T'. However, the resulting image now has keystone distortion (see FIG. 3B) in which the image I' produced by the off-axis projection system 6" is now distorted with respect to the original image I (see FIG. 2B). The keystone distortion involves shrinking the image I' in the horizontal direction near the bottom of the image I' while stretching the image I' in the horizontal direction near the top of the image I'. Also, image I' is stretched in the vertical direction.

Figure 4B:
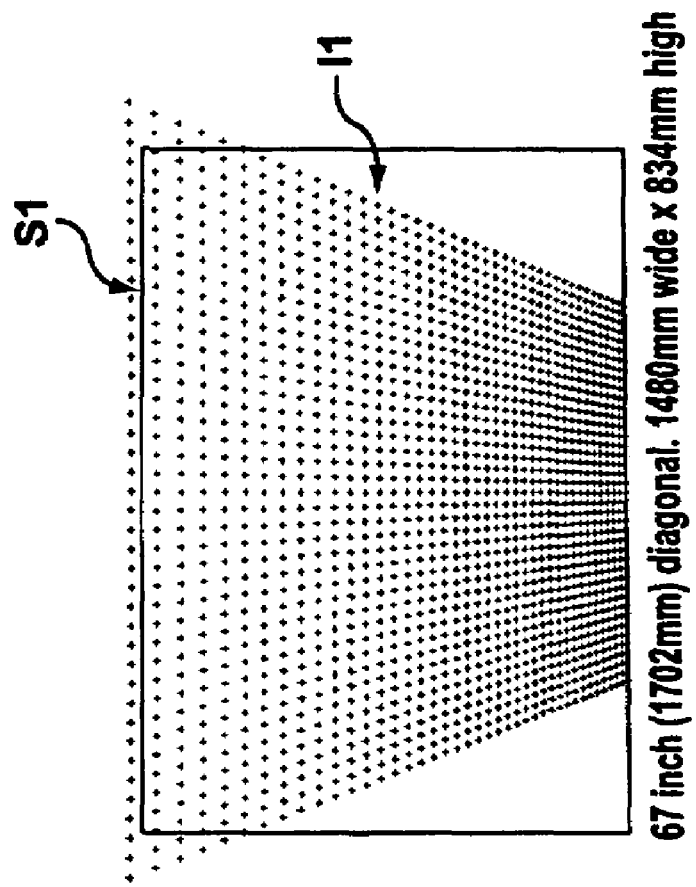
FIGS. 4B, and 4C are distortion plots and focus spot diagrams that illustrate the image distortion and focus spot size associated with the two flat mirror folded rear projection system of FIG. 4A.
Figure 4A:
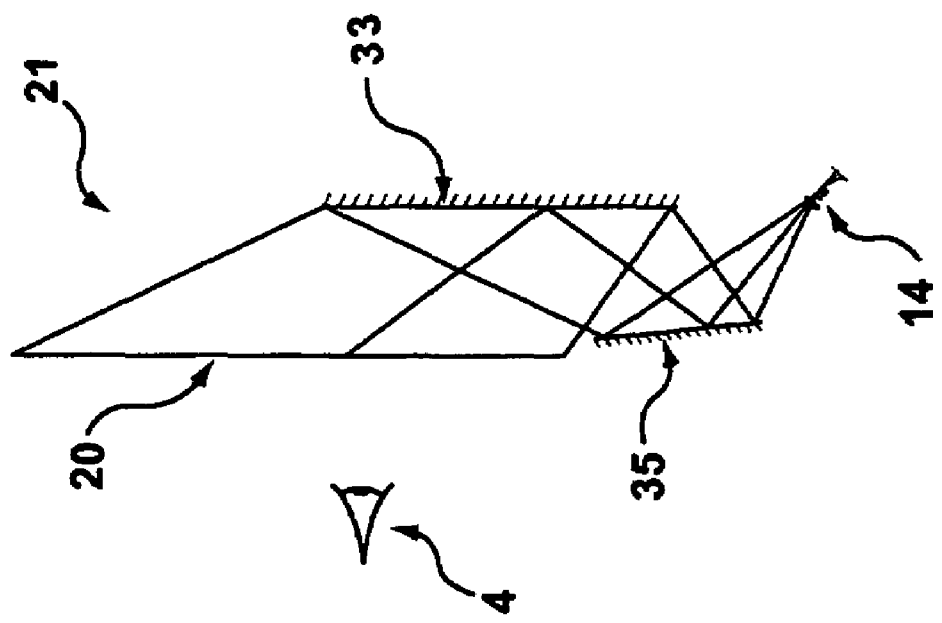
FIG. 4A is a schematic diagram of a two flat mirror folded rear projection system.
Figures 4C, 5:
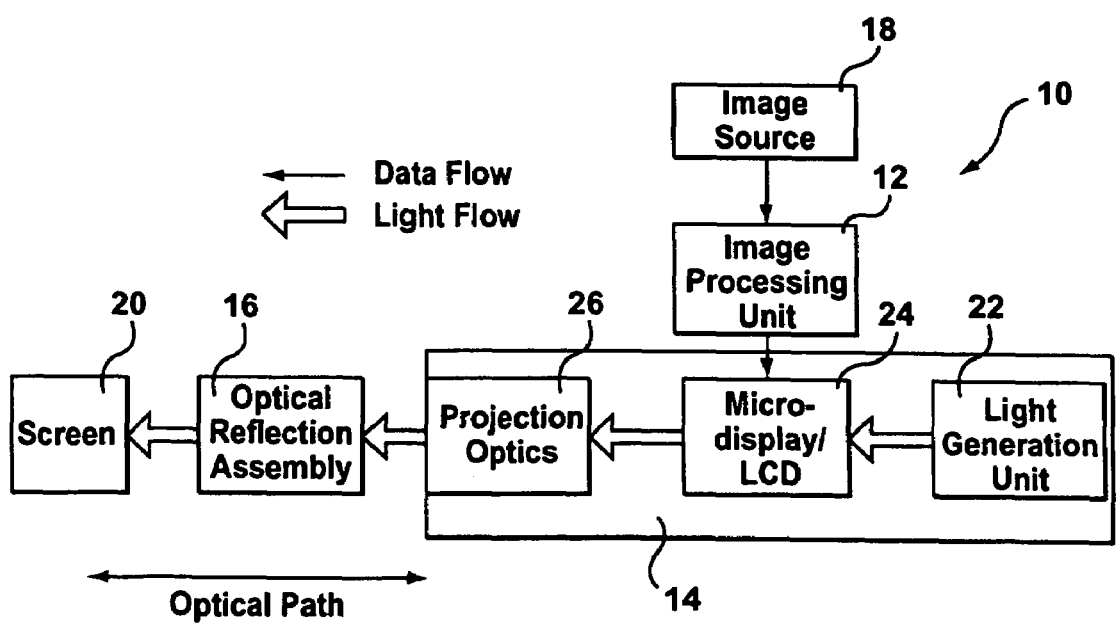
FIG. 5 is a block diagram of the projection system of the present invention.

Referring now to FIG. 4A shown therein is a rear projection system 21 that also uses optical path folding to fit the system within a smaller cabinet and off-axis mirror placement in order to reduce cabinet thickness. Multiple folding using two planar mirrors 33 and 35 allows for a thinner cabinet size while still accommodating the entire projection path length. As shown, the projected image reflects from the secondary flat mirror 35 onto the primary flat mirror 33. The primary flat mirror 33 reflects the projected image onto the back of the display surface 20 for viewing by viewer 4 on the other side of the display surface 20. However, this two flat mirror rear projection configuration still includes substantial keystone distortion. FIG. 4B illustrates how the projected image is undersized at the bottom of the screen, oversized at the top of the screen (i.e. projected image I1 does not fit within screen perimeter S1) and highly distorted. Specifically, as shown in FIG. 4B, this rear projection configuration is associated with a keystone distortion of 65%. Also, FIG. 4C illustrates how spot size (i.e. de-focus) is approximately 50 mm (far in excess of the desired level of 2-3 mm) along the top edge of display surface 20. Keystone distortion can be somewhat reduced by shifting the micro-display down relative to the projection lens 5 in the projection light engine 14 and the de-focusing can be reduced by tilting the micro-display relative to the projection lens 5. This is illustrated in further detail in FIGS. 19-20.

Figure 6:
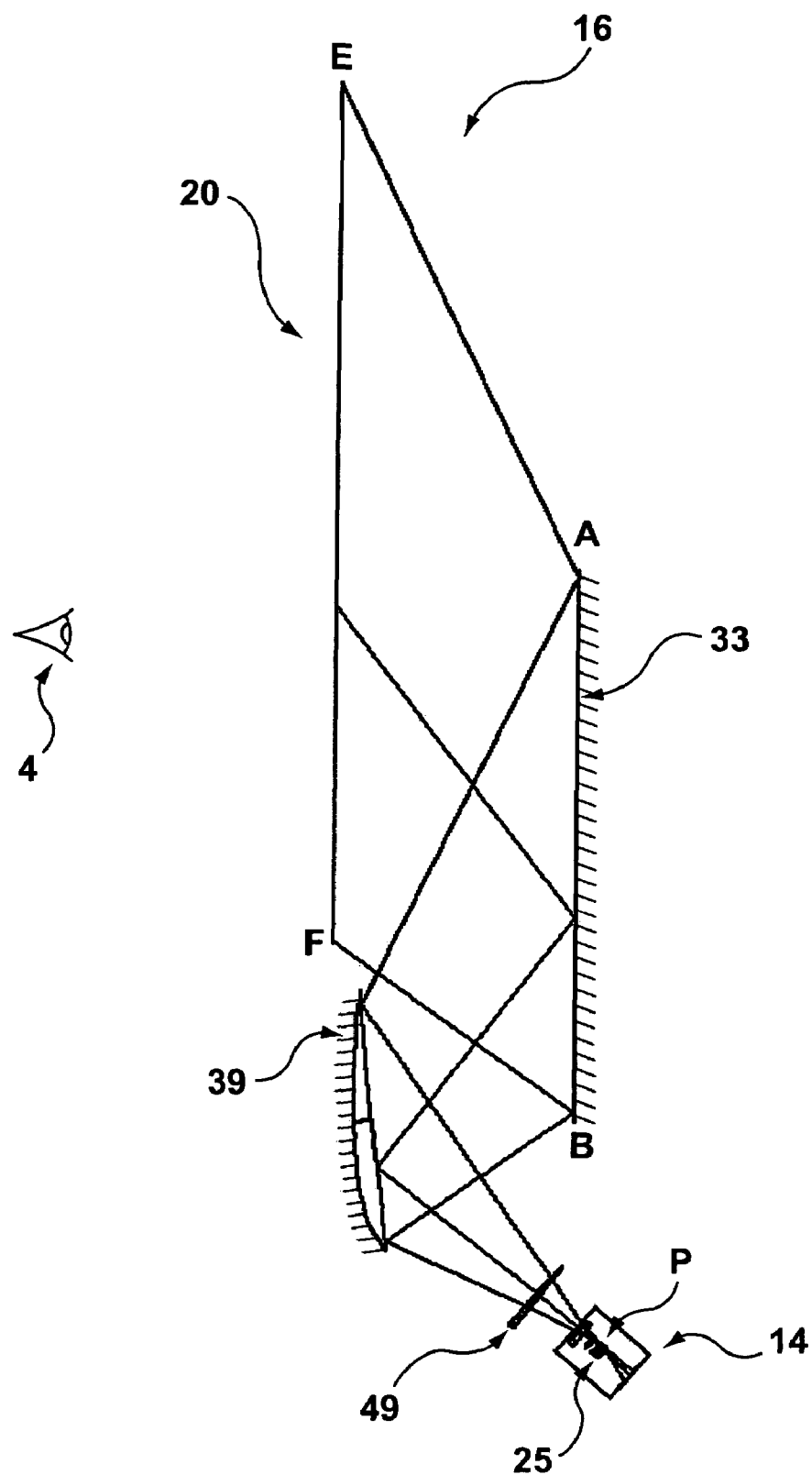
FIG. 6 is a schematic diagram of an example configuration of the projection system of FIG. 5 as a two-fold rear projection system that uses a small aspherical mirror and a corrector lens in sequence.

FIGS. 5 and 6 illustrate a projection system 10 built in accordance with the present invention. Projection system 10 comprises an image processing unit 12, a projection light engine 14, and optical reflection assembly 16 which transforms image data representing an input image provided by image source 18 into a distortion-compensated optical image for projection onto a display surface 20 such that the displayed optical image is a non-distorted image.

Image source 18 can be a video camera, a personal computer, or any other device capable of producing an image in the required video/graphics format (e.g. YPrPb, RGB, DVI, etc.)

Image processing unit 12 receives input image data from image source 18 and digitally warps, or distortion-compensates, this data to compensate for optical distortion in the projection system 10, such that the image displayed on surface 20 is distortion free. Image processing unit 12 also corrects for any brightness/luminance non-uniformity in the displayed optical image. Image processing unit 12 applies electronic correction to the digital image data that is provided to the projection light engine 14 thereby allowing for digital fine-tuning of the data. The specific workings of image processing unit 12 will be discussed in more detail.

Projection light engine 14 receives the distortion-compensated digital image data from image processing unit 12 and generates a corresponding distortion-compensated optical image. Projection light engine 14 contains a light generation unit 22, a micro-display 24 and projection optics 26. The light generation unit 22 (also known as an illumination subsystem) includes components (not shown) such as a light source (e.g. an ultra-high pressure arc lamp, RGB light emitting diodes or RGB lasers), color separation prisms, a parabolic reflector, an integrator rod and/or an integrator/collimator. The micro-display 24 can be any commercially available micro-display based light-modulating subsystem (e.g. a 1 or 3 panel LCD, 1,2, or 3 panel DLP™, 1 or 3 panel LCOS, etc. including the micro-display specific interface ASICs) with an appropriate color management system (i.e. a color wheel, a polarizing prism and color select filters, etc.). The micro-display device 24 is used to generate an optical image by modulating reflected/transmitted light according to the distortion-compensated digital image data generated by the image processing unit 12. In fact, the illumination subsystem generates a beam of light shaped to uniformly illuminate the light-modulating micro-display device(s), with color management and/or polarization recovery components as appropriate. The light-modulating micro-display device(s) are positioned in front of the illumination subsystem in order to convert digital image data to an optical image. The projection optics 26 consists of lenses that project and focus the distortion-compensated image.

Projection optics 26 may consist of fixed focal length long-throw or short-throw lenses, or a variable focal length zoom lens. Also, the projection angle of projection optics 26 may be of normal or wide field of view (FOV). The invention does not require the projection optics 26 to be distortion free as any distortions in projection optics 26 and curved mirrors are corrected by digital image processing. Projection optics 26 may also include a corrector lens 49 that is mounted on projection lens 25 and which is accordingly, positioned in the optical path of the distortion-compensated optical image between the projection lens 25 and optical reflection assembly 16. The function of the corrector lens 49 will be further discussed. A portion of the front edge of projection light engine 14 is represented by reference numeral 14a. Corrector lens 49 may be eliminated if projection optics 26 is custom built as discussed further below.

Optical reflection assembly 16 receives the light beam from projection light engine 14 that consists of a distortion-compensated optical image and reflects it onto display surface 20. FIG. 6 shows the specific elements of the optical reflection assembly 16 in more detail. As shown, the optical reflection assembly 16 consists of an aspherical mirror 39 and a primary flat mirror 33. The aspherical mirror 39 is an aspherical asymmetrical (or rotationally non-symmetrical) curved mirror which is used in association with primary flat mirror 33 to fold the optical path. Such a mirror is the most effective and direct way to compensate for severe keystone distortion (the kind that is encountered at high DtoD ratios) because the keystone distortion itself is asymmetrical. In keystone distortion, there is different magnification of the image at the top of the image relative to the bottom of the image. Prior art methods are restricted in the amount of keystone distortion correction (and hence DtoD ratios improvement) because the prior art methods only use micro-display offset to correct for keystone distortion and symmetric mirrors/lenses because of the requirement that all distortion must be corrected with optical means. The primary purpose of the aspherical mirror 39 is to reduce distortion due to off-axis projection and allow use of all the available micro-display pixels and light from the illumination source. The aspherical mirror 39 can also be used in projection systems that apply micro-display shift to correct for any left-over distortion that is not corrected by the micro-display shift. As discussed above, corrector lens 49 of projection optics 26 is positioned in the optical path of the distortion-compensated optical image between the projection lens 25 and the aspherical mirror 39 to correct for beam width divergence and to control associated de-focusing distortion, as will be discussed. Corrector lens 49 is also an aspherically curved, rotationally non-symmetric lens.

The display surface 20 is designed to receive light at high and varied angles of incidence and to either reflect or transmit light perpendicular to the display surface 20. The display surface 20 is reflective in a front projection system or transmissive in a rear projection system. In a conventional rear projection system, a Fresnel lens is used to receive the light impinging onto the display surface 20 at a non-perpendicular angle and change its direction to exit normally through the plane of the display surface 20 towards the viewer, or, in other words, to collimate the light. In a conventional rear-projection system, the center of the Fresnel lens will be at the center of the display surface and there is a radially symmetric distribution of incidence angles on the display surface.

In an RP (rear-projection) off-axis system designed according to this invention, a Fresnel lens will be needed as well, but it must deal with an asymmetrical distribution of angles of incidence of light striking the display surface, because of the off-axis projection geometry. This forces the center of the Fresnel lens to be considerably offset downwards from the center of the display surface, the degree of offset being dependent on the DtoD ratio of the system (amount of off-axis geometry being used). Thus, Fresnel lenses that are used in off-axis projection systems are not symmetrical. These asymmetrical Fresnel lenses must be designed to collimate light from a much larger cone of projected light that includes, in particular, the off-axis light path being designed for. In fact, in systems with a higher DtoD ratio, the projection axis is more inclined, requiring more keystone distortion to be corrected. This means that a wider cone of light emanates from the micro-display with a larger spread of incident light angles between the bottom and top of the display surface. The optical axis of this cone of light must pass through the center of the Fresnel lens, and the center of the Fresnel lens becomes offset downwards to a greater degree in order to satisfy this optical requirement. In a projection system with an extreme off-axis configuration, the optical center of the Fresnel lens might be off the screen entirely. Consequently, the diameter of the Fresnel lens will be much bigger than the screen diagonal, and a rectangular piece is cut out of it to be laminated with the screen. Obviously, if only one usable Fresnel lens segment can be extracted from the larger diameter structure, the cost of the lens is higher. In some asymmetrical Fresnel lens designs, more than one usable lens segment may be cut out of the basic large diameter complete Fresnel lens, helping to amortize the cost of machining the molds that are used to make the Fresnel lenses.

Figure 7A:
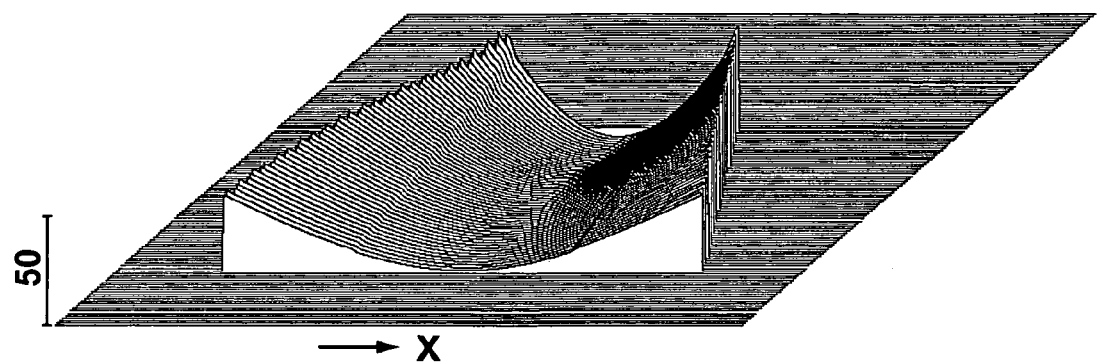
FIGS. 7A-7B illustrate the mold profile from which the small aspherical mirror of FIG. 6 is made.
Figure 7B:
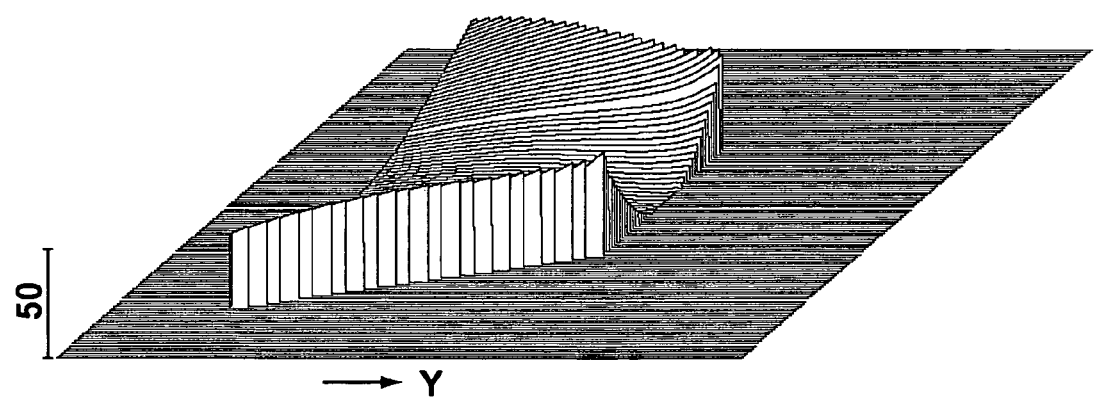
Figure 7C:
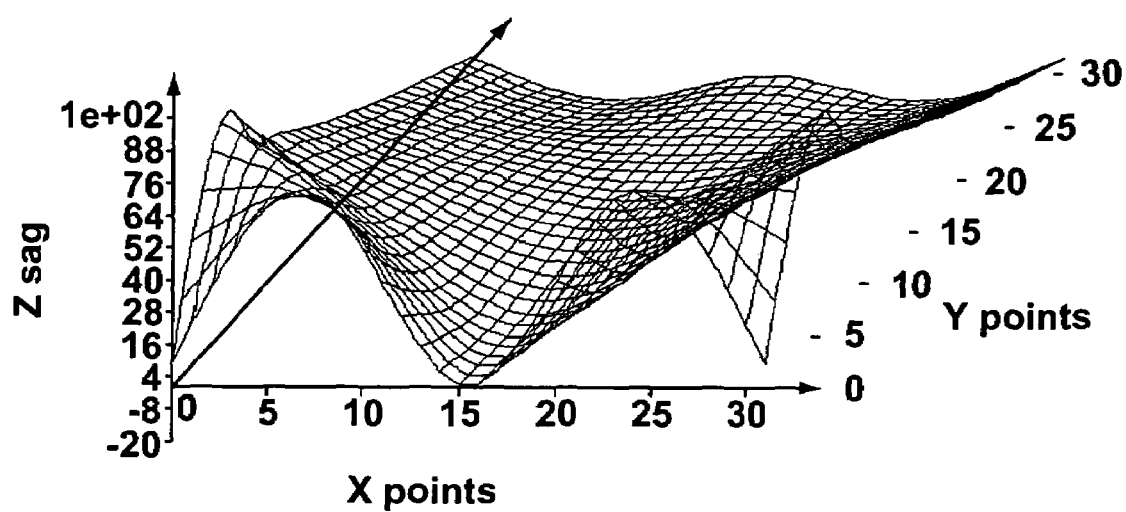
FIG. 7C illustrates a mirror surface from which the small aspherical mirror of FIG. 6 is cut out.

FIGS. 7A-7C illustrates the surface curvature of the aspherical mirror 39 of FIG. 6. The aspherical mirror 39 has been introduced to correct for the keystone distortion which results from the off-axis nature of the projection system 10. The aspherical mirror 39 is designed based on the knowledge that reflection of an image from a concave surface will shrink the image and reflection of an image from a convex surface will expand the image. For example, in FIG. 3B, the image has expanded horizontally beyond the width of the display surface at the top of the display surface. In addition, the image has horizontally shrunk to less than the width of the display surface at the bottom of the display surface. A mirror with a concave upper portion could shrink the image to fit on the display surface, while the same mirror, if it had a convex lower portion, could expand the image to fit at the bottom of the display surface. In practice, with an off-axis projection scheme, it is preferable to move the projection system a little closer to the display surface so that the top part of the image becomes less than or equal to the horizontal display surface width, and adjust the mirror shape accordingly. This has the double benefit of reducing the projection distance (which can lead to less cabinet thickness in a folded geometry configuration) and an easier mirror profile to fabricate since the mirror is convex-only, instead of having a concave-to-convex transition. In reducing the projection length, the lens of the projection light engine becomes more of a wide-angle lens which is harder to design and has more spherical aberrations that need to be corrected. Consequently, it is beneficial to iteratively try several different combinations of projection length, projection lens and curvature of the aspherical mirror 39 in order to determine the optimal configuration.

Accordingly, the aspherical mirror 39 of the present invention is designed with a mild horizontally convex upper portion to produce a very slight horizontal enlarging effect (i.e. the projection path has been shortened) at the top of the display surface 20 and a horizontally more convex lower portion to horizontally enlarge the bottom of the display surface 20 to a greater degree. The aspherical mirror 39 is also vertically concave to compensate for the vertical stretching of keystone distortion. Accordingly, the aspherical mirror 39 has a vertically oriented concave surface and a horizontally oriented surface which varies from being more convex to flat or less convex. For clarity, FIG. 7A shows the curvature in the horizontal direction of the mold from which aspherical mirror 39 will be made and FIG. 7B shows the curvature in the vertical direction of the aspherical mirror 39 mold. FIG. 7C shows a perspective view of the curvature of the aspherical mirror 39 with the horizontal direction shown extending into the page (i.e. along the Y-axis), the vertical direction extending from left to right and the height (or thickness) of the curvature represented by the z axis. The actual active area of the mirror is smaller than shown in FIG. 7C., but the plot is useful for seeing the effect of changing the coefficients that describe the surface profile of the aspherical mirror 39. The horizontal radius of curvature of the aspherical mirror 39 transitions from a large positive value at the top (i.e. low curvature), to a smaller positive value (i.e. more curvature) at the bottom. The vertical radius of curvature is selected to correct for vertical scaling errors that are caused due to keystone distortion.

The overall shape of the aspherical mirror 39 is determined by initial and final radii and the rate of transition, and from the foregoing description, clearly is rotationally non-symmetric, though it is laterally symmetric about a vertical axis. The specific surface profile of the aspherical mirror 39 is chosen by trading off the corresponding projection lens design, the desired distortion to be corrected by electronic means, the desired effective display resolution and the cabinet depth. Accordingly, it is possible that an aspherical mirror could be designed that is vertically concave, and has a horizontal curvature that varies from being concave in the upper portion of the mirror, to flat, to convex along the lower portion of the mirror. For example, a rear projection television (RPTV) manufacturer who wishes to use the same projection lens being used in a conventionally configured system would need a corrector lens and due to constraints imposed by the physical dimensions of the existing projection lens might choose a different diagonal to depth ratio (and cabinet depth) than another RPTV manufacturer who is willing to design a new projection lens for this application. Another example would be an RPTV manufacturer with an inventory of flat mirrors that might constrain the dimensions of the cabinet, and thus, indirectly, the prescription of the aspherical mirror 39.

If the cabinet depth is reduced, the angle between the aspherical mirror 39 and the projection lens 5 becomes shallower, leading to increased keystone distortion which needs to be corrected. Consequently, the curvatures of the aspherical mirror 39 need to become more extreme, as they need to correct more severe upper horizontal expansion and more severe lower horizontal contraction and more severe vertical expansion. The aspherical mirror 39 becomes larger and thicker in order to accommodate a larger amount of curvature. In this case, the corrector lens 49 is also modified to incorporate more of a curvature to correct for the added de-focusing effect that is produced due to the increased curvature of the aspherical mirror 39.

The aspherical mirror 39 can partially or fully correct for keystone distortion in an off-axis projection system. In such a system, flat mirrors offer no correction. Decreased keystone distortion is achieved by using the convex surface portion of the aspherical mirror 39 to magnify the image (horizontally to a greater or lesser degree) and the concave surface portion of the mirror to shrink the image vertically. By smoothly varying the sign (convex or concave) and magnitude of the curvature, the keystone-shaped distortion plot is converted to a more or less rectangular distortion plot. If the aspherical mirror 39 and corrector lens 49 are properly designed together, it is much easier for the image processing unit 12 to maintain quality (i.e. brightness and focus) of the pixels near the edges of the display surface 20. However, the aspherical mirror 39 also leads to the compounding of field curvature issues, namely spot size/focus problems wherein the center of the image has a reasonable MTF and focus, but the edges of the image experience de-focusing and a reduced MTF.

Figure 8A:
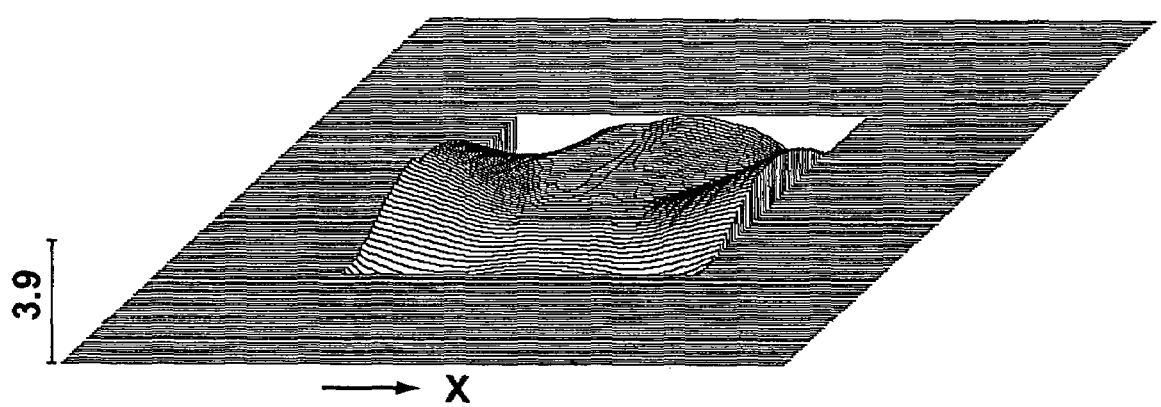
FIGS. 8A-8C illustrate the surface curvature of the corrector lens of FIG. 6.
Figure 8B:
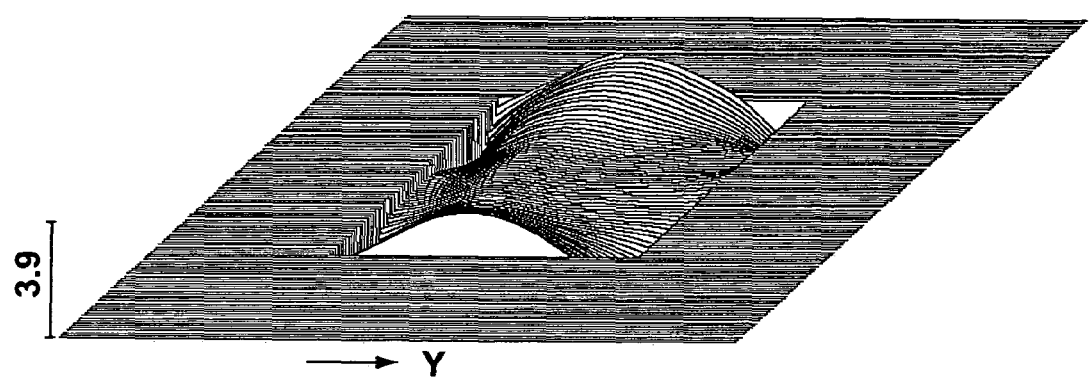
Figure 8C:
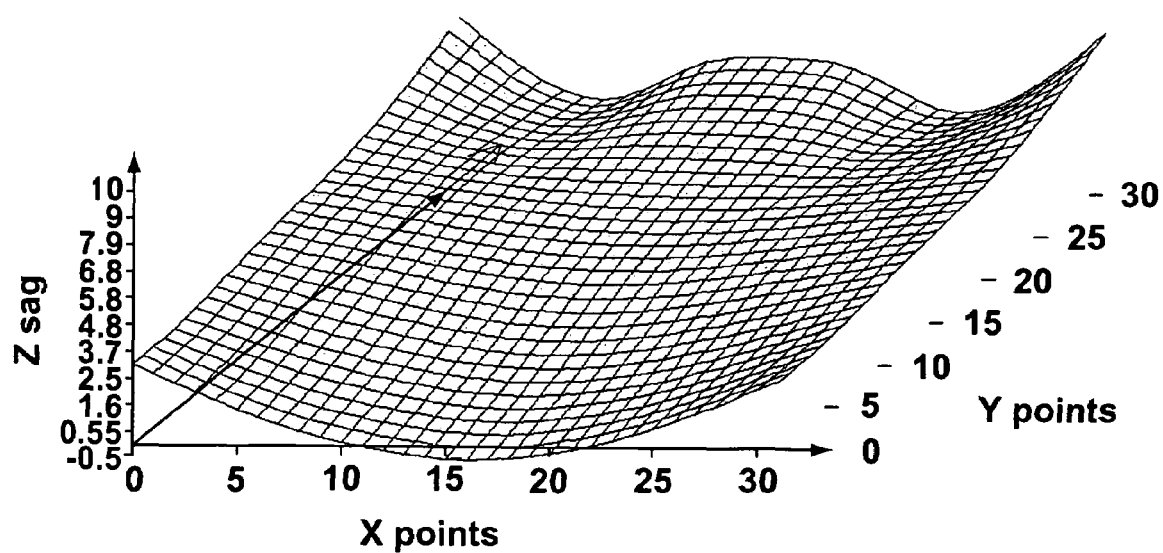

FIGS. 8A-8C illustrate the surface curvature of the corrector lens 49 of FIG. 6 that is used (along with shifting and tilting the micro-display device 24 relative to projection lens 25 or vice-versa) to decrease the de-focusing (i.e. beam spreading) of the light beam projected by projection lens 5 onto the aspherical mirror 39. The corrector lens 49 is also an aspherically curved, non-rotationally symmetric lens that corresponds to the curvature of the aspherical mirror 39, and is designed for use with the projector lens 5 that is being used in the projection system 10. Specifically, the corrector lens 49 is designed to be positioned in front of the projection lens 5, as shown in FIG. 6. FIG. 8A shows the curvature of the corrector lens 49 in the horizontal direction and FIG. 8B shows the curvature of the corrector lens 49 in the vertical direction. FIG. 8C shows a perspective view of the curvature of the corrector lens 39 with the horizontal direction shown left to right, the vertical direction extending into the page (i.e. along the Y-axis) and the height (or thickness) of the curvature represented by the Z-axis. The shape of the corrector lens 49 is similar to the shape of the aspherical mirror 39 and will also be rotationally non-symmetric and laterally symmetric about the vertical axis. In particular, the corrector lens 49 is a horizontally convex cylindrical lens that transitions from a smaller radius of curvature to a larger one and also has a vertical concave shape. However, the corrector lens 49 is flatter (i.e. has larger radii of curvature in both horizontal and vertical directions).

The corrector lens 49 is formed with larger radii of curvature than the aspherical mirror 39 and corrects for beam-width spreading and compensates for the characteristics of the projection lens 5. The use of the corrector lens 49 also allows the possibility of currently available projection lenses 5 to be adapted for use (i.e. retrofitted) within the projection system 10 of the present invention providing the currently available projection lens 5 meets with minimum performance and dimensional criteria (i.e. lens speed, MTF, ability to fit within smaller enclosures, etc). Custom projection lenses for the system, which will be described in further detail, can be developed that include the corrector lens capability, thus eliminating the need for a separate corrector lens component and ensuring proper fit. Also, it should be understood that image processing unit 12 is used to provide electronic correction that corrects for the combination of remaining uncorrected distortion due to the projection lens 5, the corrector lens 49, the aspherical mirror 39, the off-axis projection geometry, and installation misalignments. Accordingly, the image processing unit 12 provides an additional degree of freedom that can compensate for any physical inaccuracies or misalignments in the projection system 10.

With respect to FIGS. 6-8, exemplary dimensions for the various components will now be given. For the corrector lens 49, the first surface sag is 4.58 mm, the second surface is piano and the distance from the last lens surface in the projection lens is 11 mm (center ray). For the curved mirror 39, the mirror sag is 33.5 mm, the tilt angle is −46.4 degrees, the distance from the last corrector lens surface in the projection lens is 201.7239 mm (center ray) and the X,Y corner coordinates, in mm, are: (295.528198, 276.941671), (141.557812, −87.435980), (−141.557812, −87.435980) and (−295.528198, 276.941671). For the mirror 33, the tilt angle is +51.2 degrees, the distance from the curved mirror 39 is 298.775 mm (center ray) and the X,Y corner coordinates in mm are: (713.058886, 579.509103), (611.018382, −235.682721), (−611.018382, −235.682721) and (−713.058886, 579.509103). For the display surface 20, the tilt angle is 0 degrees, the distance from the mirror 33 is 384.2278 mm (center ray) and the size is 1480 mm wide by 834 mm high with a 1702 mm diagonal.

Figure 9A:
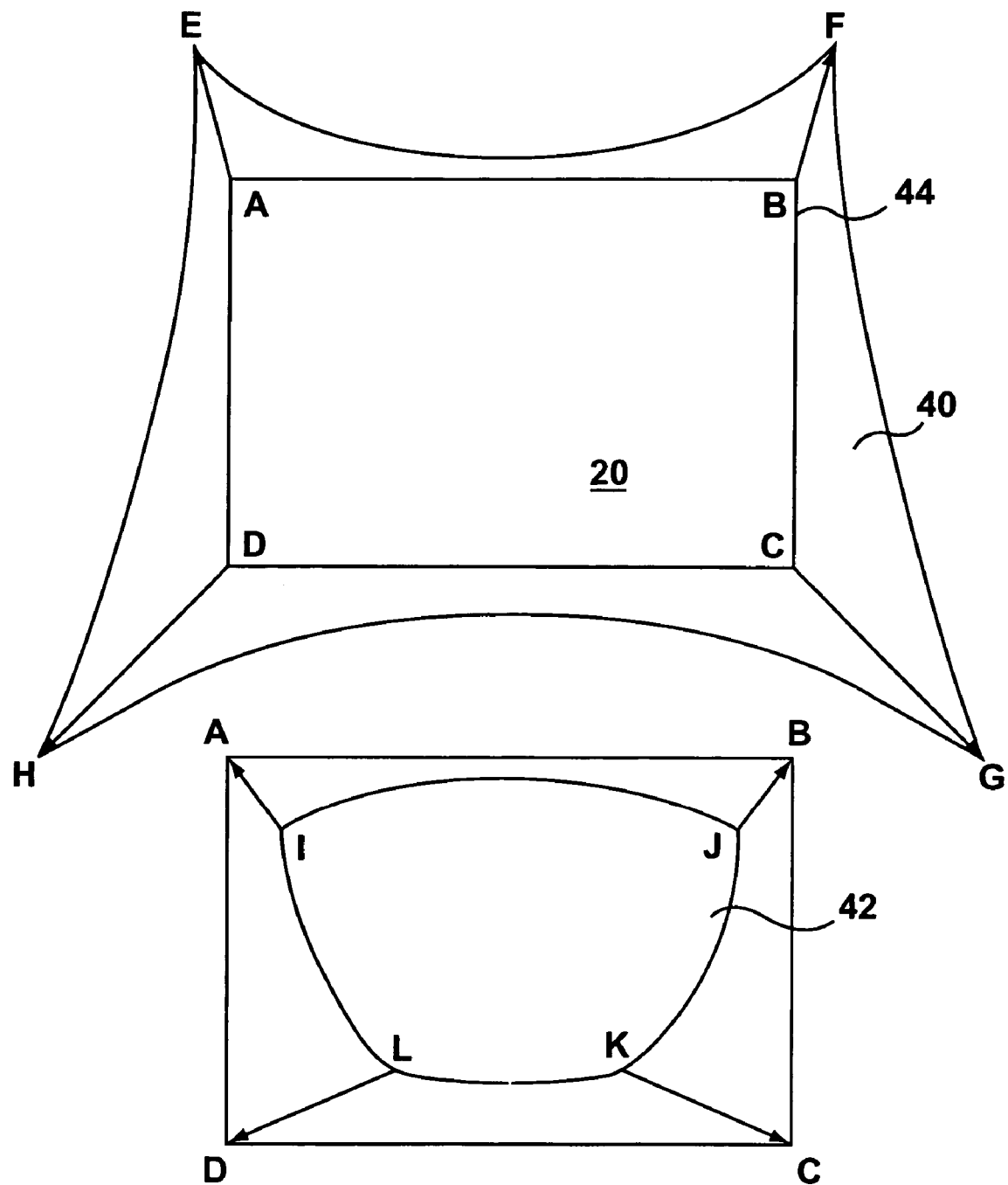
FIG. 9A is a diagram of a distortion-compensated image produced by the projection system of the present invention (the lower panel shows the image that is generated by a display device and the upper panel shows the resulting ideal image at the display screen)
Figure 9B:
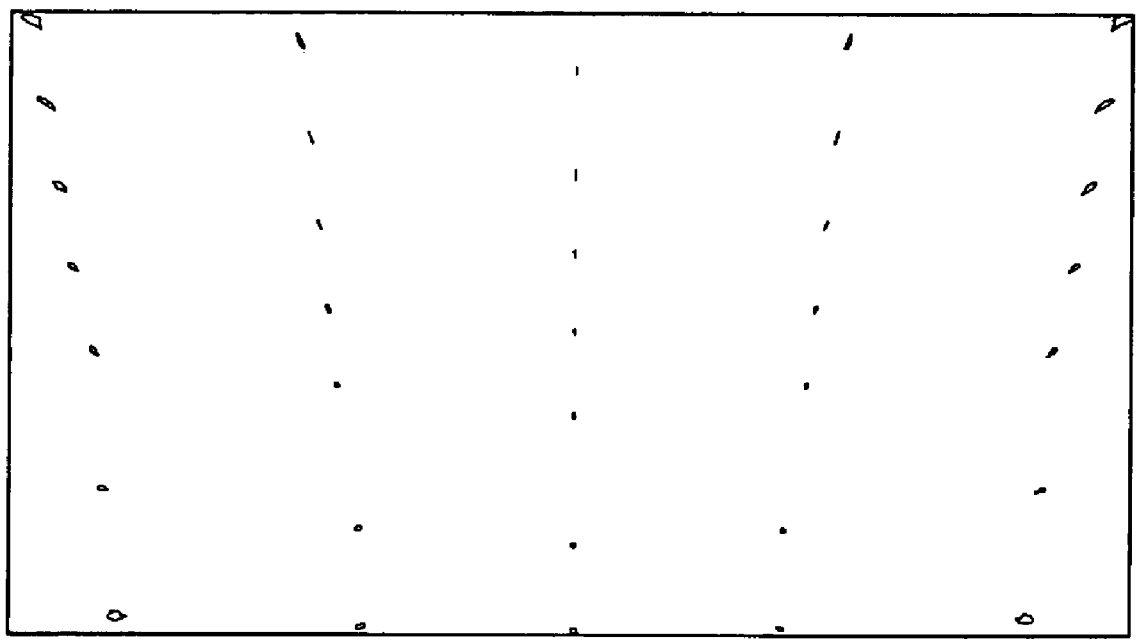
FIG. 9B is a focus spot diagram of an image of a rectangular matrix generated by a display device and seen at the flat mirror.

Referring now to FIG. 9B, shown therein is a focus spot diagram of an image on the flat mirror 33. The image was a rectangular 5×7 matrix of points that was generated by the micro-display device 24, and projected by the projection light engine 14 through the corrector lens 49 and the aspherical mirror 39. Increasing the degree of convex curvature near the bottom of the aspherical mirror 39 will cause the points to spread out near the bottom of FIG. 9B while increasing the degree of concave curvature near the top of the aspherical mirror 39 will cause the points to compress near the top of FIG. 9B. It should be noted that FIG. 9B shows focus spot behavior without any effects from electronic correction.

The curvature of the aspherical mirror 39 attempts to correct for the keystone distortion and, as seen at the surface of the flat mirror 33, there is an improvement in distortion reduction. The focus spot diagram shows that there is still a slight keystone effect as well as a de-focusing effect for the points near the edge of the image. This slight keystone effect can be corrected by placing the display surface 20 at a certain distance from the flat mirror 33. However, if the display surface 20 is placed at a larger distance away from the flat mirror 33 then reverse keystone distortion and increased de-focusing occurs. However, another approach to correcting this slight keystone effect can be through electronic means as will now be described.

Now referring to FIGS. 5, 6, and 9A, the image processing unit 12 is used to geometrically apply distortion compensation to an input digital image in such a manner that the displayed optical image is distortion-free.

Specifically, FIG. 9A provides an example of a distorted image 40 that results from the reflection of an ideal image 44 in a curved mirror such as the aspherical mirror 39. While the aspherical mirror 39 corrects for the keystone distortion, there is still some residual distortion that is to be corrected. Also shown is a distortion-compensated image 42 that, when reflected in a curved mirror, will correct or compensate for the distortion caused by the curved mirror and result in the ideal image 44 being projected on the display surface 20. That is, when the distortion-compensated image 42 is reflected in a curved mirror, the ideal image 44 will be projected on the display surface 20. Specifically, in the absence of any correction, the ideal image ABCD will be displayed on the display surface 20 as the curved "trapezoid" EFGH with the corner/boundaries mapped as shown. By compensating the image in the inverse manner, as shown by the "trapezoid" IJKL, the final image displayed will match exactly the screen/ideal image ABCD and accordingly, be distortion free.

Accordingly, the projection system 10 uses the image processing unit 12 to distortion-compensate the input image according to geometric transformations that are the inverse of the geometric distortions (not shown) introduced by the projection light engine 14 and the associated reflection (mirror) optics (not shown). If the full distortion achieved within projection system 10 (due to lenses/mirrors) is represented by the transformation F, then the image is distortion-compensated according to $F^{-1}$, and the following relation exists:

$$\text{Displayed Image} = F(F^{-1}(\text{Input Image})) = \text{Input Image} \qquad 2)$$

Accordingly, the image processing unit 12 essentially "frees" the system of constraints associated with the requirements for a distortion-free displayed image. The ability to digitally correct distortions means that the optical geometry and the optical elements (such as angles, types of the mirror(s) and lenses, whether the curved mirror is rotationally non-symmetric or not, etc.) can be varied as needed for particular design objectives. Without geometric correction provided by the image processing unit 12, distortions within the displayed image will result due to the various optical processing steps. The distortion compensation applied by the image processing unit 12 is essentially a re-sampling/filtering of the input image data. The pixels are resampled according to $F^{-1}$, which gives the geometric transformation that the pixel positions undergo. The transformation $F^{-1}$ can be determined from the spatial transforming properties of the various optical elements. The specifics of the image processing unit 12, will determine the format in which $F^{-1}$ needs to be specified (e.g. in terms of 2D surfaces, 1D polynomials, etc.).

The image processing unit 12 is also used to correct for brightness or luminance non-uniformity. The displayed image on the display surface 20 may have brightness variations due to limitations of the projection light engine components (e.g. light generation unit, lens vignetting, etc.) or due to properties of the optical path. In particular, points or sections illuminated on the display surface 20 are illuminated by light that travels different distances from the projection lens, considering the entire path including reflections and corrector lens refraction. Since the intensity of light falling on a point or section of the displayed image varies inversely with the square of the distance traveled by the light, this leads to brightness variations within the displayed image. In an off-axis projection system, there are more pronounced differences in the path length traversed by light rays impinging at the top of the screen versus the bottom of the screen. Consequently, the brightness variations are greater for an off-axis projection system rather than an on-axis projection system.

The image processing unit 12 is used to pre-adjust the pixel brightness, prior to projection, so that the final image can be displayed with uniform brightness. The pixel brightness is pre-adjusted in color space according to a predetermined map, say $G^{-1}$, similar to $F^{-1}$ and provides the locations of the pixels in the display surface 20. This map only acts in the color space and no additional filtering is needed (i.e. only the pixel color values, not the pixel positions, are adjusted). As for $F^{-1}$, $G^{-1}$ can be determined from the brightness/luminosity transforming properties of the various optical elements and optical patch. The image processing unit 12 will apply $G^{-1}$ to each pixel's color value. A simple case is given by a linear function: $G^{-1}(O) = \alpha O + \beta$, where O is an RGB color value and the functional parameters $\alpha$ and $\beta$ are constant for every pixel. The electronic correction of projection system 10 allows for a more flexible choice of optical lenses, since any associated distortions will be eliminated by pre-warping, rather than by matching the optical properties of the lenses. In particular, wide-angle lenses can be used, which can project the same sized image, but at shorter projection distances, hence providing another variable in reducing the throw ratio. Note that focus problems (as opposed to geometrical problems) cannot be corrected by geometric distortion compensation and still need to be addressed optically by appropriate choice of lenses.

Without the general electronic geometry correction achieved by the image processing unit 12, the projection system 10 must be designed to ensure that the overall image distortion is acceptable. Such design constraints can be problematic, due to distorting effects of the curved mirror, the off-axis projection (keystone effects), and wide-angle lens. The present invention's use of electronic correction allows for geometric distortion (as well as brightness non-uniformity) to be eliminated from the design constraints for a projection system and instead these prior limitations can be considered to be a design "degree of freedom". Accordingly, the image distortion of the optical path can be freely modified in order to improve other aberrations. Further, digital correction (via distortion-compensation) of the input signal can be used to compensate for this, and thus an undistorted image can be produced on the viewing screen.

It should be noted that by providing three independent image processing units, each acting on a specific passband of light, for example, R, G, and B, the distortion compensation characteristics for each of these passbands may be individually adjusted. This allows for the correction of problems such as lateral color shift or chromatic aberrations which are due to optical effects, for example, refractive index, which have different values for different wavelengths of light. In order to take advantage of this technique, means must be provided to separate the passbands of interest (color bandpass filters, for example) at the light source, so that the light modulators are subject to specific compensatory processing that is synchronized to the separate passbands of light being modulated by them. Both field-sequential or 3-panel parallel light-modulation schemes are amenable to this approach. Schemes that use more than 3 colors in their color space may be similarly treated. This approach trades off electronics costs against optics and alignment costs and promises to be increasingly cost-effective since processing costs are continually dropping but optics and labor costs (involved in alignment) are increasing. If luminance compensation is also applied for each passband, then the spectral characteristics of the illumination source (e.g. high intensity discharge light using ultra high pressure gases and small arcs, for example) can be adjusted to have more desirable characteristics (more uniform instead of exhibiting peaks, for example).

Using a curved mirror for reflection results in a screen image that is still distorted according to a combination of a reduced keystone effect and pincushion/barrel type effects. Accordingly it is extremely difficult to compensate for these types of distortions simply by selective arrangement of the optical elements. With the electronic geometric correction of projection system 10, these distortions can be eliminated. Referring back to FIG. 9A, an example of a distorted screen image 40 that might arise due to reflection of a curved mirror and the corresponding distortion-compensated image 42 that will serve to correct the geometric distortion is shown. However, the benefit of using a curved mirror within the reflection optics assembly 16 is that keystone distortion can be reduced while preserving the use of most or all of the available pixels in the micro-display.

Now referring back to FIGS. 5 and 6, the image source 18 provides the image processing unit 12 with digital input image data, which is then processed by the image processing unit 12 until an appropriate distortion-compensated image is generated. The distortion-compensated digital image data is then provided to the projection light engine 14 for light modulation and subsequent projection by the projector lens 5 at point P into the optical reflection assembly 16. The distortion-compensated optical image gets distorted in the lens (from spherical aberrations, and the like as well as lens shift and/or tilt as is described later on) and then is reflected first by the aspheric mirror 39, but the keystone distortion from the off-axis angle fills the image out properly and the distortions from reflecting off the curved surface perform the final corrections of the image so that after the image gets past the primary flat mirror 33 of the optical reflection assembly 16 onto the display surface 20 for viewing by the viewer 4, it looks undistorted.

The projection light engine 14 accepts the distortion-compensated digital image data from the image processing unit 12 and generates a modulated beam of light that passes through the corrector lens 49 that is used to decrease the de-focusing that is introduced by the aspherical mirror 39. The corrector lens 49 corrects for beam-width spreading due to the characteristics of the projection lens 5 and the aspherical mirror 39. Once the projected image passes through the corrector lens 49, it strikes the aspherical mirror 39 and is reflected by it. The reflected image then strikes the primary flat mirror 33 (running from A to B) that reflects the distortion compensated image onto the display surface 20 (running from E to F). Since the aspherical mirror 39 gradually changes from a more convex cylindrical surface to a less convex cylindrical surface, the projected image provided to the primary flat mirror 33 is partially corrected for the effects of keystone distortion, namely, the variation of horizontal scaling from the top of the display surface to the bottom of the display surface. In addition, the concave vertical curvature of the aspherical mirror 39 partially corrects for the vertical expansion of the image due to keystone distortion. The partial distortion correction of the aspherical mirror 39 is not a problem because the image processing unit 12 provides electronic correction to compensate for the remaining distortion as well as any mis-alignments. This is in contrast to prior art systems in which electronic means for mis-alignment correction are not used. Rather, the prior art uses elaborate optical, mechanical, and thermal techniques to ensure correct alignment at initial assembly and continued alignment even under mechanical vibration and temperature variations.

The four points and the trapezoid they define on primary flat screen 33 must then be reflected in a manner such that the area enclosed by the "trapezoid" (now curved because of reflection from a curved surface) in the plane of the screen fully encloses the screen on the display surface 20 (as shown in FIG. 9A where the trapezoid EFGH fully encloses the screen ABCD). This ensures that after electronic correction by the image processing unit 12, the displayed image covers exactly the rectangular screen on display surface 20.

Another approach may be to design the light-modulating display device of the projection light engine 14 with pixels shaped to fit a pre-defined distortion-dependent shape which maintains full resolution at the screen after the light traverses the complete optical path. The shape is such that, after the light beam impinging on the micro-display device has been modulated, the light beam passes through the projection lens, reflects from the curved mirror and strikes the display surface with the proper aspect ratio, overlaying the entire rectangular extent of the display surface. For optimal use of available light, the light beam impinging on the micro-display can be shaped to conform to the shape of the micro-display. This can be achieved by using total internal reflection integrator rods that are shaped similar to the micro-display surface, for example.

Figure 10A:
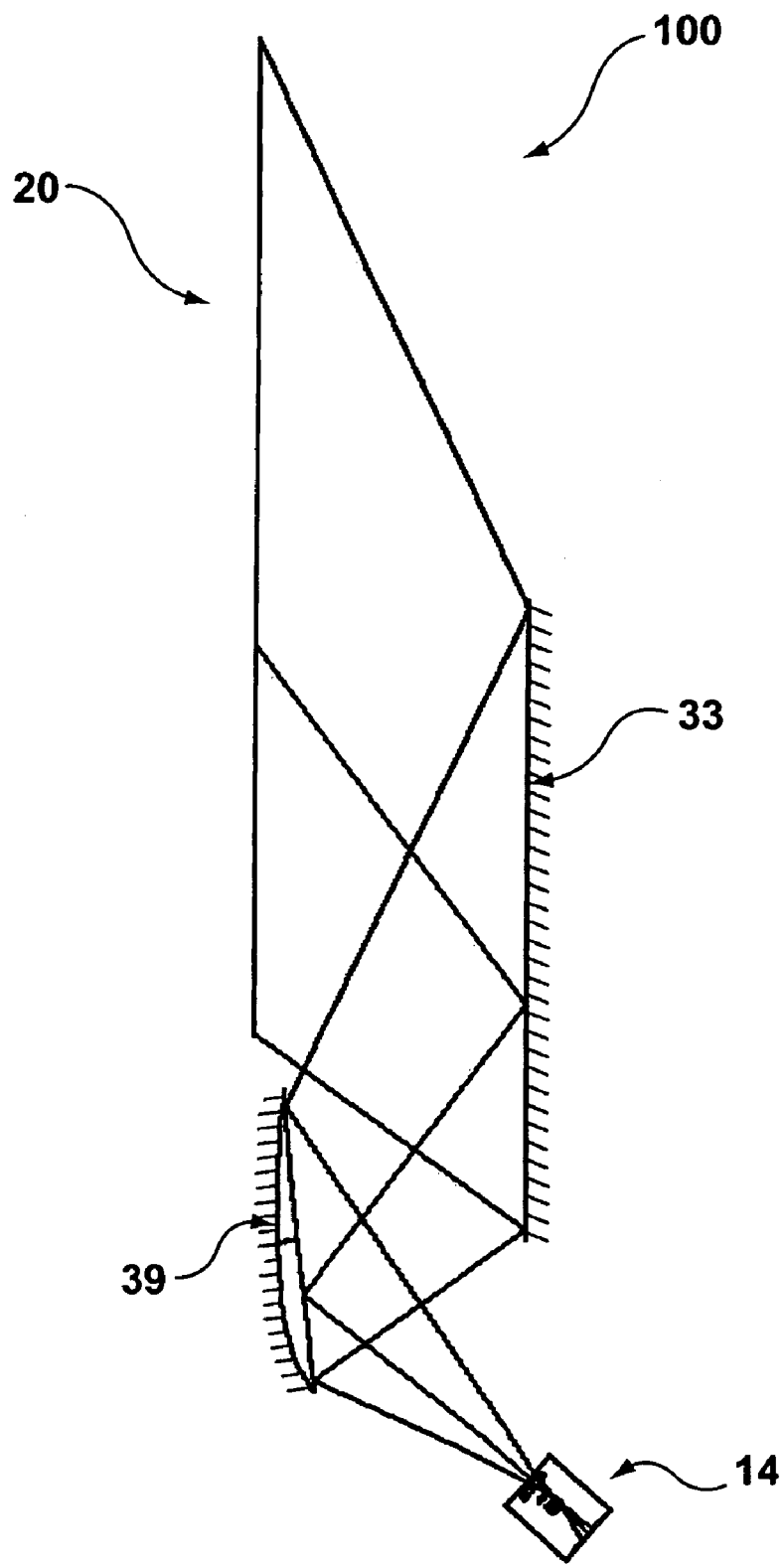
FIG. 10A is a schematic diagram of the two-fold rear projection system of FIG. 6 using a small aspherical curved mirror alone.
Figures 10B, 10C:
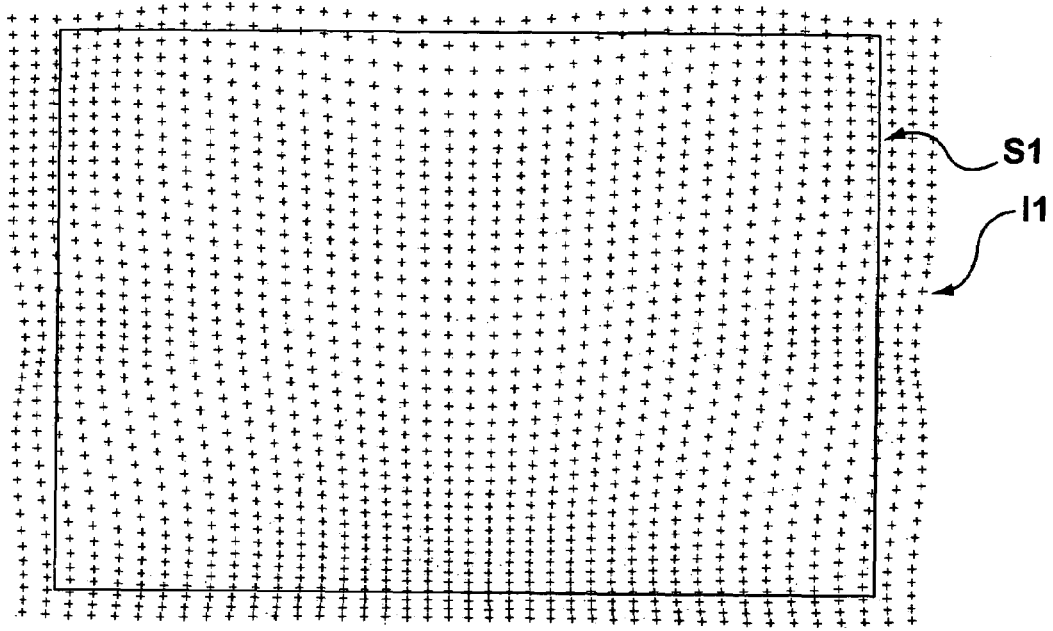
FIGS. 10B, and 10C are plots that illustrate the image distortion and focus spot performance associated with the folded rear projection system of FIG. 10A.

For illustrative purposes, the importance of the corrector lens 49 within the projection system 10 of the present invention can be seen from a performance comparison between the projection system 10 and a similar projection system 100 (both systems use conventional projection lenses), the only difference being the absence of corrector lens 49. The projection system 100 is shown in FIG. 10A and the various performance results are illustrated in FIGS. 10B, and 10C. Specifically, it can be seen that without the use of the corrector lens 49, while the distortion plot (see FIG. 10B) shows relatively reasonable levels of keystone distortion (due to the use of the aspherical mirror 39), FIG. 10C shows that de-focusing is severe. Specifically, FIG. 10C illustrates how the focus spots are approximately 5 mm (5 pixel spans) at the center of the display surface 20 area and that they are approximately 30 mm (30 pixel spans) at the edges of the perimeter of the display surface 20. The focus spot size exceeds 20 mm at the perimeter edges of the display surface 20 which does not meet the focus spot size requirements for typical projection systems. In this case, a projection lens can be designed to include the properties of the corrector lens 49. Electronic correction was not used for FIGS. 10B and 10C.

Figures 11A, 11B:
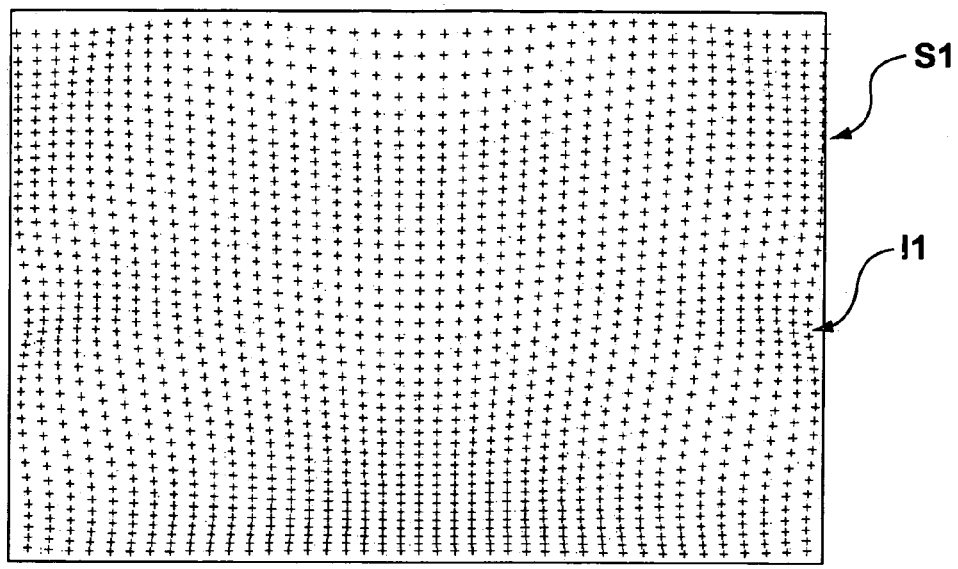
FIGS. 11A, and 11B are plots that illustrate the image distortion and focus spot performance associated with the folded rear projection system of FIG. 6.

In contrast, as shown in FIGS. 11A, and 11B, the performance of projection system 10 is notably superior when the corrector lens 49 is introduced and positioned in front of the projector lens 5. Specifically, it can be seen from FIG. 11B that the focus spots are all less than 4 mm (4 pixel spans) throughout the screen projection area as required for acceptable performance. In fact, the focus spot sizes are in the 2 to 5 mm range. It should be noted, however, as shown in FIG. 11A, that a small amount of additional keystone distortion has been re-introduced by the corrector lens 49. This minor amount of distortion can be reduced by another design iteration. Specifically, the surface of the aspherical mirror 39 can be re-optimized for the presence of the corrector lens 49, and the corrector lens 49 can be also re-optimized using the newly iterated prescription of the aspherical mirror 39. Electronic correction was not used for FIGS. 11A and 11B.

Alternatively, the corrector lens 49 is not required if the projection lens of the projection light engine is designed to account for the aspherical mirror 39 as previously mentioned. This is accomplished by applying the surface profile of the corrector lens 49 to one of the already existing lens elements of the projection light engine. A preferable candidate is an existing plastic molded aspherical lens element. This will not give a perfect solution by itself, but will give a good first-order approximation for the desired surface profile. Further optimization can yield a custom projection lens that is better than the combination of an existing lens combined with a corrector lens.

Figure 12:
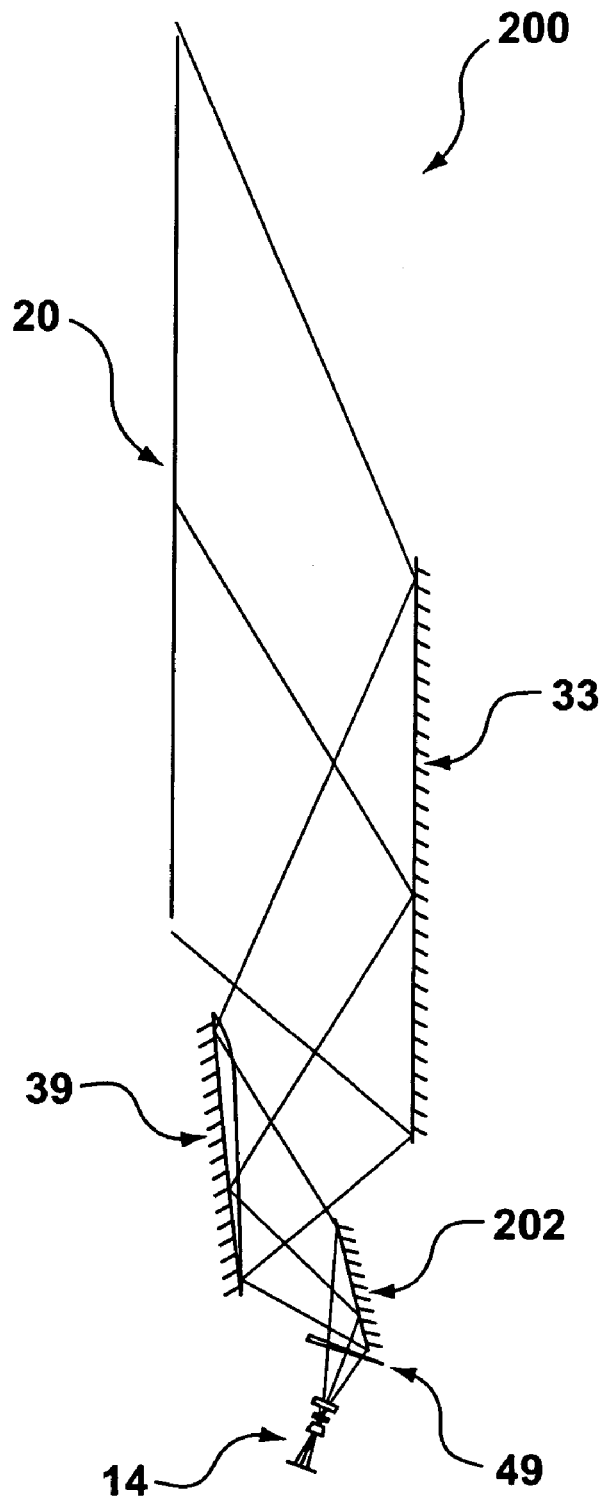
FIG. 12 is a schematic diagram that illustrates another example implementation of the present invention using three mirrors which is adapted for vertical projection mounting.

Referring now to FIG. 12, shown therein is an alternate projection system 200 which incorporates three mirrors; the primary flat mirror 33 and aspherical mirror 39 of system 10 as well as an additional secondary flat mirror 202. The aspherical mirror 39 and the secondary mirror 202 are both small mirrors. The projection system 200 allows for a more vertical placement of the projection light engine 14, exchanging a little extra height for more flexibility in choosing the mounting of the projection light engine 14 or the projection lens 5 in the cabinet that houses the projection system to provide a reduced cabinet depth. In some designs, the projection light engine 14 might be positioned horizontally, with a mirror used to rotate the image by 90 degrees in order to attain some flexibility in placement. In such a design, the image also needs to be digitally pre-rotated 90 degrees. This is because the light modulator (a digital micro-mirror device, or an LCOS panel, or an LCD panel, for example) is typically fabricated with a 4:3 or 16:9 aspect ratio, that is, in a rectangular aspect ratio. When a mirror is used to rotate the light beam by 90 degrees, the image being sent to the light modulator should also be rotated in order to fully use the entire area of the micro-display.

Figure 13:
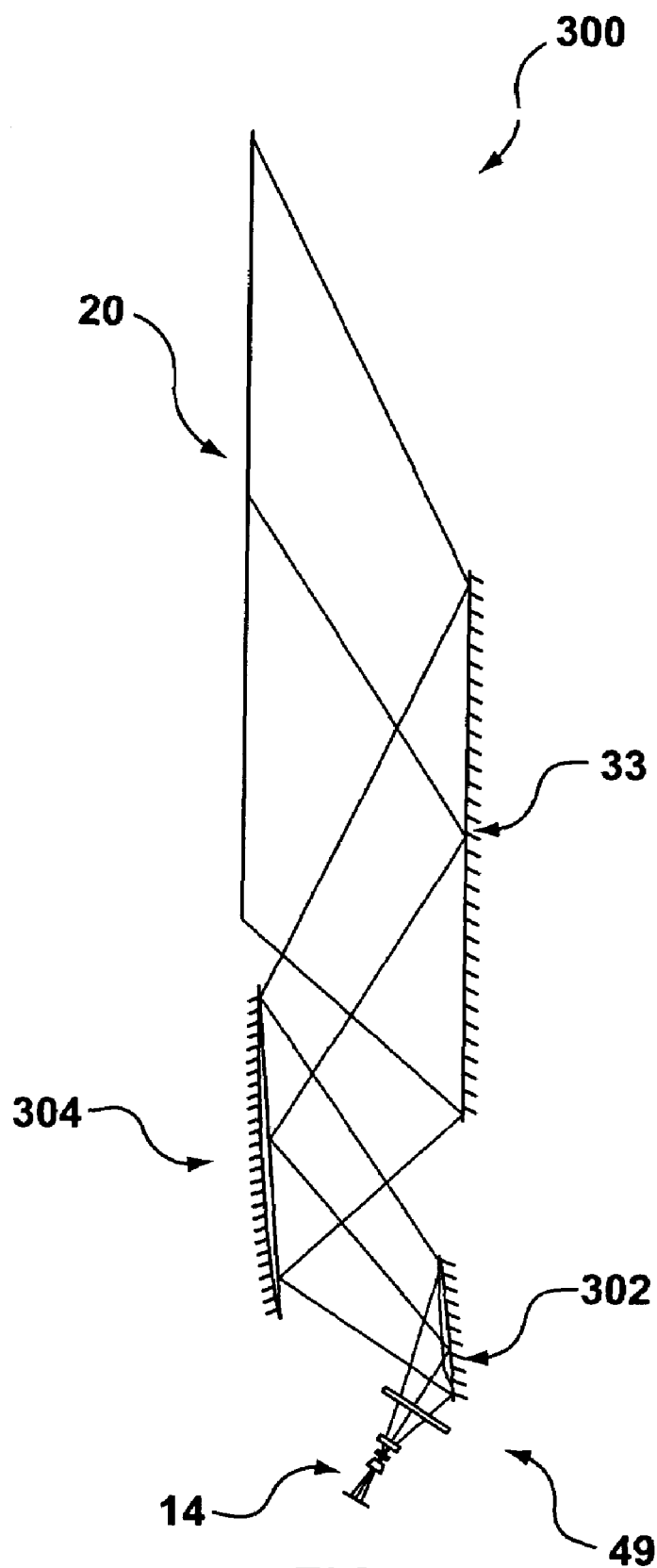
FIG. 13 is a schematic diagram that illustrates another example implementation of a projection system in accordance with the present invention which uses three mirrors in which two of the mirrors are curved.

In an alternative embodiment, a projection system in accordance with the present invention may comprise a single large flat mirror, and two curved mirrors, where one of the curved mirrors is a simple bent section that can be made, for example, by taking a section of a cylinder that could be made of plastic, bending it over a mandrel, and coating it with sputtered aluminum to give it appropriate reflecting properties. The other curved mirror is a smaller aspherical mirror that performs the rest of the keystone correction. Referring now to FIG. 13, shown therein is a projection system 300 which comprises a projection light engine 14 with a corrector lens 49, curved mirrors 302 and 304, primary large flat mirror 33, display surface 20 and the image processing unit 12 (not shown). The use of the image processing unit 12 allows for potentially very inexpensive mirrors to be used for the curved mirrors 302 and 304. The projection system 300 also has the other system components of projection system 10 (shown in FIG. 5) except that the optical reflection assembly now comprises three mirrors with two of those mirrors being curved.

The curved mirror 302 is an aspherical mirror similar to the aspherical mirror 39 of FIG. 12, except that it is smaller in size. The curvatures for the curved mirror 302 and the aspherical mirror 39 are similar vertically. Accordingly, curved mirror 302 is also aspherical. However, there is less horizontal convex curvature both at the bottom of mirror 302 as well as at the top of mirror 302. This is due to the additional beam expansion caused by the curvature of curved mirror 304 which is a simple curved mirror. The curvature of curved mirror 304 may be defined by a section of a cone with more curvature occurring near the bottom of the mirror 304 and less curvature near the top of the mirror 304. Alternatively, the curved mirror 304 may also have some curvature in the vertical direction.

The use of two curved mirrors is beneficial since the total curvature necessary for keystone correction by the aspherical mirror 39 can now be separated and provided by two smaller curved mirrors. A smaller aspherical mirror can be produced more economically since a smaller aspherical mirror requires less machining time for either the mirror itself, or the mold from which the mirror would be mass-produced via a plastic injection process. Accordingly, the fabrication of the two curved mirrors may possibly be more economically achieved compared to the costs required to fabricate than a single more complex aspherical mirror. Modern optic design tools permit for simulating a variety of configurations of the two curved mirrors 302 and 304. Accordingly, the final choice of curvatures can depend on fabrication tradeoffs.

The previous embodiments of this invention have shown the use of small, curved mirrors. Another alternative embodiment of an off-axis projection system in accordance with the present invention uses a single large curved mirror. The general shape of the large curved mirror and the smaller curved mirror are similar. However, the radii of curvature for the smaller curved mirrors are smaller than those of the large curved mirror. The large curved mirror will typically have the same vertical dimension as the display surface while the horizontal dimension of the large curved mirror will be the same as that of the display surface near the top of the large curved mirror and slightly less than that of the display surface near the bottom of the large curved mirror. The large curved mirror will be the mirror closest to the display surface and if there is another mirror in the configuration, it can be a fold mirror which is situated close to the projection light engine. The fold mirror will be smaller the closer that it is to the projection light engine. An advantage of the embodiment with a large curved mirror is that the curved mirror is closer to the display surface and defocusing can be better controlled because the light bouncing from the curved surface has a much shorter distance to go before striking the display surface.

Referring now to FIG. 14, shown therein is a projection system 400 having a projection light engine 14, a single curved mirror 402 and a display surface 20. The single curved mirror 402 is approximately the same size as the display surface 20. The projection system 400 comprises the same components as the projection system 10 (see FIG. 5). However, the optical reflection assembly comprises only the single curved mirror 402. As before, a custom projection lens may be designed for this application to correct for the beam-spreading defocus of the single curved mirror 402. As before, the off-axis projection, and the distortion correction performed by the combination of lens and mirror profile design and image processing, allows the cabinet thickness to be reduced. Because the defocusing can be better controlled with a large, curved mirror, more severe off-axis geometry can be used, resulting in increased improvements to DtoD ratio and cabinet thickness.

The surface profile of the single large curved mirror 402 is similar to that used for the small curved mirror approach, that is, the profile of the single large curved mirror 402 is aspherical, rotationally non-symmetrical, and laterally symmetrical. The single, large, curved mirror 402 has a concave surface that is oriented vertically. Accordingly, the curved mirror 402 shrinks the image slightly in the vertical direction, to compensate for vertical off-axis expansion. The single curved mirror 402 introduces distortion that is handled by a combination of the projector lens/corrector lens and the image processing unit 12 (not shown). If a corrector lens is not used then a custom designed projection lens (not shown) must be used. The custom designed projection lens will be a multi-element lens system which also provides the functionality of the corrector lens. The custom designed projection lens can include shift and tilt techniques in order to alleviate some of the distortion and focus control needed.

Figure 1A:
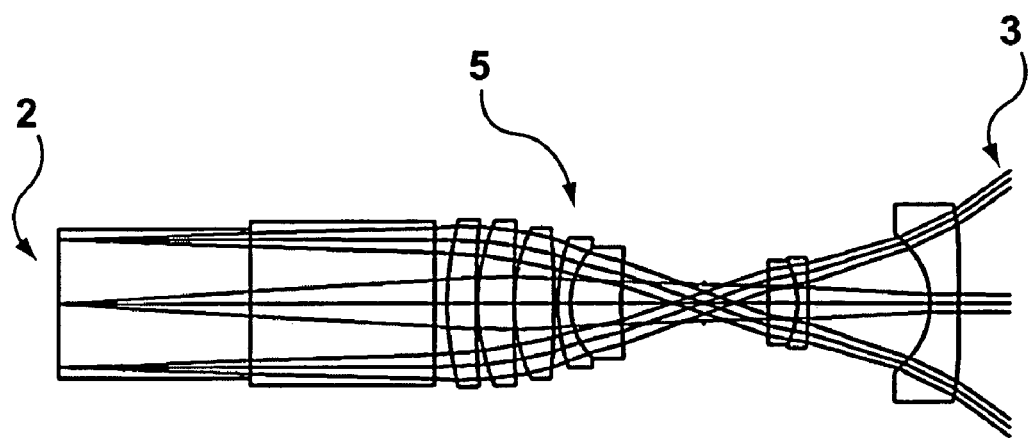
FIG. 1A is a schematic diagram of a generic eight-element projection lens.
Figure 1B:
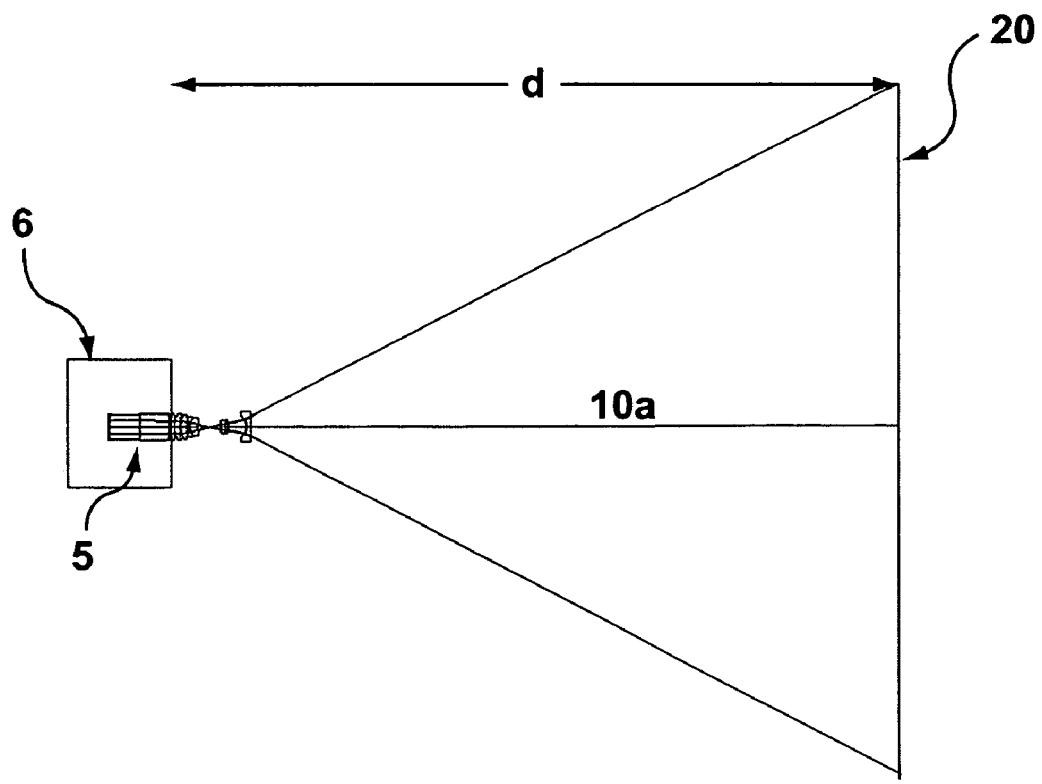
FIG. 1B is a schematic diagram of the projection lens of FIG. 1A being used to project an image on-axis on a screen.
Figures 1C, 1D:
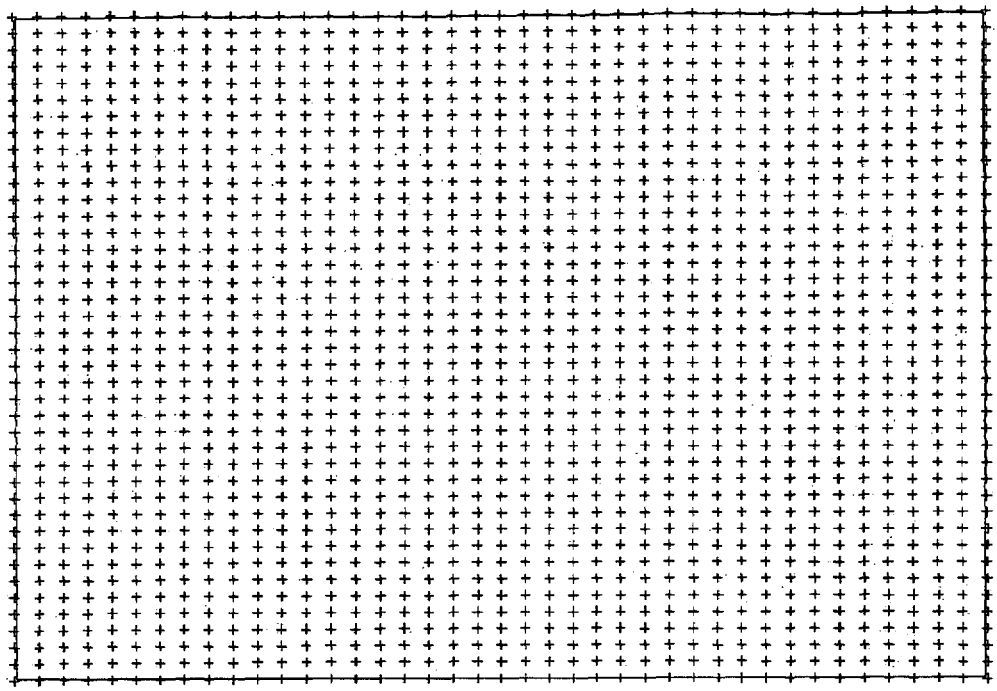
FIGS. 1C and 1D are distortion and focus plot diagrams that illustrate the distortion inherent in the direct projection system of FIG. 1B.
Figure 14A:
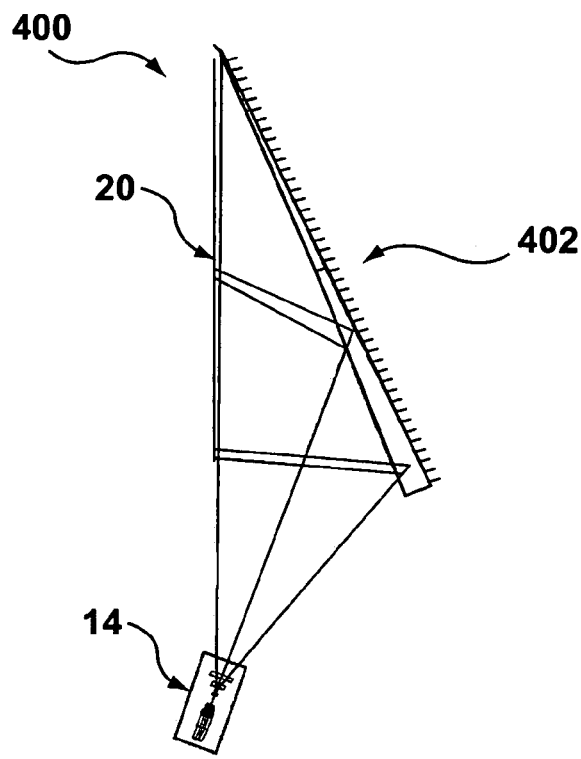
FIG. 14A is a schematic diagram that illustrates another example implementation of a projection system in accordance with the present invention which uses a single, large, curved mirror.
Figure 14B:
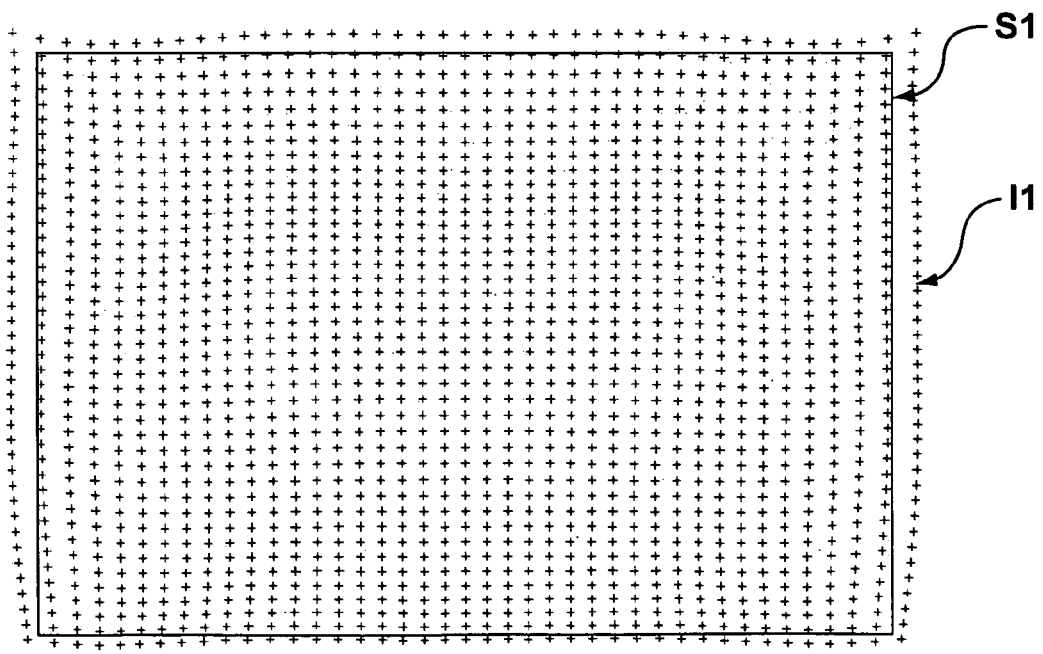

Referring now to FIGS. 14B-14D, shown therein are distortion plots and focus spot diagrams for the projection system 400 of FIG. 14A. FIG. 14B shows the distortion correction performed by the large curved mirror, which is clearly quite good, almost making full use of all the available pixels. FIG. 14C shows the focus spot diagrams without a corrector lens element and FIG. 14D shows the focus spot diagram with a corrector lens element. In these results, the projection system 400 has a 60 inch diagonal display screen and a cabinet depth of 11 inches. The sag of the mirror 402 was 40 mm, or about 1.5 inches. If FIGS. 14B and 14D are compared with the conventional on-axis performance illustrated in FIGS. 1C and 1D, one can see that the large, curved mirror technique can yield image quality that almost does not require any image processing to correct for residual correction, using off-the-shelf lenses with correction. This also implies that by using a more advanced custom lens design and using other techniques such as tilt, offset, and image processing, more gains in DtoD ratios and cabinet depth reductions may be realized. Electronic correction was not used for FIGS. 14B-D.

Figure 15A:
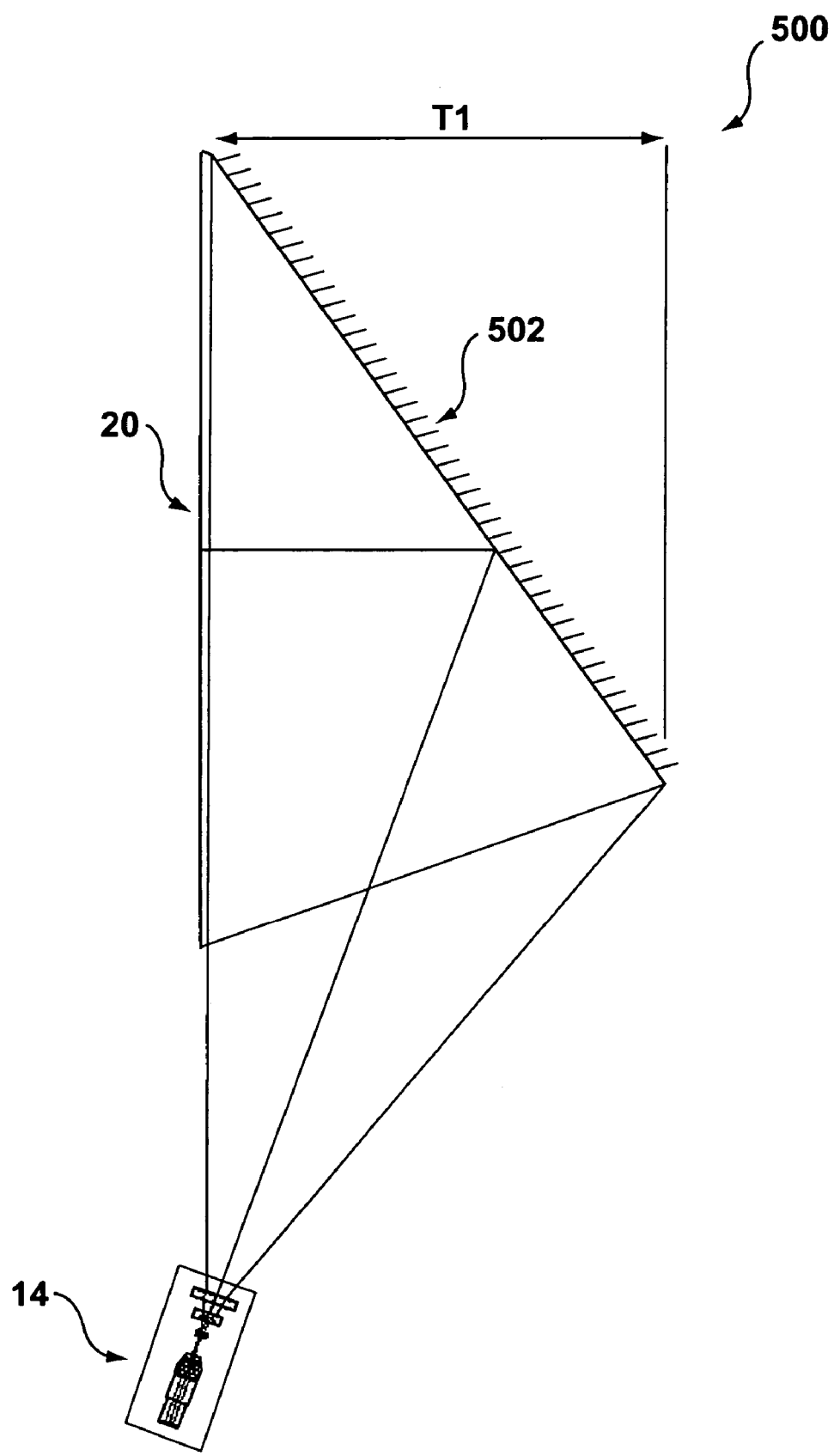
FIG. 15A is a schematic diagram of a single flat mirror prior art on-axis projection system.
Figures 15B, 15C:
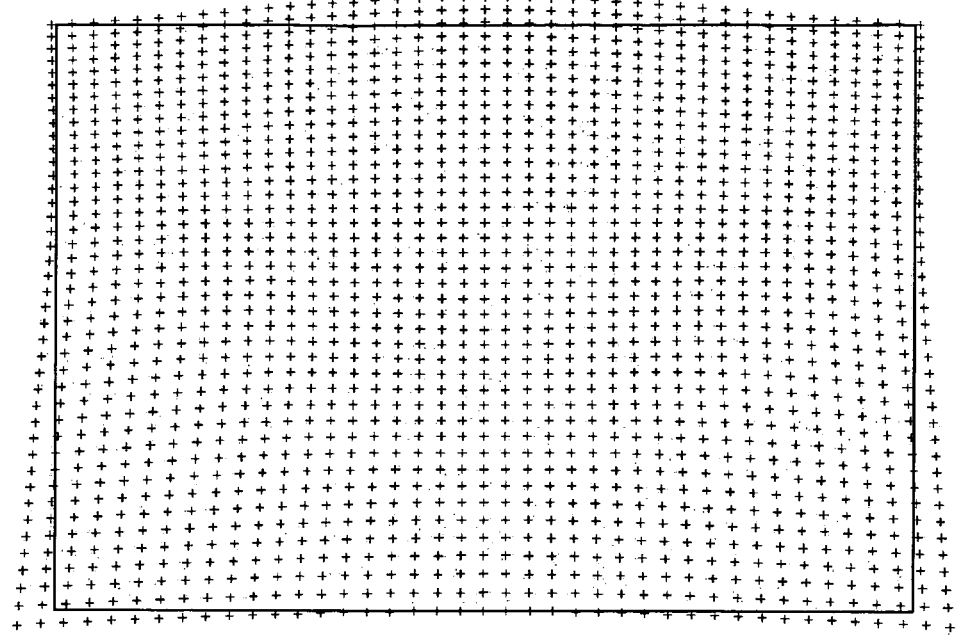
FIGS. 15B and 15C are distortion and focus plot diagrams that illustrate the distortion inherent in the projection system of FIG. 15A.

The following paragraphs will go through a step-by-step explanation of how succeedingly better DtoD ratios can be achieved by applying increasingly sophisticated techniques. Referring now to FIG. 15A, shown therein is a portion of an example of a prior art on-axis rear projection system 500 which comprises a projection light engine 14, a single flat mirror 502 and a display surface 20. The system has a 90 degree screen projection angle. FIGS. 15B and 15C show the distortion and focus plot diagrams respectively. The projection system 500 does not add significant distortion or de-focusing. The cabinet thickness T1 is approximately 19 inches thick for a screen diagonal of 67 inches, with a DtoD ratio of 3.52. The focus spots are all between 0.5 and 1.5 mm. Electronic correction was not used for FIGS. 15A-B.

Figure 16A:
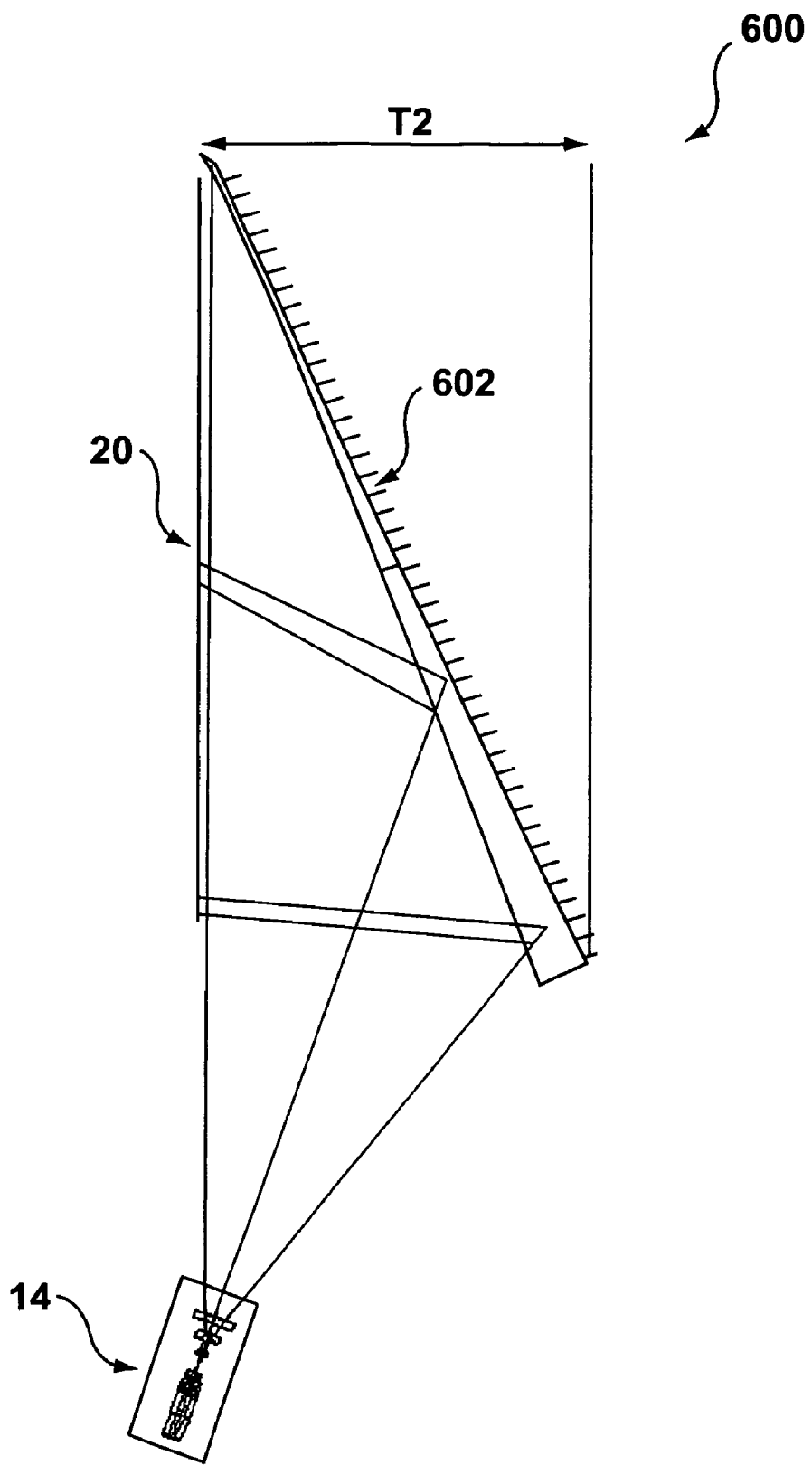
FIG. 16A is a schematic diagram that illustrates another example implementation of a projection system in accordance with the present invention which uses a single, large, curved aspherical mirror.
Figures 16B, 16C:
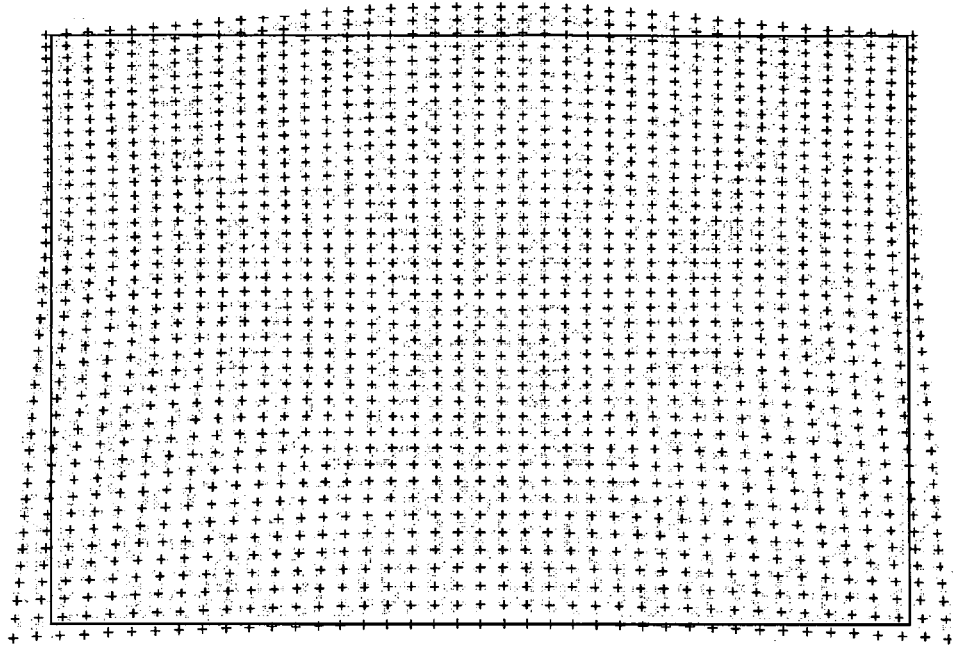
FIGS. 16B and 16C are distortion and focus plot diagrams that illustrate the distortion inherent in the off-axis projection system of FIG. 16A.

Referring now to FIG. 16A, shown therein is a portion of an off-axis projection system 600, in accordance with the present invention, comprising projection light engine 14, display surface 20 and a single curved mirror 602. The single curved mirror 602 is an aspherical mirror which is similar to that shown in FIGS. 7A-7C. The curved mirror 602 has a sag of approximately 30 mm (which is the distance between a plane that is perpendicular to the mid-point of the mirror 602 and a plane that is perpendicular to the edges of the mirror 602). FIGS. 16B and 16C show the distortion and focus plot diagrams respectively. The projection system 600 fills the top of the display surface but not the bottom. The cabinet thickness T2 is about 16 inches thick with the same 67" diagonal as before, for a DtoD ratio of 4.2. The keystone distortion is reduced with the single curved mirror 602, but there is still some residual 'warping' of individual lines as shown in FIG. 16B. The distortion with the single curved mirror 602 is reduced to about 7%. A distortion value of 5% (corresponding to a loss of about 5% of the available pixels) is considered acceptable. The 7% distortion can be easily handled by the image processing unit 12 and could be corrected back down to less than 1% but would still result in a loss of approximately 7% of the available pixels. This distortion can also be improved with further optimization. Furthermore, a corrector lens is not being used and a slight de-focusing has been removed by tilting the projection lens of the projection light engine 14 approximately 0.2 degrees. The resulting spots in FIG. 16C are between 0.5 and 1.5 mm which are the same as those shown in FIG. 15C. Electronic correction was not used for FIGS. 16B-C.

Figure 17A:
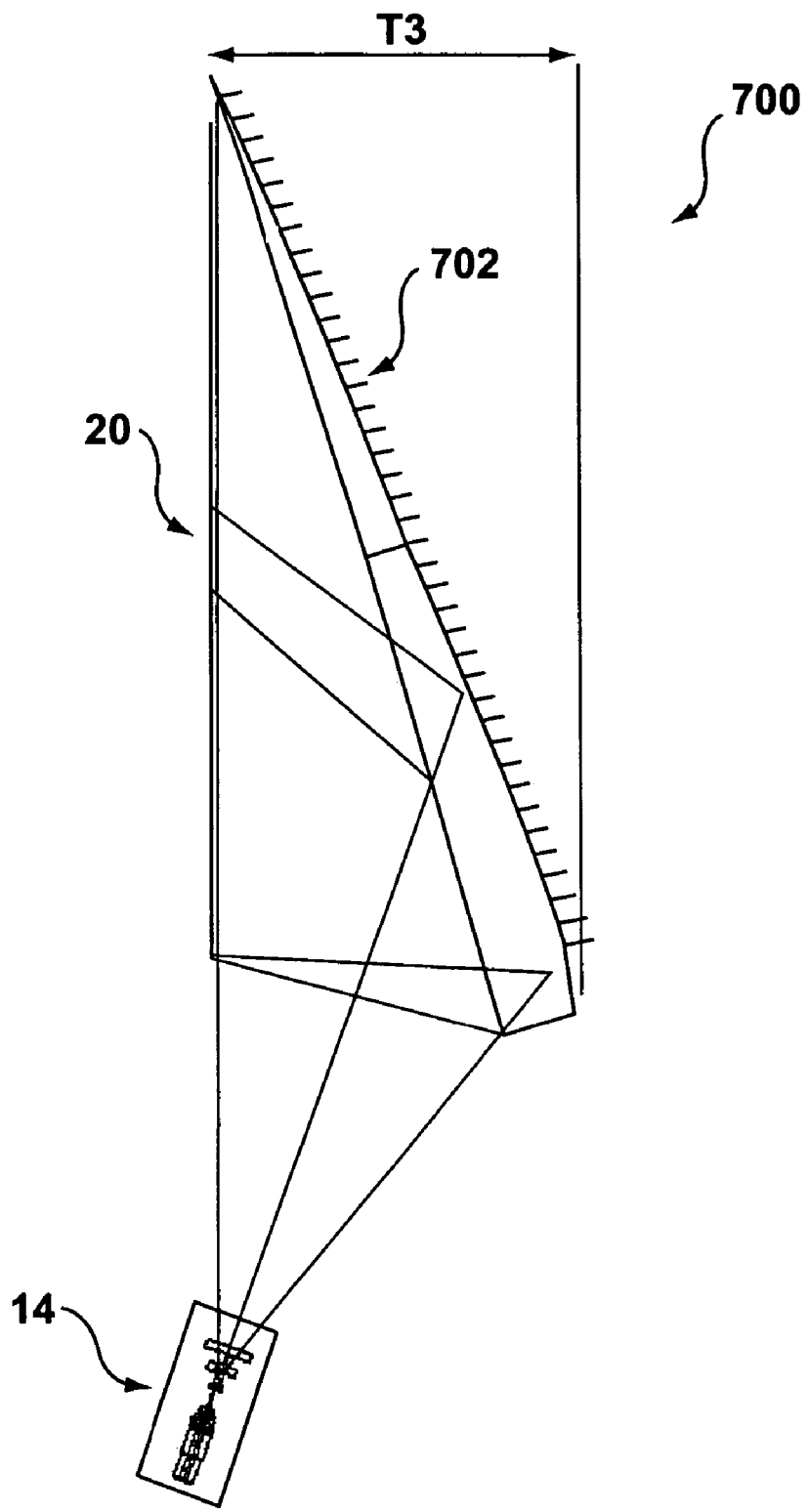
FIG. 17A is a schematic diagram that illustrates another example implementation of a projection system in accordance with the present invention which uses a single, large, curved aspherical mirror.
Figures 17B, 17C:
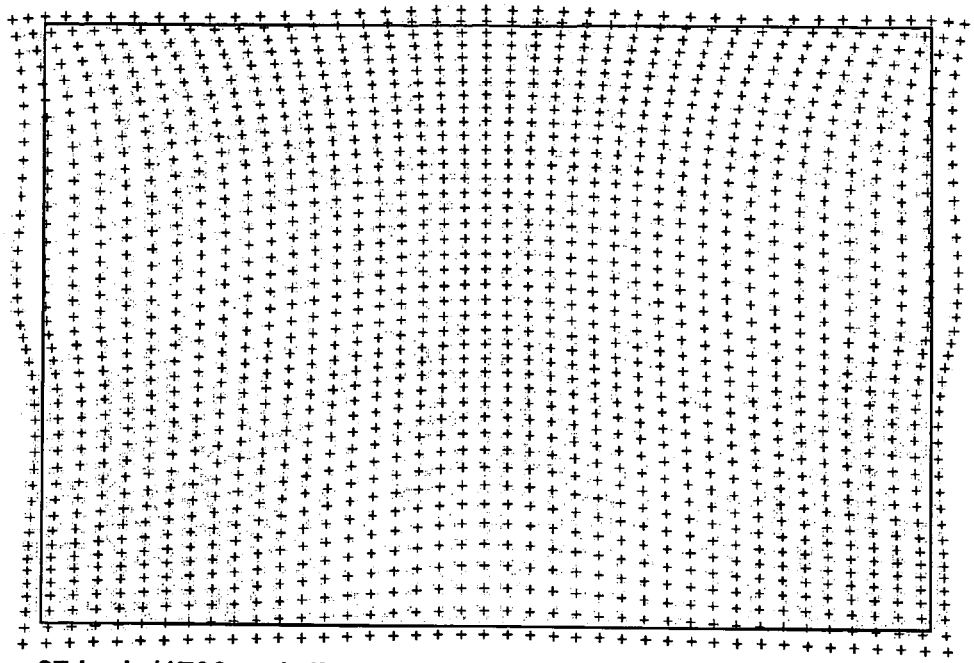
FIGS. 17B and 17C are distortion and focus plot diagrams that illustrate the distortion inherent in the off-axis projection system of FIG. 17A.

Referring now to FIG. 17A, shown therein is a portion of an off-axis projection system 700, in accordance with the present invention, comprising a projection light engine 14, a display surface 20 and a single curved mirror 702. The single curved mirror 702 is an aspherical mirror which has a sag of approximately 70 mm (defined as explained above). FIGS. 17B and 17C show the distortion and focus plot diagrams respectively. The projection system 700 has keystone distortion and does not fill the top of the display surface. The cabinet thickness T3 is about 13 inches thick with the same 67" diagonal display for a resulting DtoD ratio of 5.15. In the projection system 700, the curved mirror 702 corrects the keystone distortion and adds enough magnification to make the image fill the display surface 20. The resulting distortion is approximately 3%. This can be improved with further optimization as well as with the use of the image processing unit 12. Furthermore, a corrector lens is not being used and a slight de-focusing has been removed by tilting the projection lens of the projection light engine 14 approximately 0.8 degrees. Electronic correction was not used for FIGS. 17B-C.

In the projection systems of FIGS. 16A and 17A, the curved mirrors 602 and 702 still require a vertically oriented concave surface to correct for vertical expansion due to keystone distortion. However, in this case the curved mirrors 602 and 702 require only a horizontally oriented convex surface to correct for horizontal compression, of which there is more at the bottom than at the top of the display surface. In this case, the projection lens has been designed to produce a horizontal image size at the top of the display surface that is equal to or a little smaller than desired, so the horizontal mirror curvature at the top of the curved mirrors 602 and 702 only needs to be slightly convex. Correspondingly, at the bottom of the display surface, keystone distortion will result in a horizontal image size that is much smaller than desired, so the horizontal mirror curvature will need to be more convex, to provide more magnification. Nonetheless, the curved mirrors 602 and 702 still perform the same function and have the same basic shape as the aspherical mirror 39 and are therefore rotationally non-symmetric.

The corrector lens 49, whether a discrete lens, or part of a compound lens, performs the same functions whether it is being used with a small or large aspherical rotationally non-symmetric mirror. Accordingly, the corrector lens 49 has the same basic shape in either case. In general, the shape of the corrector lens 49 tracks the shape of the curved aspherical mirror because the corrector lens 49 is trying to appropriately shape (i.e. reduce beam-spreading and hence reduce spot size) the light beams going into the aspherical mirror. In general, there is a pronounced asymmetry between the top and bottom of the aspherical mirror, and hence the corrector lens, due to the off-axis geometry. This is why the aspherical mirror and the corrector lens are rotationally non-symmetric.

The systems of FIGS. 15 to 17 were designed using a projection light engine with an 8-element projection lens having a 12.3 mm focal length lens at f:5 and an 18 mm diagonal micro-display. The micro-display has a pixel pitch of 12.27 microns for a size of 1280×720 pixels, or 8.17 microns for a size of 1920×1080 pixels. This projection light engine has a projection exit cone angle of 32.8 degrees. The other systems shown herein were designed using a projection light engine with an 8-element projection lens having an 18.7 mm focal length lens at f:2.8 and a 0.9 inch micro-display. This projection light engine has a projection exit cone angle of 31.7 degrees. However, other types of projection light engines could be used with the present invention. Furthermore, the side views of the projections systems shown herein are drawn to scale. The projection systems are shown for exemplary purposes and are not meant to limit the invention.

Rear Projection systems also always include a means for directing the light from the projected image into a beam that emerges horizontally from the display surface (i.e. screen) towards the audience in front of it. A screen assembly with an included Fresnel lens is typically used because Fresnel lenses are a light, relatively inexpensive means of collimating a large bundle of light being projected from a point source (i.e. from within the projector 25). Further, the spatial distribution of light tends to favor the central portion of a Fresnel lens. In order for a Fresnel lens to be beneficially used within the projection system 10, the focal length of the Fresnel lens should match the distance from the point source (in particular, the surface of the light-modulating micro-display device). The Fresnel lens is used to rotate and collimate the light rays carrying the near-perfect optical image that has arrived at an angle to the rear of the display surface 20. The light rays forming the optical image impinge upon the Fresnel lens at different angles depending upon their position on the display surface, and the Fresnel lens must rotate the light rays through an appropriate angle (vertically, as well as horizontally) in order to deliver the light rays at an exit angle perpendicular to the screen. As mentioned previously, the center of the Fresnel lens will be considerably offset downwards from the center of the display surface, the degree of offset being dependent on the DtoD ratio of the projection system (i.e. the amount of off-axis geometry being used).

In an alternative configuration, the aspherically curved mirror in the various embodiments can be a reflective Fresnel mirror. A Fresnel mirror replaces the curved surface of a conventional mirror with a series of concentric grooves, molded into the surface of a thin, lightweight plastic sheet. The grooves act as individual reflecting surfaces, like tiny prisms when viewed in cross section, reflecting parallel rays in a very close approximation to the original thick curved mirror surface. The Fresnel mirror can be made by cutting equal pitch circular grooves on a mold to replicate the curvature of the aspherical curved mirror, fabricating a Fresnel structure from this mold and then metallizing the structure's surface to give it a Front Surface Mirror (FSM) finish. This Fresnel-aspherical mirror can reduce the cabinet depth of the projection system by another inch or two, by eliminating the sag of the curved mirror. In one example, by substituting a Fresnel mirror for a curved mirror in a 60" diag by 8" thick system, a thickness savings of 1.5" may be realized, and a DtoD ratio of perhaps 9:1 (i.e. a 60" diagonal with a 6.5" depth) can be achievable. This is not a trivial substitution as the Fresnel mirror must be made from a symmetrical mirror design, and the slight reduction in thickness implies a slight change in throw ratio. However, the reduction in cabinet thickness is the motivation for developing Fresnel mirror solutions. The Fresnel aspherical-mirror is the same size as the curved mirror that it replaces, however it is much thinner. The Fresnel mirror also reduces keystone distortion just as the aspherical, non-symmetrical curved mirror does since the tiny, reflecting grooves on the Fresnel mirror provide a similar effect as the surface curvature of the aspherical, non-symmetrical curved mirror. However, the performance of the Fresnel mirror in reducing keystone distortion may not be as good as that of the aspherical, non-symmetrical curved mirror for the symmetrical Fresnel mirror (in this case, the image processing unit needs to provide more distortion correction).

As an example, the Fresnel mirror can have a 0.1 mm groove pitch, with natural diamond tools cutting the grooves by taking up to 5 successive cuts at each radius. The tools are specially cut with specific tip included angles, and the molds are made of brass, with a specialized liquid that is used to flood the cutting area both for cooling purposes and to remove the machined material as is known to those skilled in the art. The Fresnel aspherical-mirror is preferably non-symmetric in order to duplicate the performance of the curved rotationally non-symmetric mirror for which it is substituted. However, current manufacturing limitations impose rotational symmetry to Fresnel mold structures as these are machined on lathes. The use of a symmetrical Fresnel mirror implies that the projection lens design and the image processing unit 12 must bear more of the responsibility for distortion correction and focus spot reduction.

Figure 18A:
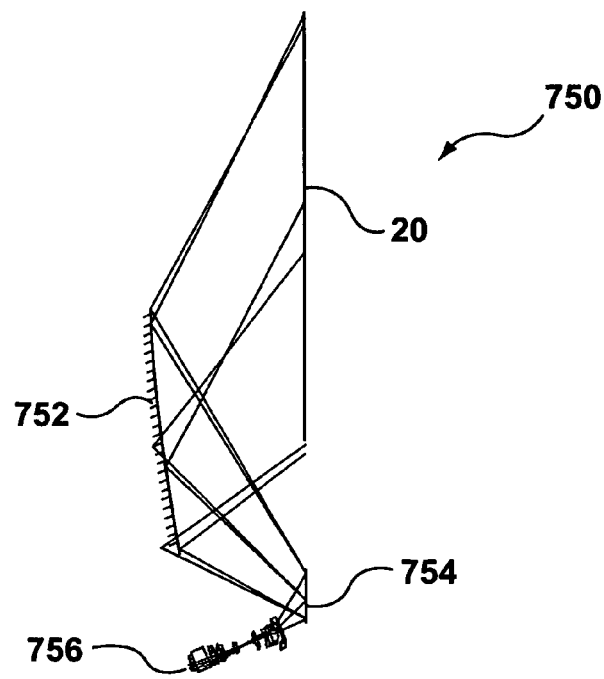
FIG. 18A is a schematic diagram that illustrates another example implementation of a projection system in accordance with the present invention which uses a two mirror configuration that includes a Fresnel mirror substituted for the large, curved, aspherical mirror.
Figure 18B:
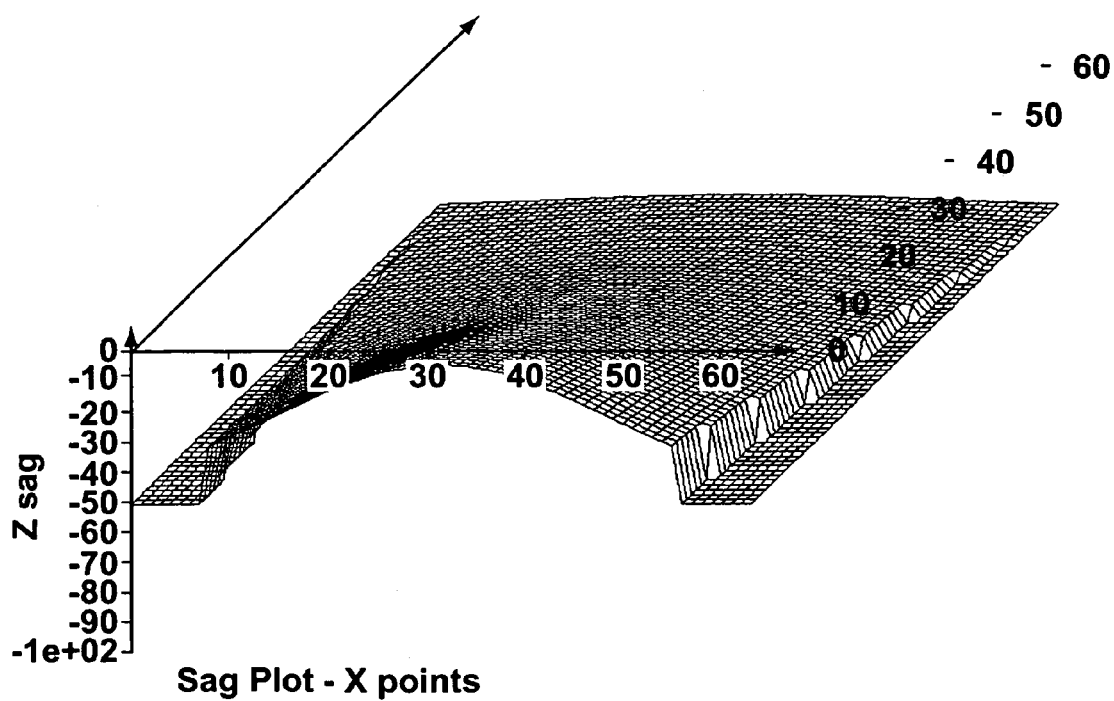
FIG. 18B is a 3D representation of a large, curved mirror segment that is converted to the Fresnel mirror used in the embodiment of FIG. 18A.

Referring now to FIG. 18A, shown therein is another implementation of a projection system 750 in accordance with the present invention in which a Fresnel mirror 752 is used in place of the aspherical curved mirror. The projection system 750 further comprises a mirror 754, which can be flat or curved, a projection light engine 756, a display surface 20 and an image processing unit (not shown). The mold for the Fresnel mirror 752 can be made by current technology since it is designed to be machined on a lathe, that is, the Fresnel mirror is designed to replace a rotationally symmetric aspherical mirror. Conventional ultraviolet cured polymer technology can be used to produce a plastic film from the mold, and this plastic film contains the grooves that represent the optical properties of the aspherical mirror. This film will need to be mounted on a rigid substrate (it could be bonded to glass, for example, which is a well-known technique). To obtain the mirror surface, a method of depositing a reflective surface on the grooved side of the film is needed which is commonly known to those skilled in the art. Once the complete Fresnel mirror is fabricated, a quadrilateral segment is cut from the center of the complete Fresnel mirror to provide the Fresnel mirror 752. This quadrilateral segment is used as the mirror 752. FIG. 18B shows a 3D representation of the shape of the original curved mirror segment underlying the equivalent quadrilateral Fresnel mirror segment 752 that is cut out of the complete Fresnel mirror.

Figure 18C:
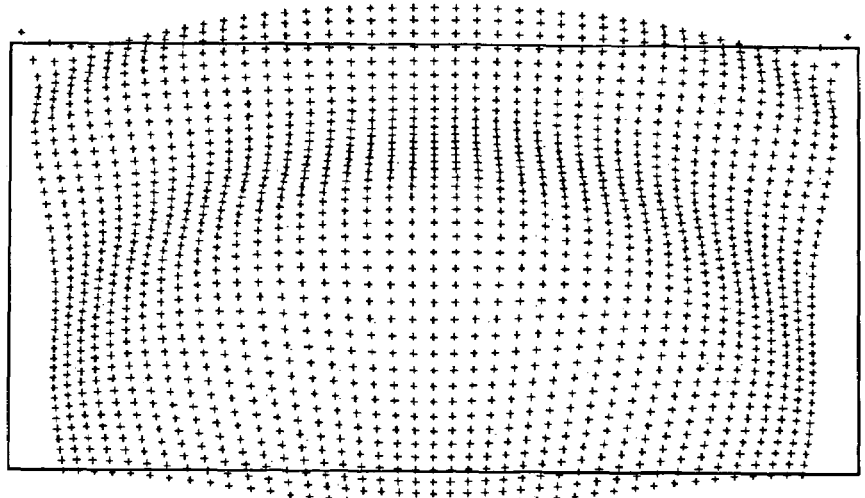
FIG. 18C is a distortion plot diagram for the projection system of FIG. 18A when a corrector lens is not used.
Figure 18D:
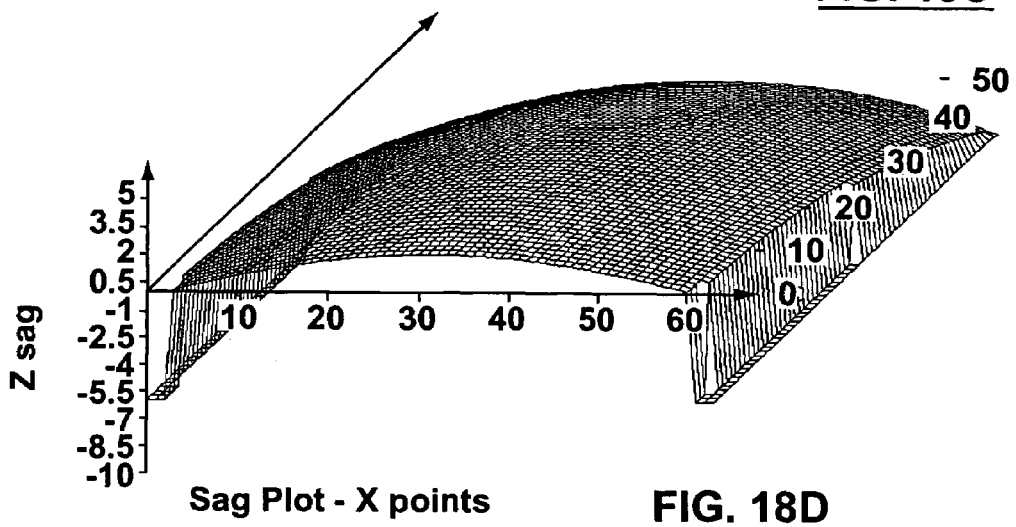
FIG. 18D is a 3D profile of an aspherical, rotationally non-symmetrical corrector lens used to correct for Fresnel mirror distortions and beam-spreading in the projection system of FIG. 18A.
Figure 18E:
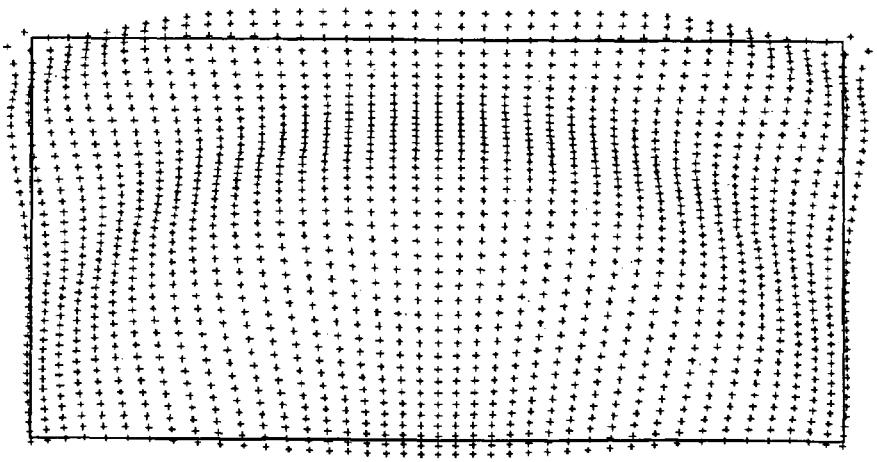
FIG. 18E is a distortion plot diagram for the projection system of FIG. 18A when the corrector lens of FIG. 18D is used without any electronic correction.

Referring now to FIG. 18C, shown therein is a distortion plot that shows the performance of the projection system 750 when a corrector lens is not used and the projection light engine 756 is not designed with the corrector lens functionality. It should be noted that because the Fresnel mirror 752 does not have the asymmetrical properties of the aspherical, rotationally non-symmetric curved mirror of the present invention, the Fresnel mirror 752 can not correct for keystone distortion as effectively. However, the addition of a corrector lens (whose profile is shown in FIG. 18D) makes a significant difference in the distortion plot as shown in FIG. 18E. In this case, the corrector lens is not restricted to being symmetrical (as it can be molded rather than machined on a lathe) and has to play a bigger role in reducing spot defocus. The distortion plot shown in FIG. 18E can be improved to acceptable levels of <1% using digital image processing. In this particular example, the sag of a corresponding aspherical, symmetrical mirror segment is 45 mm, and by substituting a 3 mm thick Fresnel mirror 752, the cabinet depth is reduced by 42 mm.

Figure 18F:
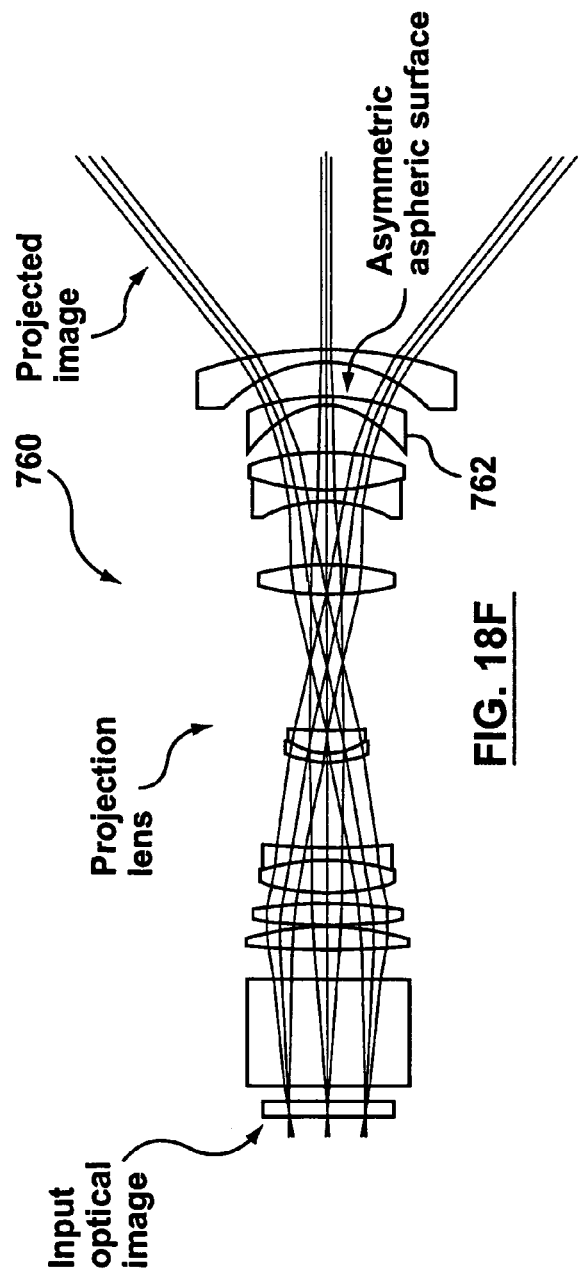
FIG. 18F is a top view of a custom projection lens that can be used with the Fresnel mirror of FIG. 18A.
Figure 18G:
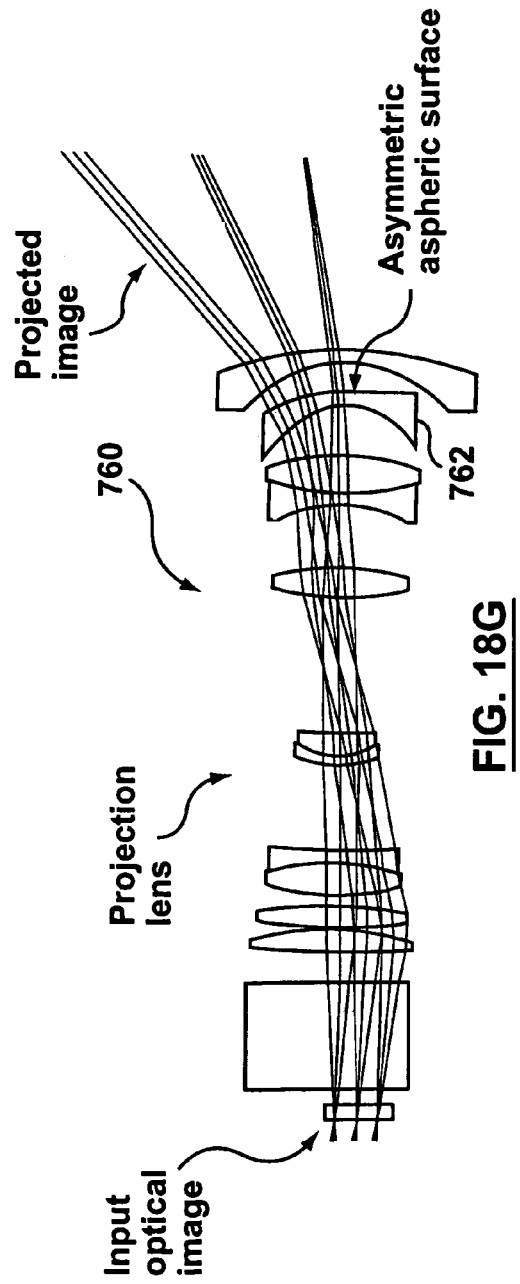
FIG. 18G is a side view of the custom projection lens of FIG. 18F.

FIG. 18F shows the top view of a custom projection lens that can be used with the Fresnel mirror 752. The projection lens 760 is identical to the projection lens shown in FIGS. 21A-B, except that the second lens element 762 has been changed so that the aspherical, asymmetrical surface of the lens element 762 has the lens profile shown in FIG. 18D. Similarly, FIG. 18G shows the side elevation of the projection lens 760. Similar to the projection lens of FIG. 21, the projection lens 760 also uses shift and tilt techniques in its design. The lens element 762 incorporates the functionality of a corrector lens which must deal with an aspherical, rotationally symmetrical Fresnel mirror. The corrector lens surface is aspherical and asymmetrical, and is the surface on the right side of the lens element 762. The primary purpose of the corrector lens surface is to correct for de-focusing although the lens surface will also partially correct for keystone distortion.

As mentioned previously, tilt and shift of the projection lens in the projection light engine can be used to correct for distortion introduced by the aspherical mirror. In particular, lens shift or shift of the micro-display device with respect to the projection lens, can be added to any of the off-axis projection systems of the present invention to reduce keystone distortion. It should be understood that lens shift is just another technique in correcting for the keystone distortion that results from off-axis projection, and hence another one of the ways that improved DtoD ratios can be obtained.

With respect to FIG. 18, exemplary dimensions for the various components will now be given. For the mirror 754, the tilt angle is −19 degrees, the distance from the last lens surface in the projection lens is 65.087736 mm (center ray) and the X,Y corner coordinates in mm are: (68.766592 92.704316), (51.292765, 10.947695), (−51.297133, 10.949841) and (−68.765149, 92.709893). For the Fresnel mirror 752, the mirror sag is 46.34 mm, the tilt angle is +19 degrees, the distance from the mirror 754 is 353.0113 mm (center ray) and the X,Y corner coordinates in mm are: (333.965543, 464.941499), (252.931401, 74.623281), (−252.963970, 74.640022), and (−333.957131, 464.974787). For the display surface 20, the tilt angle is −19 degrees, the distance from the mirror 752 is 539.7357 mm (center ray) and the size is 1326 mm wide by 747 mm high with a 1524 mm diagonal.

Figure 19B:
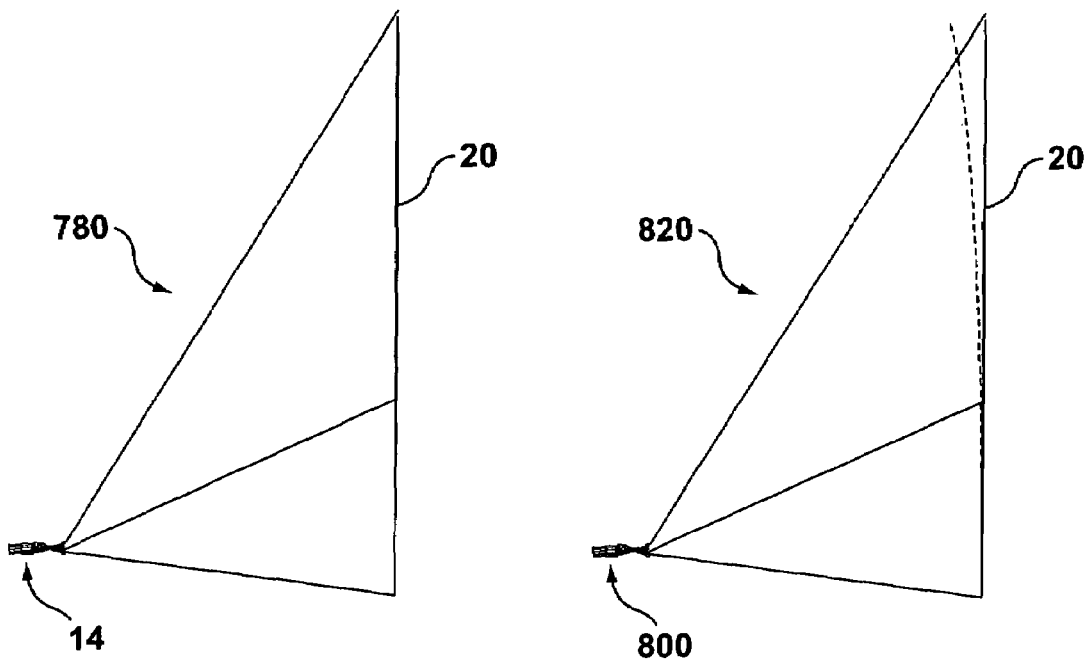
FIG. 19B is a distortion plot that shows 27% keystone distortion for the projection system of FIG. 19A.
Figure 19B:
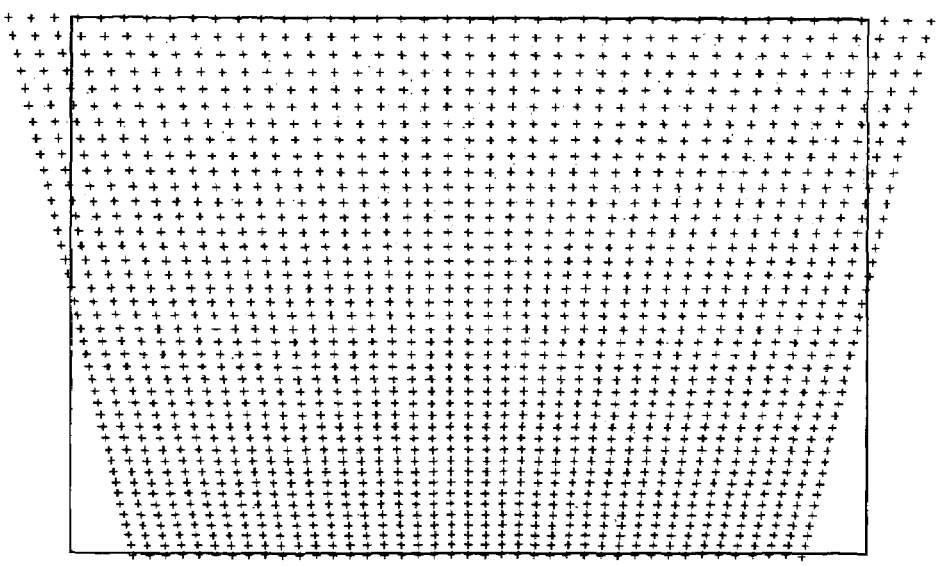
Figure 19C:
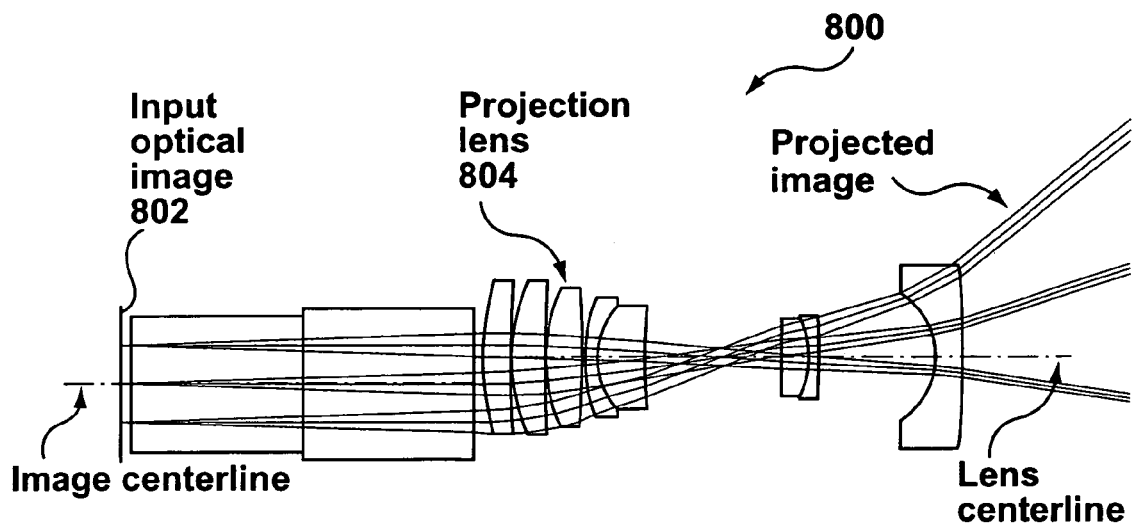
FIG. 19C is a schematic diagram that illustrates an prior art off-axis projection light engine with a shift between the projection lens and the micro-display.
Figure 19E:
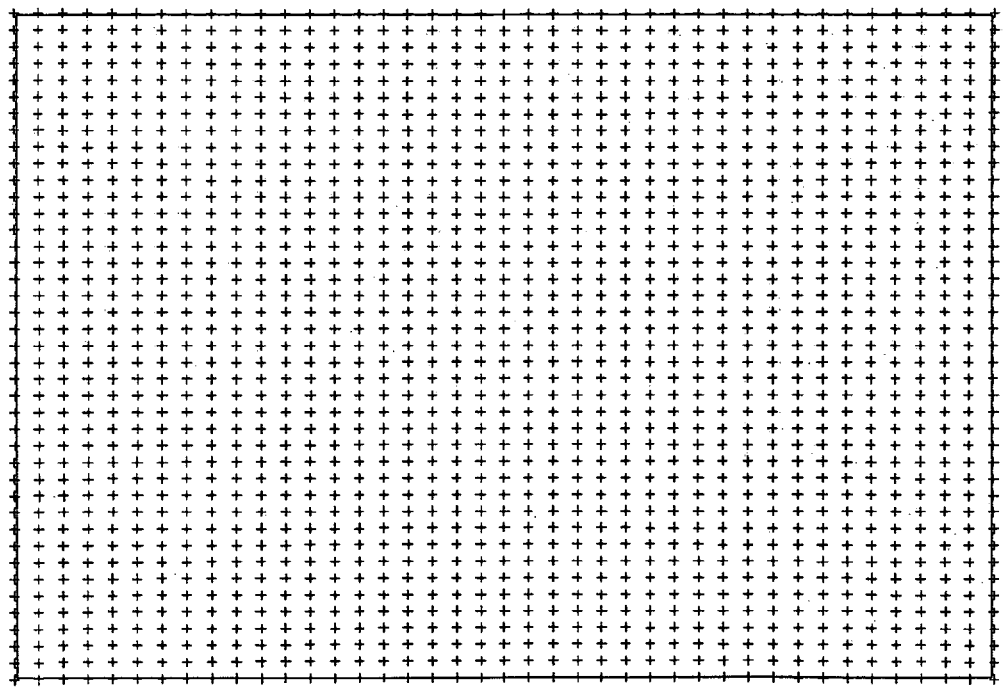
FIG. 19E is a distortion plot for the prior art off-axis projection system of FIG. 19D that uses the "shifted lens" projection light engine of FIG. 19C to correct for keystone distortion.

Referring now to FIG. 19A, shown therein is a prior art 30 degree off-axis projection system 780 that will produce 27% keystone distortion, as shown in FIG. 19B. The projection system 780 does not use lens shift. Referring now to FIG. 19C, shown therein is a prior art projection lens arrangement for a projection light engine 800 that employs offset or shift which means that there is an offset/shift between the centerlines of the optical axis running through the micro-display/TIR prism assembly 802 and the optical axis of the projection lens 804 itself. In this particular example, if the projection light engine 800 is used in an on-axis projection system, the shift is of a sufficient magnitude to produce the 27% keystone distortion of FIG. 19B. However, referring now to FIG. 19D, shown therein is a 30 degree off-axis prior art projection system 820 that utilizes the projection light engine 800. In this arrangement, the shift of the projection light engine 800 is of a sufficient magnitude to remove the keystone distortion (see FIG. 19E). None of FIGS. 19A-E show the components of the present invention, however the prior art techniques shown in FIGS. 19C-D can be added to any of the embodiments of the present invention to help provide reduced cabinet depth with satisfactory image quality.

The projection lens shift causes most of the lower half of the projection lens 804 to be used, and part of the upper half of the projection lens 804 to not be used since light rays do not go through that portion of the projection lens 804. However, since the outer periphery of a spherical projection lens causes more aberrations than the central portion, the projection lens must be designed to have a larger diameter than a projection lens in which no shift/offset is used which slightly increases the cost of the projection lens in exchange for being able to use more paraxial rays. If the off-axis angle of the projection system were larger so that there is more than 27% distortion, then there would be some excess distortion of a few percent that is not corrected by the shift. This excess distortion can be dealt with by either the image processing unit 12, a curved mirror or a combination of both. Alternatively, if the off-axis geometry of the projection system had a lower angle so that there is less than 27% distortion, the projection lens 800 will overcorrect and there will be some distortion of the opposite sign (i.e. the bottom of the image is larger than the top of the image on the display surface) and that can be corrected by either the image processing unit or a change in mirror profile.

The value of 27% is given as an example and other amounts of shifts in the projection lens 800 can be used to correct for other amounts of distortion. However, the shift that can be applied can result in an expensive design because as more shift is applied, the coverage at the entrance pupil of the projection lens has to be large enough to cover a circle encompassing the shifted micro-display and the lens has to be of a wide enough angle design to throw this image onto the display surface. It should be noted that a small amount of shift is commonly used in table-mounted front projectors so that the projected image is projected slightly off-axis upwards without distortion and without interference from the surface of the tabletop.

Lens shift complicates projection engine design, but when it is used, it can be effective. Closely related to lens shift is lens tilt. It is known by those skilled in the art that advanced projection light engines can benefit by using both of these techniques. However, either can be applied alone. Lens tilt is typically used to correct focus problems due to a tilted focal plane. In the examples shown so far, there are no tilted focal planes (i.e. the micro-display and the display surface are parallel). However, when lens shift is used, there is an offset of the image due to the lens shift (i.e. if 50% offset is used, the bottom of the image will be near the center of the projection lens). Since the image produced by any lens has a curved field, the top of the image projected onto the display surface focuses closer than the bottom of the image projected onto the display surface. A configuration in which the planes of the micro-display, the lens, and the display surface all intersect along the same line will reduce keystone distortion. This is known as the Scheimpflug principle which is shown schematically in FIG. 20B for a front projection system 900. To combat spot defocusing, the projection lens can be tilted to reduce the effect of 'field curvature'. Alternatively, the display surface could be tilted inwards, but it's easier to tilt the projection engine a little outwards.

Figure 20A:
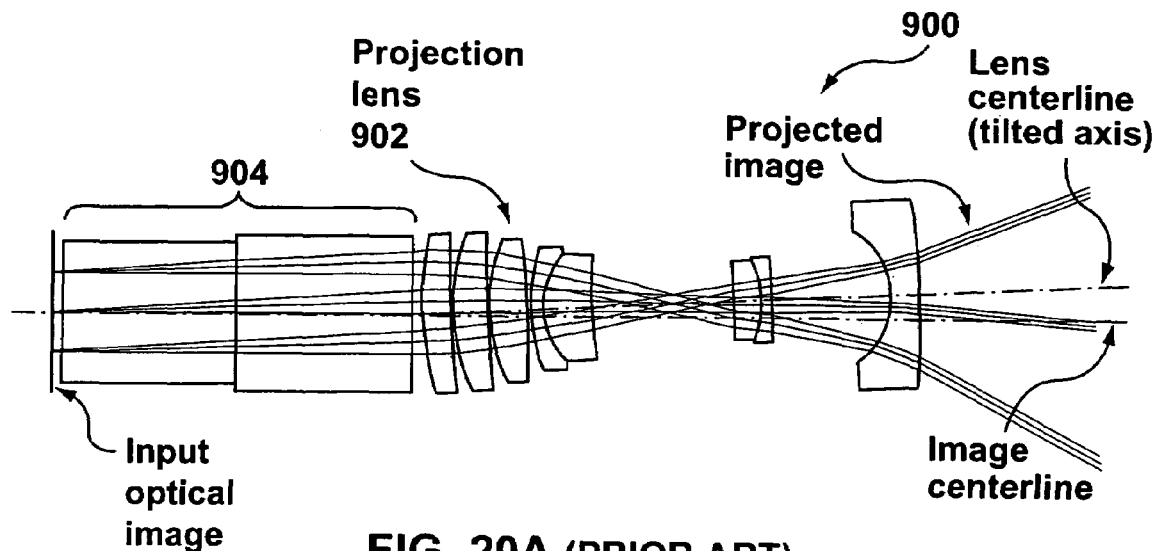
FIG. 20A is a schematic diagram that illustrates a prior art projection light engine with a tilt in the projection lens axis in order to take advantage of field curvature to minimize de-focusing.

Referring now to FIG. 20A, shown therein is a prior art projection light engine 900 in which there is a tilt in the axis of the projection lens 902. This tilt can be added to any of the projection systems of the present invention to reduce the effect of field curvature spot defocusing and improve system performance while reducing cabinet depth. The tilt is between the plane of the image surface of the micro-display 904 and the plane of the aperture inlet plane of the projection lens 902. In this example, the tilt amounts to a couple of degrees and typically is of the order of 1 to 2 degrees depending on whether there is a shift in the projection light engine and the magnitude of the shift. The spherical wavefronts that emerge from any physical lens results in the best focused image points lying along a spherical surface at a radius of the focal length. The Scheimpflug principle states that if the planes of the imager, the lens plane and the display surface all intersect along the same line, focus spots will be minimized.

Figure 20B:
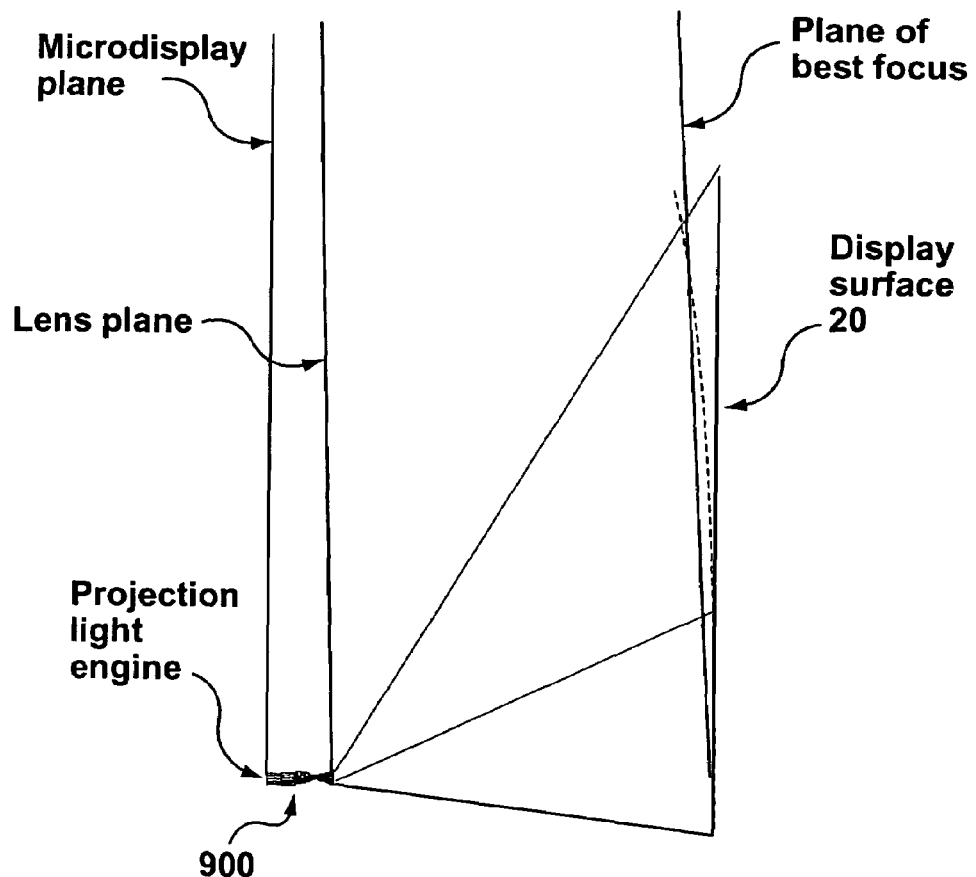
FIG. 20B is a schematic illustration of the Scheimpflug principle (planes of micro-display, lens, and screen all meeting along the same line of intersection) being used in a prior art projection system in order to combat spot defocus.

Referring now to FIG. 20B, the projection light engine 900 with built-in micro-display tilt is shown in a configuration satisfying the Scheimpflug condition. The "plane of best focus" shown in the figure is actually a plane of optimal focus, as the best focused points always lie along a spherical surface. This plane is shown intersecting the field of curvature of the projected image. The display surface must be moved to coincide with this plane by mechanically reducing the angle between the plane of the display surface and a plane perpendicular to the principal axis of the projection lens. The other components of the projection system such as the aspherical mirror, etc. are not shown for clarity, but obviously, they are present. The best focus is always along an arc, so there will always be focus problems on a flat screen. In an off-axis projection system of the present invention, the projection light engine 900 with built-in tilt can be used to reduce the focus problems. If the display screen was tilted a few degrees to coincide with the plane of optimal focus (which is superimposed for best fit in the spherical wavefront of best focus) then spot sizes would be improved. Conceptually, it is easier to tilt the projection lens 902 backward relative to the micro-display 904 and then tilt the projection light engine forward a few degrees so that the Scheimpflug principle is met. Mechanically, this has to be implemented by careful design of the lens mount and the use of precisely inclined lens barrels and/or off-axis machining and/or special shims/washers, etc. The tilted projection lens 900 can be used in any of the projection systems of the present invention. The concept is also applicable to both front and rear projection systems.

It is possible to use an off-the-shelf projection lens, and tilt or shift (i.e. offset) the lens to be used with a light engine with a smaller micro-display than the projection lens was designed for. Of course, some mechanical changes, as mentioned above, will need to be implemented. It should be understood that a projection light engine can be used with any of the embodiments of the present invention, in which the projection light engine employs no lens shift or tilt, only lens shift, only lens tilt or a combination of both lens shift and tilt. For instance, an off-the-shelf projection lens designed for a specific light modulator can be modified for use with a different, smaller light modulator by applying a shift and tilt. For example, the inventors shifted a commercial lens designed for a 1.2" diagonal light modulator by 50% and tilted the lens a fraction of a degree for use with a 0.8" diagonal light modulator. A shift of 50% means that the top edge of the micro-display is shifted down to the center of the projection lens causing most of the projected image to be thrown from the top-half of the lens. In this case, the image quality was good enough that a corrector lens was not necessary, and so the expense of a custom projection lens design was saved. However, this design would have necessitated modifications to the projection light engine, first for the 0.8" micro-display to accommodate the shift and tilt necessary for the off-axis configuration and second, for the attachment of a projection lens designed for a different light engine. The result is a rear projection off-axis system with a 60 inch diagonal and an 8 inch cabinet depth using a 0.8" light modulating micro-display. This was achieved by using a projection lens designed for a conventional projection system having a 60 inch diagonal and 20 inch cabinet depth using a larger (possibly more expensive) 1.2" light modulating micro-display.

As mentioned previously, a custom-designed projection lens mounted on a light engine can be used in the various embodiments of the invention to eliminate the corrector lens 49. The custom projection light engine can include the corrector lens 49 in its projection lens housing. In this case, the housing of the projection light engine is longer and the overall projection light engine is more expensive. Alternatively, the custom projection light engine can include a custom lens element that has an aspherical rotationally non-symmetric curvature for partially or fully correcting the distortion introduced by the curved, aspherical mirror. In this case, the custom projection light engine is more compact.

Figure 21C:
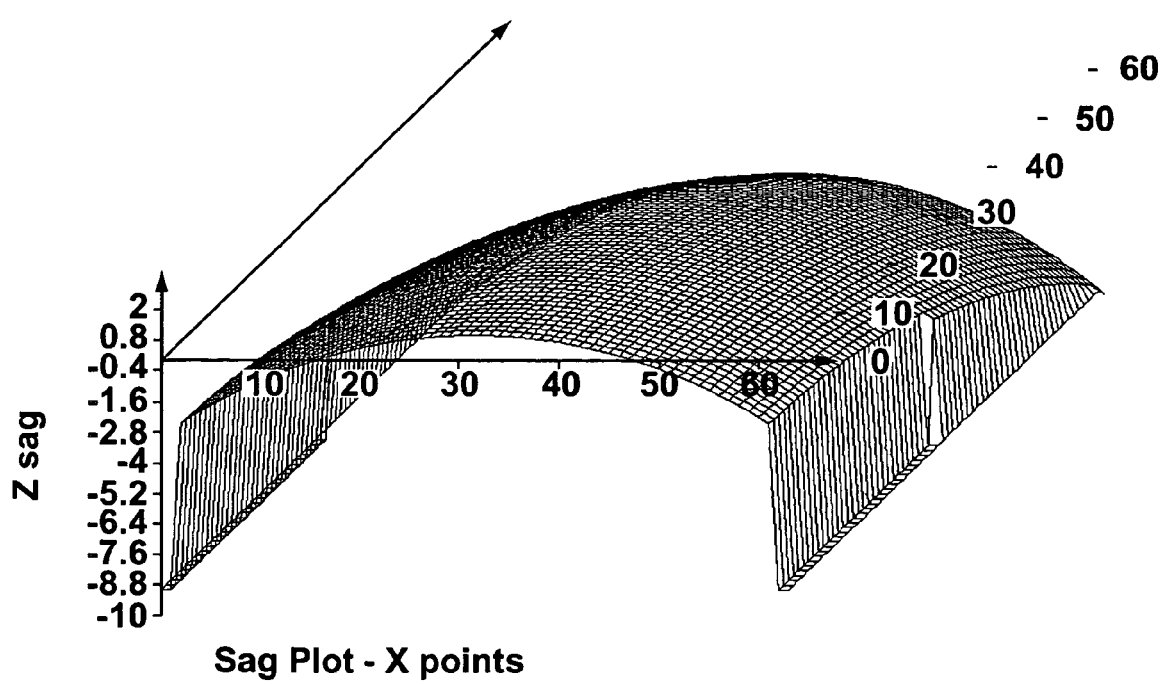
FIG. 21C is a plot of the $3^{rd}$ surface (aspherical, asymmetrical) from the custom projection lens of FIGS. 21A-B; and, FIG. 22 is a block diagram of an image processing unit that can be used with any embodiment of the invention to provide electronic distortion correction.

An example of a custom lens that can be used with an aspherically curved, rotationally asymmetric mirror is shown in FIGS. 21A-C. It is to be noted that this design was also used to work with an aspherically curved, rotationally symmetric mirror (in order to substitute this mirror with a Fresnel mirror) as well (see FIGS. 18F-G), but a surface profile of one of the lens elements had to be changed. Referring now to FIGS. 21A and 21B, shown therein are top and side cross-sectional views, respectively, of an eight-element custom projection lens 950. The elements of the projection lens 950, starting from the right are: a first element 952 with a convex and concave surface, a second element 954 with an asymmetrical, aspherical concave surface, a third element 956 which is a doublet, a fourth element 958 which is a biconvex lens, a fifth element 960 which is a doublet, a sixth element 962 which is a doublet, a seventh element 964 which is a biconvex lens, and an eighth element 966 which is a plano-convex lens element. Both lens shift and tilt are used and FIG. 21B shows the shift (offset) quite clearly, though the tilt is a little harder to see. The tilt begins at lens element 966.

FIG. 21C shows the profile of an aspherical, rotationally, non-symmetrical surface that has been incorporated into the second lens element 954 of the custom projection lens 950. In the side view of FIG. 21B, there appears to be some interference between this surface and the second surface of lens element 952 but in practice this would not occur as the bottom portion of the lenses are not used (due to the shift) and could be ground off. The projection lens 950 has correction for focus and can be used on any of the curved mirror systems that use a corrector lens. The projection lens of FIG. 18 does correction for keystone distortion that cannot be completely handled by the Fresnel mirror due to constraints of having to use a symmetrical surface.

Figure 22:
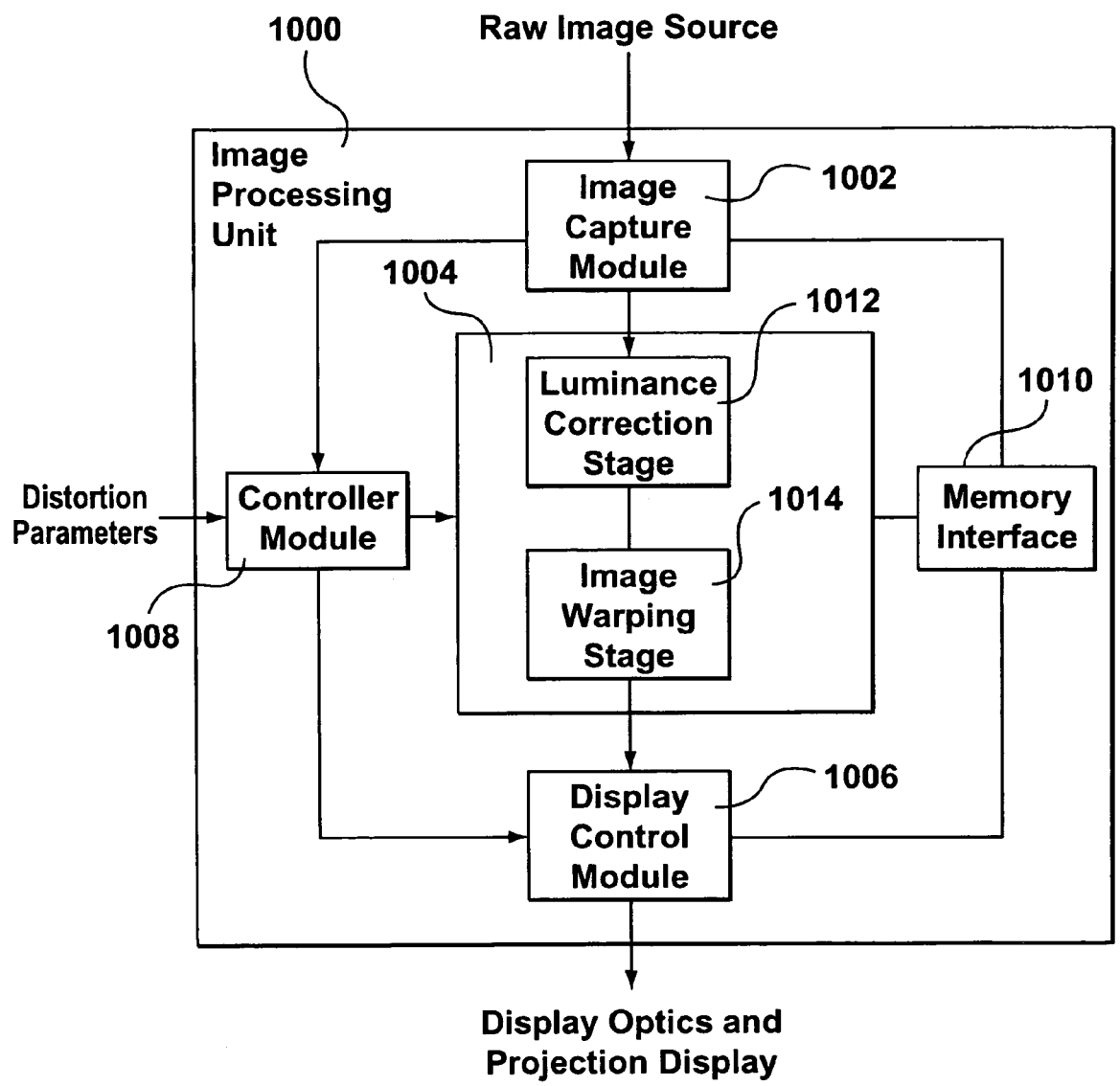

Referring now to FIG. 22, shown therein is a block diagram of an example embodiment of the image processing unit 1000 of the present invention. The image processing unit 1000 can be integrated with the optics of any embodiment of the present invention to correct for any remaining keystone and other spatial distortion. The image processing unit 1000 comprises an image capture module 1002, an image processor module 1004, a display controller module 1006, a controller 1008 and a memory interface module 1010 connected as shown. The image capture module 1002, image processing module 1004 and display controller module 1006 are all connected to the memory interface module 1010 for storage and retrieval of data and parameters.

Raw image data is retrieved by the image capture module 1002 and digitized therein. The digitized image data is then sent to the image processor module 1004 for digital image processing and keystone correction via the luminance correction stage 1012 and the image warping stage 1014. The image processor module 1004 obtains distortion parameters from the controller module 1008 and produces an image transformation, via the image warping stage 1014, to distortion-compensate the digitized image data. This distortion-compensated digital image data is then passed on to the display controller module 1006, which modulates light based on the distortion-compensated image data and projects this light out of the light engine. When this light propagates through the bulk optics and onto the display surface of a projection system, the distortion due to the bulk optics nullifies the compensatory distortion present in the image and the resulting display is substantially distortion free.

The luminance correction stage 1012 is used to correct for brightness or luminance non-uniformity. Accordingly, the luminance correction stage 1012 receives the input image data and produces luminance adjusted image data. The luminance correction stage 1012 applies a pre-determined map to correct the pixel brightness in color space at specific pixel locations since the intensity of a point or section of the displayed image varies inversely with the square of the distance traveled, this leads to brightness variations within the displayed image. Various equations for image maps can be used (a linear example was given previously).

The image warping stage 1014 is used to correct for the combination of remaining uncorrected distortion due to the projection lens 5, the corrector lens 49, the aspherical mirror 39, the off-axis projection geometry, and installation misalignments. The image warping stage 1014 applies a transformation to the input image (an example of which is shown in FIG. 9a) to distortion-compensate the input image according to geometric transformations that are the inverse of the geometric distortions (not shown) introduced by the projection light engine 14 and the associated reflection (mirror) optics (not shown). Accordingly, the image warping stage 1014 receives the luminance adjusted image data and produces the distortion-compensated image data. The image warping stage 1014 allows for a more flexible choice of optical lenses, since any associated distortions will be eliminated by pre-warping, rather than by matching the optical properties of the lenses of the projection light engine. A particular implementation of the image warping stage 1014 is given by Greggain et al. U.S. Pat. No. 5,594,676 which is herein incorporated by reference.

The luminance correction stage 1012 and the image warping stage 1014 can act equally on all component wavelengths of white light. However, this stage can also act differently according to the R, G, and B wavelengths. This results in a further benefit, namely the correction of lateral color shifts and the correction of certain chromatic aberrations. If chromatic aberrations and lateral color shifts can be corrected by the image processing unit 1000, the projection lens design may be greatly simplified, with a corresponding savings in manufacturing costs. However, electronics costs will go up because of the need for three identical image-processing engines instead of one in each of the stages of the image processing unit.

The luminance-correction stage 1012 and the image warping stage 1014 may be implemented by a software module or by dedicated processing circuitry such as a digital signal processor or an application specific integrated circuit. The order of these stages in the data path may also be interchanged.

In use, a comprehensive range of values for distortion parameters that cover the entire space of distortion parameters is first obtained for the image processing unit 1000. The values for the distortion parameters can be obtained via a user interface and can be determined offline according to various geometrical and optical configurations of the projection system. For each single set of values for the distortion parameters, a transformation is obtained which parameterizes the distortion compensation transformation that is applied by the image warping stage 1014. A distortion map database is then prepared covering the entire space of possible values for the distortion parameters. Access to this database is necessary every time calibration is required for the projection system which can occur at manufacturing, after shipping, etc. A single distortion transformation is then extracted from the distortion map database that corresponds to the final distortion parameters of the projection system (i.e. once the projection system is installed, the distortion parameters won't change too much because the optical alignment is intact). The final distortion map is used by the image warping stage 1014 to geometrically adjust (i.e. distortion compensate) the digitized input image data.

In general, the various performance figures shown herein for the embodiments of the projection system in accordance with the present invention do not show the correction that is performed by the image processing unit 12. However, it should be understood that when electronic correction is provided by the image processing unit 12, the distortion is reduced significantly, to values equal to or less than 1%.

The inventors have found that DtoD ratios may be improved, while retaining acceptable image quality, in a projection system that uses various combinations of lens tilt, lens shift, possibly one or more aspherical elements in the projection lens optics, at least one curved aspherical mirror and electronic distortion correction. The electronic distortion correction provided by the image processing unit can be used as an extra degree of freedom to "tune out" residual distortion which either results from the design, or is due to individual component deviations and/or mechanical assembly tolerances for various combinations of the above elements.

Current state of the art for DtoD ratios in consumer RPTVs is about 3.2:1. Current state of the art for DtoD ratios in professional rear projection systems (which are 3 to 5 times more expensive than consumer products) is about 6:1. The various embodiments of this invention will allow consumer RPTVs to achieve DtoD ratios of over 5:1. For example, it is possible to achieve a DtoD ratio of 5.5:1 using a large curved mirror design with a simple aspherical projection lens and the image processing unit. Another example is a DtoD ratio of 7.5:1 by adding micro-display shift and tilt to the previous case and re-optimizing the lens profile for a custom design. Other examples for consumer RPTV products include: a) a DtoD ratio of 6 for a small curved mirror, off-axis projection system (similar to that shown in FIG. 6), using no tilt or shift in the projection lens, with an external corrector lens; b) a DtoD ratio of 7 for a large curved mirror, off-axis projection system (similar to that shown in FIG. 16A), using no tilt or shift in the projection lens, with an external corrector lens; c) a DtoD ratio of 7.5 for a large curved mirror, off-axis projection system using tilt as well as shift in a custom projection lens design; (this could be achieved by using the lens shown in FIGS. 18F-G in the configuration shown in FIG. 18A) and, d) a DtoD ratio of 8.5 for a large Fresnel mirror, off-axis projection system using tilt as well as shift in a custom projection lens design (this could be achieved by using the lens shown in FIGS. 21A-B in the configuration shown in FIG. 16A). It should be understood that the details about screen diagonal and cabinet thickness are not very important, only the ratios, as everything scales linearly as long as certain minimum mechanical dimensions are met in order for the projection light engine to fit within the thickness of the cabinet.

However, there are cost and performance tradeoff implications in the use of these techniques. For example, the use of lens or micro-display offset includes using a larger lens aperture which increases cost. The tradeoff is that a larger lens/micro-display offset allows for more keystone distortion correction but the cost of the projection lens increases since larger lens elements are needed. Further, when aspherical, rotationally non-symmetric lens elements are used, costs are increased since tooling costs increase for creating injection molded lens elements. In addition, when creating aspherical, rotationally non-symmetric mirrors there are cost increases for fabricating front surface mirrors with accurately profiled optical surfaces (mold machining costs may also have to be incurred).

As has been shown with the various embodiments discussed herein, the present invention is applicable to 1, 2 and 3 mirror off-axis projection systems in which either at least one of the mirrors has a curved surface or, one of the mirrors is positioned at an off-axis angle to the light beam, or both. In all cases, a corrector lens or a custom designed projections lens is used to correct for the distortion after the image has been reflected by the curved mirror. In addition, an image processing unit is required to correct for any residual distortion. Further, the addition of one or more flat mirrors to the configuration allows further tradeoffs in vertical height vs cabinet depth to be made. The use of a greater number of mirrors also provides for extra flexibility in positioning the components of the projection system and the ability to decrease the cabinet thickness but the penalty is more difficulty in alignment. Using two curved mirrors also allow for the possibility of making some simplifications in mirror fabrication, but once again there is extra complexity in alignment. The use of Fresnel mirrors has the potential to replace large curved mirrors, yielding cost reductions as well as further improvements in cabinet thickness and DtoD ratios.

In accordance with the present invention, a typical design process for designing a projection system with at least one curved mirror and an image processing unit includes the following steps:

I) Define the design constraints for the projection system:
  1) define the parameters of the projection light engine such as the projection lens design which includes the focal length, the f# (i.e. the ratio of lens diameter to focal length), etc.;
  2) define the cabinet depth, the number of mirrors (1, 2 or 3) and which mirrors are curved, the cabinet configuration (free-standing, wall unit, etc.), the size of the display surface, etc.;

II) Define an initial configuration for the mirrors:
  3) Use at least one mirror to set up the angle and distance between the projector light engine and the mirror (if one mirror is used it is curved; if more than one mirror is used then one of the mirrors may be flat); if a Fresnel mirror is to be used in place of a large, curved mirror;
    a) optimize the angles and distances between the projection light engine and the mirror(s) to minimize keystone distortion while keeping the projection path of the optical image clear (i.e. to avoid casting shadows in the optical image; note that the projection path will change with a curved mirror surface);
    b) adjust the shift and tilt of the projection lens relative to the display device (or vice-versa) to minimize distortion and spot smearing/defocusing if allowed by the projection light engine (this step may also include re-optimizing the angles and distances mentioned in step 3a);
  4) Select a certain initial configuration, material and starting dimensions for the curved mirror in a suitable optical simulator (such as Oslo™, Zemax™, etc;

III) Optimize the surface contour of the curved mirror and design the corrector lens;
  5) Set up an optimization error function (provided by the simulator such as mean square error, etc.) to minimize the distortion caused by the curved mirror and optimize the surface contour of the curved mirror to minimize the error function;
    a) adjust the constraints as needed for the thickness, curvature and tilt of the curved mirror;
    b) re-simulate and re-adjust the constraints as needed;
    c) check the optical path for conflicts;
    d) repeat steps 5a through 5c until acceptable distortion and focus spot sizes are obtained for the projection system;
  6) Apply steps 4 and 5 for the design of the corrector lens (or lens surface within a custom projection light engine design) while optimizing the corrector lens for providing minimal focus spot size and preventing excessive distortion while constraining the corrector lens within mechanical requirements (i.e. the corrector lens is designed to be larger than its nominal size because of artifacts that are caused by the oscillations of the mathematical functions that define the surface profile of the corrector lens as they converge to the desired surface profile; the part of the corrector lens outside of the nominal dimensions is simply not fabricated);

7) Re-optimize the curved mirror to minimize any distortion introduced by the corrector lens or custom projection lens (this may involve slightly adjusting the profile of the curved mirror by adding positive and/or negative curvatures, adjusting the transition rate between the concave and convex curvatures, etc.); and, 8) Re-optimize the corrector lens to minimize any degradation in focus spot size that is introduced by changes in the curvature of the curved mirror.

This process yields diminishing returns very quickly and the solution will converge quickly to optimal values if suitable initial profiles are selected for the corrector lens and the curved mirror. These profiles may be approximated by $3^{rd}$ order or $5^{th}$ order polynomials. Interpolation using a bi-cubic spline function, a cosine function or a similar mathematical function can be used in designing the surface curvature of the mirrors. Excel spreadsheets or any other suitable computer program may be used to calculate these approximations.

The projection system 10 provides for near distortion-free projection of an optical image through the use of particularly configured projection elements. The projection system 10 incorporates a general short throw optical system that has inherent distortion while achieving the short throw distance with an image processing unit that corrects for geometric and other optical distortions. The projection system 10 uses an aspherical mirror 39, a corrector lens 49, and electronic correction to achieve a desired short throw ratio with acceptable distortion levels. The image processing unit 12 performs corrections for the combined spatial distortion of the projection light engine, the optical reflection assembly, the projection geometry, as well as all three axes of rotation of the assembly alignment. The image processing unit 12 can address keystone distortion and barrel/pin-cushion distortion as well as color non-convergence (which may be due to misalignment of the micro-display in the x, y or theta axis). In particular, the image processing unit 12 provides arbitrary scaling (in both the horizontal and vertical dimensions as well as different regions of an image) as well as linear up and down scaling for all visible wavelengths of light, equally, or, with specifically programmed arbitrary scaling for each of several desired passbands of light. Chrominance and luminance non-uniformity may also be corrected by the image processing unit 12. Lens designs may be simplified because lens aberrations and distortions such as the common spherical aberrations and lateral color shifts are amenable to electronic correction. Since the image processing unit 12 serves to eliminate any residual distortions, the system design is no longer limited by the constraint of minimizing distortions optically. This also has the added benefit of being able to apply any fine-tuning digitally rather than more complicated optical means. Variations can be obtained by combining several mirrors (planar and/or non-planar) and/or projection light engines. This system design methodology is applicable to both front and rear projection setups.

In another alternative, it is possible to use a light modulating micro-display device that is shaped to accommodate for keystone distortion and other spatial distortion. The micro-display device consists of appropriately shaped pixels such that when the modulated light traverses an off-axis optical path, which may consist of a projection lens, and one or more mirrors, part or all of the resulting distortion is corrected, resulting in a correct image being projected on the display surface. If the micro-display device is made for a conservative off-axis system, it can be used with a flat mirror in a conservative DtoD system, and with a curved mirror for a more aggressively specified system. The advantage is that the optics and the image processing can be simplified. However, this needs to be weighed against the cost of fabrication of a custom micro-display device. One of the difficulties in making such a micro-display device is etching photolithographic masks with lines that did not run at right angles to each other, since at very small geometries, "staircasing" or "jaggies" could be apparent in the line structure. Fortunately, the geometries used for fabricating these micro-displays seldom have to be as small as those required for memory and processing devices.

It should be noted that the various embodiments shown herein are also applicable to a compact front projection system. However, for a front projection system, there is no need for a Fresnel lens in the display screen.

As will be apparent to those skilled in the art, various modifications and adaptations of the structure described above are possible without departing from the present invention, the scope of which is defined in the appended claims.

The invention claimed is:

1. An off-axis projection system for displaying an image on a display surface based on input image data, comprising:
an image processing unit for receiving the input image data representing a two-dimensional array of pixels, and electronically warping the input image data, prior to projection, to generate two-dimensional electronically warped image data;
a projection light engine having a display device with means to modulate a two-dimensional array of pixels, said light engine being coupled to the image processing unit and adapted for receiving the electronically warped image data, modulating a two-dimensional warped image corresponding to the electronically warped image data on the display device, and projecting the two-dimensional warped image to create a projected image; and,
an optical reflection assembly coupled to the projection light engine adapted to direct the projected image onto the display surface, said optical reflection assembly comprising at least one curved mirror,
wherein, the electronic warping is performed such that in the projected image on the display surface, optical and geometric distortions, including distortions caused in the light engine and the optical reflection assembly, are substantially eliminated.

2. The projection system of claim 1, further comprising a corrector lens positioned in the optical path of the projected image between the projection light engine and the at least one curved mirror, said corrector lens being shaped to compensate for the defocusing caused by said at least one curved mirror.

3. The projection system of claim 1, wherein the image processing unit is adapted to scale the input image data to the aspect ratio and resolution of the projection light engine.

4. The projection system of claim 1, wherein said projection light engine comprises:
a light generator for generating a beam of light;
the display device positioned in front of the light generator; and
projection optics positioned in front of the display device for projecting and focusing the projected image.

5. The projection system of claim 4, wherein the projection optics includes a projection lens and wherein an optical axis of the projection lens is offset from an optical axis of the display device for adjusting the position of the beam of light from the light generator with respect to the on-axis direction of the path of the projected image in order to further compensate for keystone distortion and spot size in the projected image on the display surface.

6. The projection system of claim 4, wherein the projection optics includes a projection lens and wherein an optical axis of the projection lens is tilted from an optical axis of the display device for adjusting the position of the beam of light from the light generator with respect to the on-axis direction of the path of the projected image in order to further reduce spot size and improve MTF in the projected image on the display surface.

7. The projection system of claim 4, wherein the projection optics include a projection lens and wherein an optical axis of the projection lens is offset and tilted from an optical axis of the display device for adjusting the position of the beam of light from the light generator with respect to the on-axis direction of the path of the projected image in order to further compensate for keystone distortion and spot size in the projected image on the display surface.

8. The projection system of claim 4, wherein said light generator is an illumination subsystem, said display device is a micro-display based light modulating subsystem, and said optical assembly is an assembly of lens elements.

9. The projection system of claim 8, wherein the micro-display device is shaped to compensate for keystone and other spatial distortions.

10. The projection system of claim 1, wherein said optical reflection assembly additionally comprises a first flat mirror having a planar reflective surface.

11. The projection system of claim 10, further comprising a second flat mirror.

12. The projection system of claim 10, further comprising a second curved mirror.

13. The projection system of claim 1, wherein said image processing unit, projection light engine, and optical reflection assembly are adapted to operate in a rear projection configuration.

14. The projection system of claim 1, wherein the at least one curved mirror is replaced by a Fresnel mirror.

15. The projection system of claim 1, wherein the image processing unit comprises:
a luminance correction stage for adjusting pixel brightness in the input image data to produce luminance adjusted input image data; and,
an image warping stage connected to the luminance correction stage for receiving the luminance adjusted input image data and generating the two-dimensional electronically warped image data.

16. The projection system of claim 15, wherein the luminance correction stage individually processes different spectral passbands associated with the input image data.

17. The projection system of claim 15, wherein the image warping stage individually processes different spectral passbands associated with the luminance adjusted input image data.

18. The projection system of claim 1, wherein said at least one curved mirror comprises an aspherical rotationally non-symmetric mirror having a vertically oriented concave surface and a horizontally oriented surface with a varying degree of concave or convex curvature on an upper surface that smoothly transitions to a varying degree of convex curvature on a lower surface for reducing spatial distortion in the projected image on the display surface, said at least one curved mirror being positioned in the optical path of the projected image emerging from a projection lens for producing the projected image with reduced distortion on the display surface.

19. The projection system of claim 18, wherein the aspherical rotationally non-symmetric curved mirror has a small degree of horizontal convex curvature on an upper portion and a larger degree of horizontal convex curvature on a lower portion for reducing spatial distortion in the projected image on the display surface.

20. The projection system of claim 18, wherein the projection light engine comprises an aspherical rotationally non-symmetric lens being shaped to compensate for any defocusing caused by said at least one curved mirror.

21. An off-axis projection method for displaying an image on a display surface of an off-axis projection system based on input image data, comprising:
receiving input image data representing a two-dimensional array of pixels and electronically warping the image data, prior to projection, to generate two-dimensional electronically warped image data;
providing a projection light engine having a display device with means to modulate a two-dimensional array of pixels, said light engine being adapted for receiving the electronically warped image data, modulating a two-dimensional warped image corresponding to the electronically warped image data on the display device, and projecting the two-dimensional warped image to create a projected image; and,
reflecting the projected image with an optical reflection assembly coupled to the projection light engine, the optical reflection assembly being adapted to direct the projected image onto the display surface, said optical reflection assembly comprising at least one curved mirror;
wherein, the electronic warping is performed such that in the projected image on the display surface, optical and geometric distortions, including distortions caused in the light engine and the optical reflection assembly, are substantially eliminated.

22. The projection method of claim 21 further comprising directing the projected image through a corrector lens positioned in the optical path of the distortion-compensated optical image before the optical reflection assembly, said corrector lens being shaped to compensate for the defocusing caused by the at least one curved mirror.

23. The projection method of claim 21, further comprising directing the projected image through an aspherical rotationally non-symmetric lens being shaped to compensate for the defocusing caused by the at least one curved mirror.

24. The projection method of claim 21, further comprising:
generating a beam of light;
positioning the display device to produce the distortion-compensated optical image; and,
projecting and focusing the projected image.

25. The projection method of claim 24, further comprising shifting an optical axis of said display device with respect to an optical axis of a projection lens in order to further compensate for keystone distortion in the displayed optical image.

26. The projection method of claim 24, further comprising tilting an optical axis of said display device with respect to an optical axis of a projection lens in order to reduce de-focusing and improve MTF in a displayed image.

27. The projection method of claim 24, further comprising shifting and tilting an optical axis of said display device with respect to an optical axis of a projection lens in order to further compensate for keystone distortion, reduce de-focusing, and improve MTF in a displayed image.

28. The projection method of claim 24, further comprising positioning a light generator before the display device and an optical reflection assembly after the display device, wherein said light generator is an illumination subsystem, said display device is a micro-display based imaging subsystem, and said optical assembly is an assembly of lens elements.

29. The projection method of claim 21, wherein the method further comprises adding a first flat mirror to said optical reflection assembly wherein the first flat mirror has a planar reflective surface.

30. The projection method of claim 29, wherein the method further comprises adding a second flat mirror to said optical reflection assembly.

31. The projection method of claim 29, wherein the method further comprises adding a second curved mirror to said optical reflection assembly.

32. The projection method of claim 21, wherein the method further comprises operating the projection system in a rear projection configuration.

33. The projection method of claim 21, wherein the method further comprises using a Fresnel mirror in place of the at least one curved mirror.

34. The projection method of claim 21, further comprising:
adjusting pixel brightness in the input image data to produce luminance adjusted input image data; and,
warping the luminance adjusted input image data to generate the two-dimensional electronically warped image data.

35. The projection method of claim 34, further comprising individually processing different spectral passbands associated with the input image data.

36. The projection method of claim 34, further comprising individually processing different spectral passbands associated with the luminance adjusted input image data.

37. The projection method of claim 21, wherein said at least one curved mirror comprises an aspherical rotationally non-symmetric mirror having a vertically oriented concave surface and a horizontally oriented surface with a varying degree of concave or convex curvature on an upper surface that smoothly transitions to a varying degree of convex curvature on a lower surface for reducing spatial distortion in the projected image on the display surface, said at least one curved mirror being positioned in the optical path of the projected image emerging from a projection lens for producing the projected image with reduced distortion on the display surface.

38. The projection method of claim 37, wherein the aspherical rotationally non-symmetric mirror has a small degree of horizontal convex curvature on an upper portion and a larger degree of horizontal convex curvature on a lower portion for reducing spatial distortion in the projected image on the display surface.

* * * * *